(12) United States Patent
Kondo et al.

(10) Patent No.: US 7,409,074 B2
(45) Date of Patent: Aug. 5, 2008

(54) INFORMATION PROCESSING APPARATUS AND SYSTEM USING PIXEL DATA

(75) Inventors: Tetsujiro Kondo, Tokyo (JP); Junichi Ishibashi, Saitama (JP); Takashi Sawao, Tokyo (JP); Takahiro Nagano, Kanagawa (JP); Naoki Fujiwara, Tokyo (JP); Toru Miyake, Tokyo (JP); Seiji Wada, Kanagawa (JP)

(73) Assignee: Sony Corporation, Tokyo (JP)

( * ) Notice: Subject to any disclaimer, the term of this patent is extended or adjusted under 35 U.S.C. 154(b) by 913 days.

(21) Appl. No.: 10/343,294

(22) PCT Filed: May 23, 2002

(86) PCT No.: PCT/JP02/04983

§ 371 (c)(1),
(2), (4) Date: Oct. 20, 2003

(87) PCT Pub. No.: WO02/099752

PCT Pub. Date: Dec. 12, 2002

(65) Prior Publication Data

US 2004/0052425 A1  Mar. 18, 2004

(30) Foreign Application Priority Data

May 30, 2001  (JP) .............................. 2001-162151

(51) Int. Cl.
*G06K 9/00* (2006.01)
*G06K 9/34* (2006.01)
*G06K 9/40* (2006.01)
*H04N 7/18* (2006.01)

(52) U.S. Cl. ...................... 382/103; 348/142; 348/173; 348/254

(58) Field of Classification Search .................. 382/254, 382/173
See application file for complete search history.

(56) References Cited

U.S. PATENT DOCUMENTS 5,719,593 A * 2/1998 De Lange .................... 345/422

(Continued)

FOREIGN PATENT DOCUMENTS

EP  0 933 727  8/1999

(Continued)

*Primary Examiner*—Bhavesh Mehta
*Assistant Examiner*—Yuzhen Ge
(74) *Attorney, Agent, or Firm*—Frommer Lawrence & Haug LLP; William S. Frommer; Thomas F. Presson

(57) ABSTRACT

The present invention relates to an image processing device enabling detection of a mixture ratio indicating the state of mixture between multiple objects. A contour region information generating unit 421 and a normal equation generating unit 422 extracts contour region pixel data within a frame of interest positioned at a contour region with approximately a same mixture ratio, extracts corresponding pixel data from a frame different to the frame of interest, extracting background pixel data corresponding to the contour region pixel data or the corresponding pixel data, and generating an equation wherein the mixture ratio is an unknown number, based on region specifying information specifying a non-mixed region made up of a foreground region and background region and a mixed region. A least square approximation unit 423 detects the mixture ratio by solving the equation. The present invention can be applied to signals processing devices for processing image signals.

36 Claims, 78 Drawing Sheets

U.S. PATENT DOCUMENTS

| | | | |
|---|---|---|---|
| 6,741,755 B1 * | 5/2004 | Blake et al. | 382/284 |
| 6,756,992 B2 * | 6/2004 | Toji et al. | 345/613 |
| 6,839,463 B1 * | 1/2005 | Blake et al. | 382/173 |

FOREIGN PATENT DOCUMENTS

| | | |
|---|---|---|
| JP | 7-336688 | 12/1995 |
| JP | 10-164436 | 6/1998 |
| JP | 2000-30040 | 1/2000 |
| JP | 2001-250119 | 9/2001 |

* cited by examiner

FIG. 3
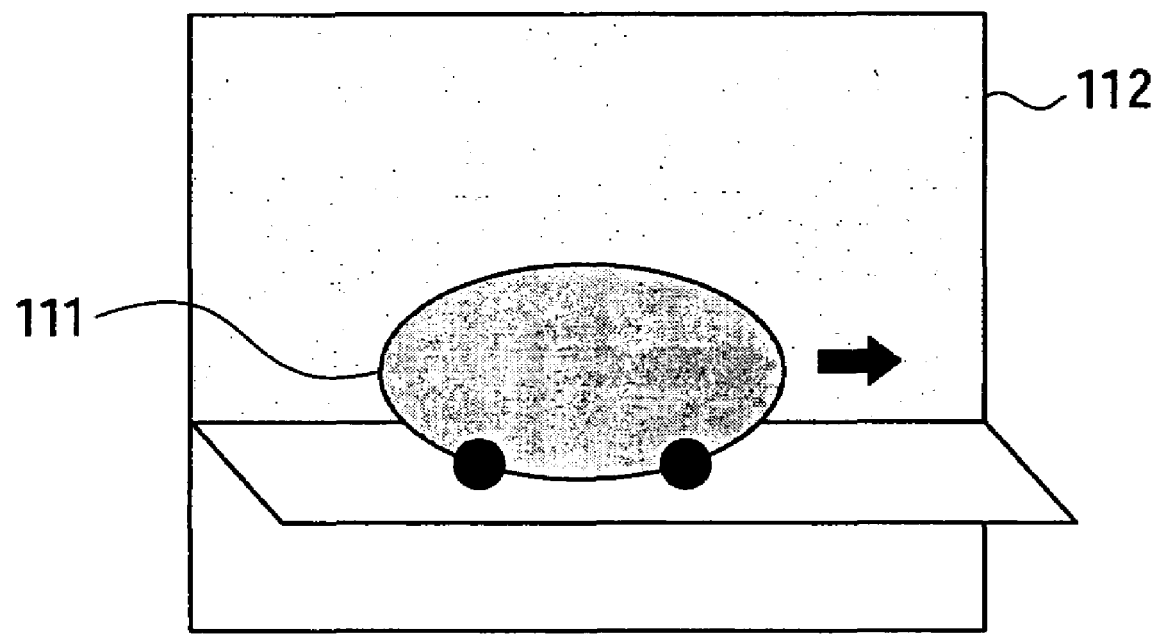
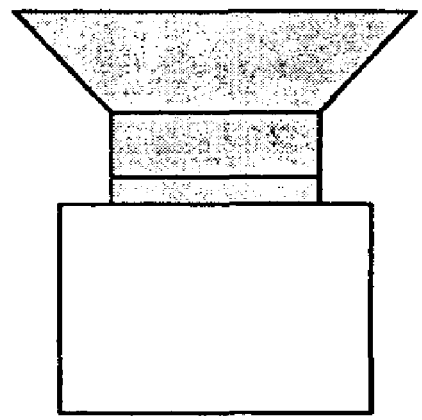

| REGION | | DESCRIPTION |
|---|---|---|
| BACKGROUND REGION | | STILL REGION |
| FOREGROUND REGION | | MOVING REGION |
| MIXED REGION | COVERED BACKGROUND REGION | PORTION WHICH CHANGES FROM BACKGROUND TO FOREGROUND |
| | UNCOVERED BACKGROUND REGION | PORTION WHICH CHANGES FROM FOREGROUND TO BACKGROUND |

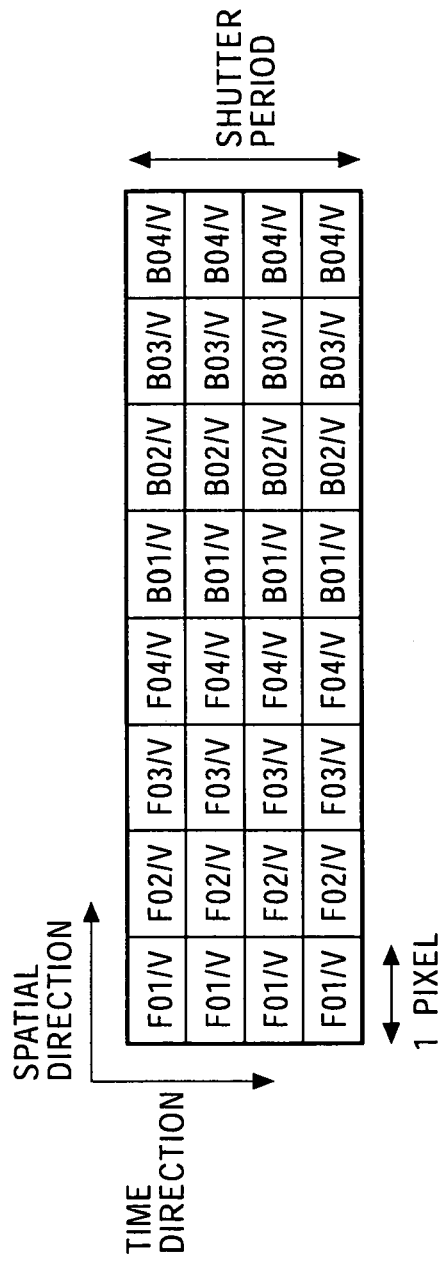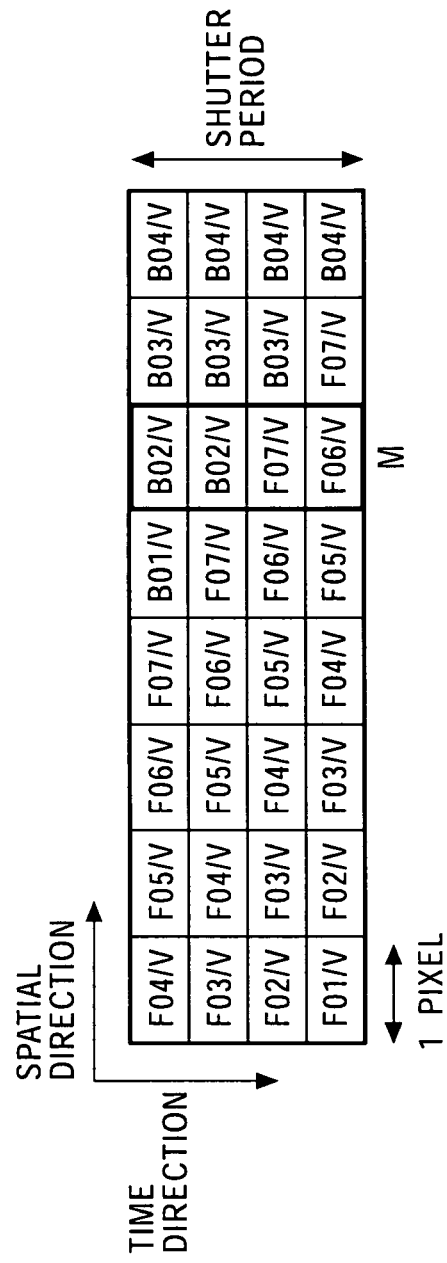

FIG. 25

| REGION JUDGEMENT | STILL/MOTION JUDGEMENT IN FRAME #n-2 AND FRAME #n-1 | STILL/MOTION JUDGEMENT IN FRAME #n-1 AND FRAME #n | STILL/MOTION JUDGEMENT IN FRAME #n AND FRAME #n+1 | STILL/MOTION JUDGEMENT IN FRAME #n+1 AND FRAME #n+2 |
|---|---|---|---|---|
| COVERED BACKGROUND REGION JUDGEMENT | STILL | MOTION | — | — |
| STILL REGION JUDGEMENT | — | STILL | STILL | — |
| MOVING REGION JUDGEMENT | — | MOTION | MOTION | — |
| UNCOVERED BACKGROUND REGION JUDGEMENT | — | — | MOTION | STILL |

FIG. 33A

| $X_0$ | $X_1$ | $X_2$ |
|---|---|---|
| $X_3$ | $X_4$ | $X_5$ |
| $X_6$ | $X_7$ | $X_8$ |

FIG. 33B

| $Y_0$ | $Y_1$ | $Y_2$ |
|---|---|---|
| $Y_3$ | $Y_4$ | $Y_5$ |
| $Y_6$ | $Y_7$ | $Y_8$ |

FIG. 34A

| $X_0$ | $X_1$ | $X_2$ |
|---|---|---|
| $X_3$ | $X_4$ | $X_5$ |
| $X_6$ | $X_7$ | $X_8$ |

FIG. 34B

| $Y_0$ | $Y_1$ | $Y_2$ |
|---|---|---|
| $Y_3$ | $Y_4$ | $Y_5$ |
| $Y_6$ | $Y_7$ | $Y_8$ |

FIG. 37

| | BACKGROUND REGION | FOREGROUND REGION | COVERED BACKGROUND REGION | UNCOVERED BACKGROUND REGION |
|---|---|---|---|---|
| FRAME #n-1 | — | 1 | 0 | — |
| FRAME #n | 0 | 1 | 1 | 1 |
| FRAME #n+1 | — | 1 | — | 0 |

FIG. 43

FIG. 60A
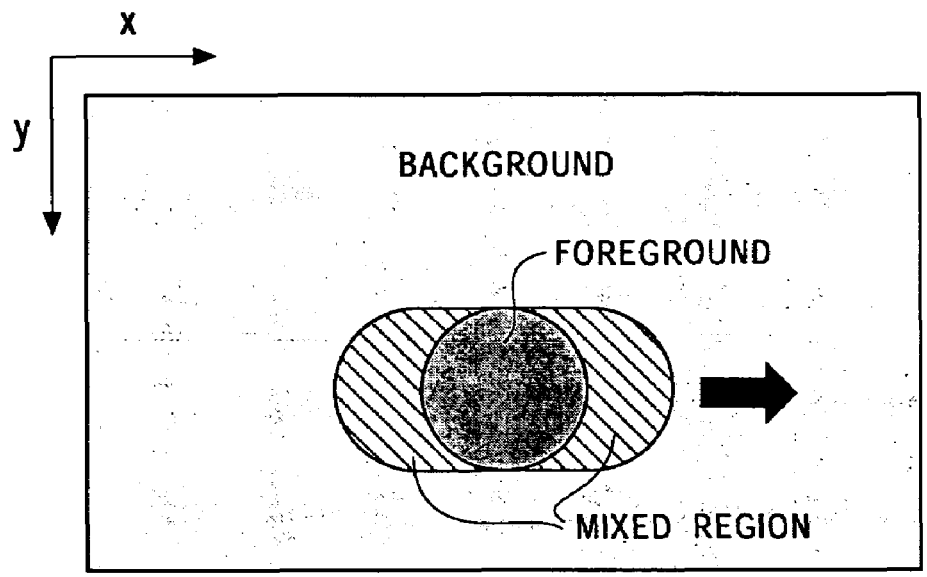
↓ FOREGROUND/BACKGROUND SEPARATION
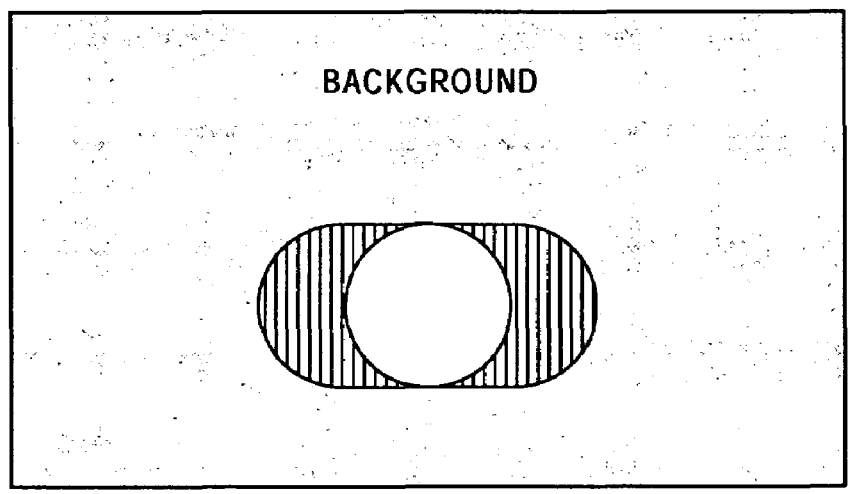
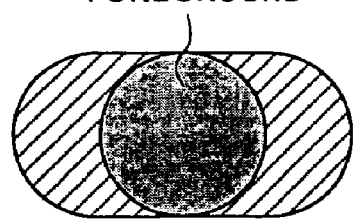

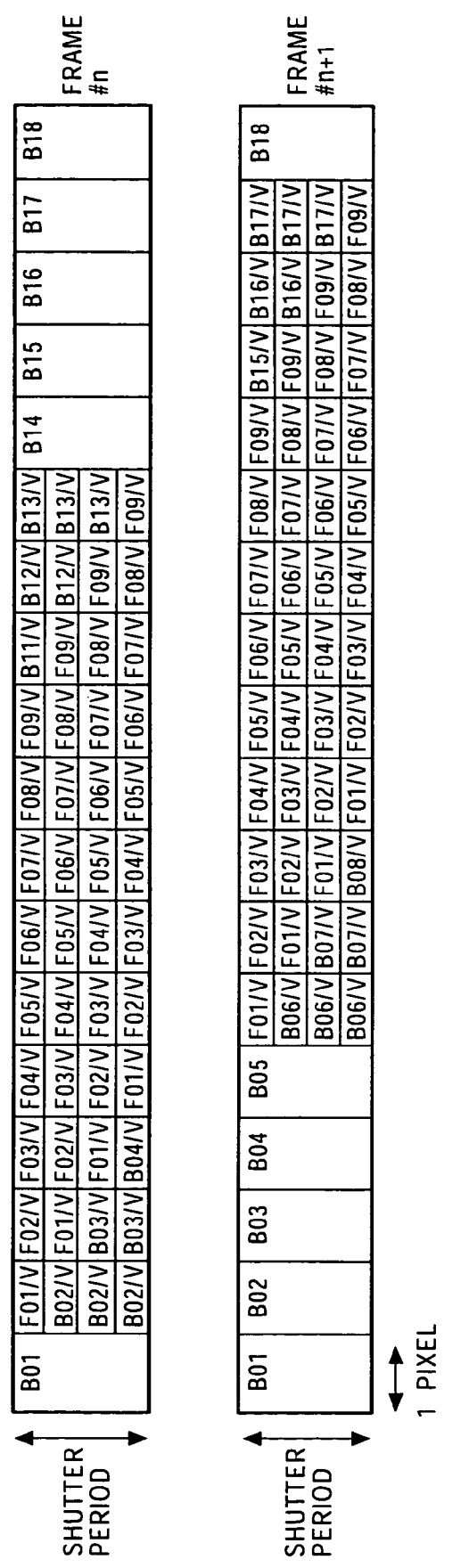

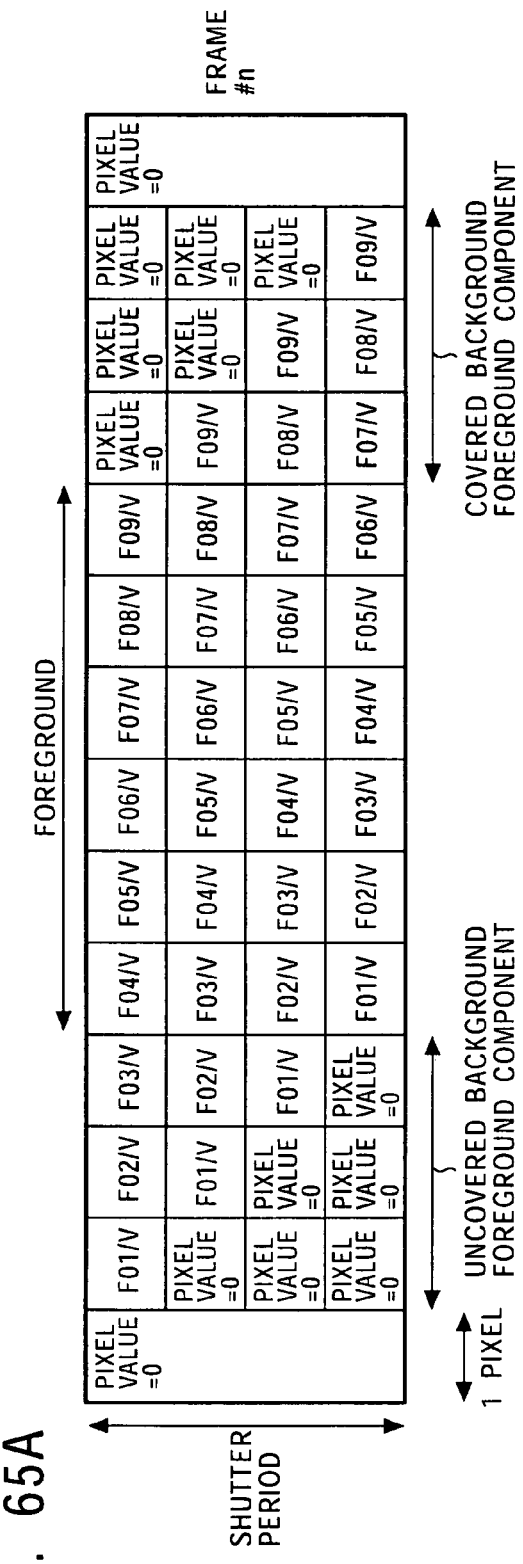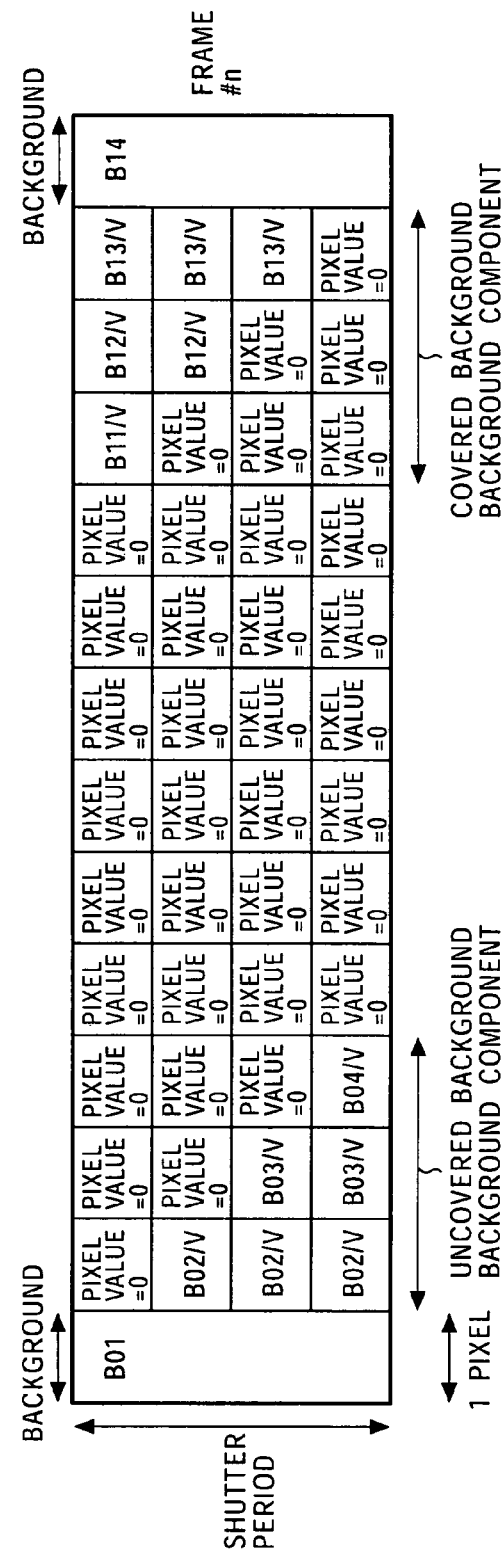
FIG. 65A
FIG. 65B

INFORMATION PROCESSING APPARATUS AND SYSTEM USING PIXEL DATA

TECHNICAL FIELD

The present invention relates to an image processing device, and particularly relates to an image processing device which takes into consideration the difference between signals detected by a sensor and the real world.

BACKGROUND ART

Techniques wherein phenomena in the real world are detected by means of a sensor, and sampled data which is output from the image sensor is processed, are being widely utilized.

For example, with images obtained by a video camera taking a picture of objects which move before predetermined still backgrounds, in the event that movement speed of the objects is relatively high, movement blurring occurs.

However, in the event that objects move in front of still backgrounds, movement blurring occurs not only due to mixture of the moving object images itself, but also due to mixture of the moving object images and the background images. Conventionally, detection of the state of mixture of the background images and the moving object images has not been taken into consideration.

DISCLOSURE OF INVENTION

The present invention has been made in consideration of such cases, and it is an object of the present invention to detect a mixture ratio which indicates the state of mixture of multiple objects such as background images and moving object images.

An image processing device according to the present invention comprises: equation generating means for, with regard to the image data, within a mixed region, extracting from the image data contour region pixel data within a frame of interest positioned at a contour region with approximately a same mixture ratio, extracting corresponding pixel data corresponding to the contour region pixel data from a frame different to the frame of interest, extracting background pixel data which is the pixel data made up of only a background object component corresponding to the contour region pixel data or the corresponding pixel data, and generating an equation wherein the mixture ratio is an unknown number, using the contour region pixel data, the corresponding pixel data, and the background pixel data, based on region specifying information specifying a non-mixed region made up of a foreground region made up of only a foreground object component configuring a foreground object and a background region made up of only a background object component configuring a background object and a mixed region wherein the foreground object component and the background object component are mixed, and movement of the foreground object component; and mixture ratio detecting means for detecting the mixture ratio in the frame of interest by solving the equation.

The equation generating means may extract the corresponding pixel data corresponding to the movement amount of the foreground object in the frame.

The equation generating means may extract the background pixel data corresponding to the movement amount of the background object in the frame.

The equation generating means may generate an equation corresponding to the relationship between the contour region pixel data, the corresponding pixel data, and the background pixel data, for calculating the mixture ratio by the least-square method.

The image processing device may further comprise movement detecting means for detecting movement of at least one of the foreground object and the background object.

The image processing device may further comprise region specifying means for specifying the foreground region, the background region, and the mixed region.

The image processing device may further comprise separating means for separating at least the foreground object component from the pixel data of the mixed region, based on the mixture ratio.

The image processing device may further comprise movement blurring adjusting means for adjusting the amount of movement blurring of the separated foreground object component.

The image processing device may further comprise synthesizing means for synthesizing a desired other object and the separated foreground object component, based on the mixture ratio.

An image processing method according to the present invention comprises: an equation generating step for, with regard to the image data, within a mixed region, extracting from the image data contour region pixel data within a frame of interest positioned at a contour region with approximately a same mixture ratio, extracting corresponding pixel data corresponding to the contour region pixel data from a frame different to the frame of interest, extracting background pixel data which is the pixel data made up of only a background object component corresponding to the contour region pixel data or the corresponding pixel data, and generating an equation wherein the mixture ratio is an unknown number, using the contour region pixel data, the corresponding pixel data, and the background pixel data, based on region specifying information specifying a non-mixed region made up of a foreground region made up of only a foreground object component configuring a foreground object and a background region made up of only a background object component configuring a background object and a mixed region wherein the foreground object component and the background object component are mixed, and movement of the foreground object component; and a mixture ratio detecting step for detecting the mixture ratio in the frame of interest by solving the equation.

The processing in the equation generating step may extract the corresponding pixel data corresponding to the movement amount of the foreground object in the frame.

The processing in the equation generating step may extract the background pixel data corresponding to the movement amount of the background object in the frame.

The processing in the equation generating step may generate an equation corresponding to the relationship between the contour region pixel data, the corresponding pixel data, and the background pixel data, for calculating the mixture ratio by the least-square method.

The image processing method may further comprise a movement detecting step for detecting movement of at least one of the foreground object and the background object.

The image processing method may further comprise a region specifying step for specifying the foreground region, the background region, and the mixed region.

The image processing method may further comprise a separating step for separating at least the foreground object component from the pixel data of the mixed region, based on the mixture ratio.

The image processing method may further comprise a movement blurring adjusting step for adjusting the amount of movement blurring of the separated foreground object component.

The image processing method may further comprise a synthesizing step for synthesizing a desired other object and the separated foreground object component, based on the mixture ratio.

A program on a recording medium according to the present invention comprises: an equation generating step for, with regard to the image data, within a mixed region, extracting from the image data contour region pixel data within a frame of interest positioned at a contour region with approximately a same mixture ratio, extracting corresponding pixel data corresponding to the contour region pixel data from a frame different to the frame of interest, extracting background pixel data which is the pixel data made up of only a background object component corresponding to the contour region pixel data or the corresponding pixel data, and generating an equation wherein the mixture ratio is an unknown number, using the contour region pixel data, the corresponding pixel data, and the background pixel data, based on region specifying information specifying a non-mixed region made up of a foreground region made up of only a foreground object component configuring a foreground object and a background region made up of only a background object component configuring a background object and a mixed region wherein the foreground object component and the background object component are mixed, and movement of the foreground object component; and a mixture ratio detecting step for detecting the mixture ratio in the frame of interest by solving the equation.

The processing in the equation generating step may extract the corresponding pixel data corresponding to the movement amount of the foreground object in the frame.

The processing in the equation generating step may extract the background pixel data corresponding to the movement amount of the background object in the frame.

The processing in the equation generating step may generate an equation corresponding to the relationship between the contour region pixel data, the corresponding pixel data, and the background pixel data, for calculating the mixture ratio by the least-square method.

The program on the recording medium may further comprise a movement detecting step for detecting movement of at least one of the foreground object and the background object.

The program on the recording medium may further comprise a region specifying step for specifying the foreground region, the background region, and the mixed region.

The program on the recording medium may further comprise a separating step for separating at least the foreground object component from the pixel data of the mixed region, based on the mixture ratio.

The program on the recording medium may further comprise a movement blurring adjusting step for adjusting the amount of movement blurring of the separated foreground object component.

The program on the recording medium may further comprise a synthesizing step for synthesizing a desired other object and the separated foreground object component, based on the mixture ratio.

A program according to the present invention comprises: an equation generating step for, with regard to the image data, within a mixed region, extracting from the image data contour region pixel data within a frame of interest positioned at a contour region with approximately a same mixture ratio, extracting corresponding pixel data corresponding to the contour region pixel data from a frame different to the frame of interest, extracting background pixel data which is the pixel data made up of only a background object component corresponding to the contour region pixel data or the corresponding pixel data, and generating an equation wherein the mixture ratio is an unknown number, using the contour region pixel data, the corresponding pixel data, and the background pixel data, based on region specifying information specifying a non-mixed region made up of a foreground region made up of only a foreground object component configuring a foreground object and a background region made up of only a background object component configuring a background object and a mixed region wherein the foreground object component and the background object component are mixed, and movement of the foreground object component; and a mixture ratio detecting step for detecting the mixture ratio in the frame of interest by solving the equation.

The processing in the equation generating step may extract the corresponding pixel data corresponding to the movement amount of the foreground object in the frame.

The processing in the equation generating step may extract the background pixel data corresponding to the movement amount of the background object in the frame.

The processing in the equation generating step may generate an equation corresponding to the relationship between the contour region pixel data, the corresponding pixel data, and the background pixel data, for calculating the mixture ratio by the least-square method.

The program may further comprise a movement detecting step for detecting movement of at least one of the foreground object and the background object.

The program may further comprise a region specifying step for specifying the foreground region, the background region, and the mixed region.

The program may further comprise a separating step for separating at least the foreground object component from the pixel data of the mixed region, based on the mixture ratio.

The program may further comprise a movement blurring adjusting step for adjusting the amount of movement blurring of the separated foreground object component.

The program may further comprise a synthesizing step for synthesizing a desired other object and the separated foreground object component, based on the mixture ratio.

An image-taking device according to the present invention comprises: image-taking means for outputting a subject image taken by an image-taking device having a predetermined number of pixels having time-integration effects as image data made up of a predetermined number of pieces of pixel data; equation generating means for, with regard to the image data, within a mixed region, extracting from the image data contour region pixel data within a frame of interest positioned at a contour region with approximately a same mixture ratio indicating a mixed state within the mixed region of objects which are multiple in the real world, extracting corresponding pixel data corresponding to the contour region pixel data from a frame different to the frame of interest, extracting background pixel data which is the pixel data made up of only a background object component corresponding to the contour region pixel data or the corresponding pixel data, and generating an equation wherein the mixture ratio is an unknown number, using the contour region pixel data, the corresponding pixel data, and the background pixel data, based on region specifying information specifying a non-mixed region made up of a foreground region made up of only a foreground object component configuring a foreground object and a background region made up of only a background object component configuring a background object and a mixed region wherein the foreground object component and the background object component are mixed, and movement of the foreground object component; and mixture ratio detecting means for detecting the mixture ratio in the frame of interest by solving the equation.

The equation generating means may extract the corresponding pixel data corresponding to the movement amount of the foreground object in the frame.

The equation generating means may extract the background pixel data corresponding to the movement amount of the background object in the frame.

The equation generating means may generate an equation corresponding to the relationship between the contour region pixel data, the corresponding pixel data, and the background pixel data, for calculating the mixture ratio by the least-square method.

The image-taking device may further comprise movement detecting means for detecting movement of at least one of the foreground object and the background object.

The image-taking device may further comprise region specifying means for specifying the foreground region, the background region, and the mixed region.

The image-taking device may further comprise separating means for separating at least the foreground object component from the pixel data of the mixed region, based on the mixture ratio.

The image-taking device may further comprise movement blurring adjusting means for adjusting the amount of movement blurring of the separated foreground object component.

The image-taking device may further comprise synthesizing means for synthesizing a desired other object and the separated foreground object component, based on the mixture ratio.

With regard to the image data, within a mixed region, contour region pixel data is extracted from image data within a frame of interest positioned at a contour region with approximately a same mixture ratio, corresponding pixel data corresponding to the contour region pixel data is extracted from a frame different to the frame of interest, background pixel data which is the pixel data made up of only a background object component corresponding to the contour region pixel data or the corresponding pixel data is extracted, and an equation wherein the mixture ratio is an unknown number is generated, using the contour region pixel data, the corresponding pixel data, and the background pixel data, based on region specifying information specifying a non-mixed region made up of a foreground region made up of only a foreground object component configuring a foreground object and a background region made up of only a background object component configuring a background object and a mixed region wherein the foreground object component and the background object component are mixed, and movement of the foreground object component, and, the mixture ratio in the frame of interest is detected by solving the equation.

Thus, a mixture ratio indicating the state of mixing of multiple objects, such as background images and moving object images, for example, can be detected.

A subject image taken by an image-taking device having a predetermined number of pixels having time-integration effects is output as image data made up of a predetermined number of pieces of pixel data, and, with regard to the image data, within a mixed region, contour region pixel data is extracted from image data within a frame of interest positioned at a contour region with approximately a same mixture ratio indicating a mixed state within said mixed region of objects which are multiple in the real world, corresponding pixel data corresponding to the contour region pixel data is extracted from a frame different to the frame of interest, background pixel data which is the pixel data made up of only a background object component corresponding to the contour region pixel data or the corresponding pixel data is extracted, and an equation wherein the mixture ratio is an unknown number is generated, using the contour region pixel data, the corresponding pixel data, and the background pixel data, based on region specifying information specifying a non-mixed region made up of a foreground region made up of only a foreground object component configuring a foreground object and a background region made up of only a background object component configuring a background object and a mixed region wherein the foreground object component and the background object component are mixed, and movement of the foreground object component, and, the mixture ratio in the frame of interest is detected by solving the equation.

Thus, a mixture ratio indicating the state of mixing of multiple objects, such as background images and moving object images, for example, can be detected.

BRIEF DESCRIPTION OF THE DRAWINGS

FIG. 3 is a diagram describing image-taking by a sensor.

FIG. 9 is a model diagram wherein the pixel values are developed over the time direction, and periods corresponding to shutter time are divided.

FIG. 10 is a model diagram wherein the pixel values are developed over the time direction, and periods corresponding to shutter time are divided.

FIG. 25 is a diagram describing conditions for region judgment.

FIG. 33A is a diagram describing calculating of correlation values.

FIG. 33B is a diagram describing calculating of correlation values.

FIG. 34A is a diagram describing calculating of correlation values.

FIG. 34B is a diagram describing calculating of correlation values.

FIG. 37 is a diagram describing judgment of a region judgment unit 342.

FIG. 43 is a diagram describing movement compensation of a movement compensation unit 381.

FIG. 60A is a diagram illustrating an input image, foreground component image, and background component image.

FIG. 61 is a model diagram wherein the pixel values are developed over the time direction, and periods corresponding to shutter time are divided.

FIG. 65A is a diagram illustrating an example of a separated foreground component image.

FIG. 65B is a diagram illustrating an example of a separated background component image.

BEST MODE FOR CARRYING OUT THE INVENTION

Figure 1:
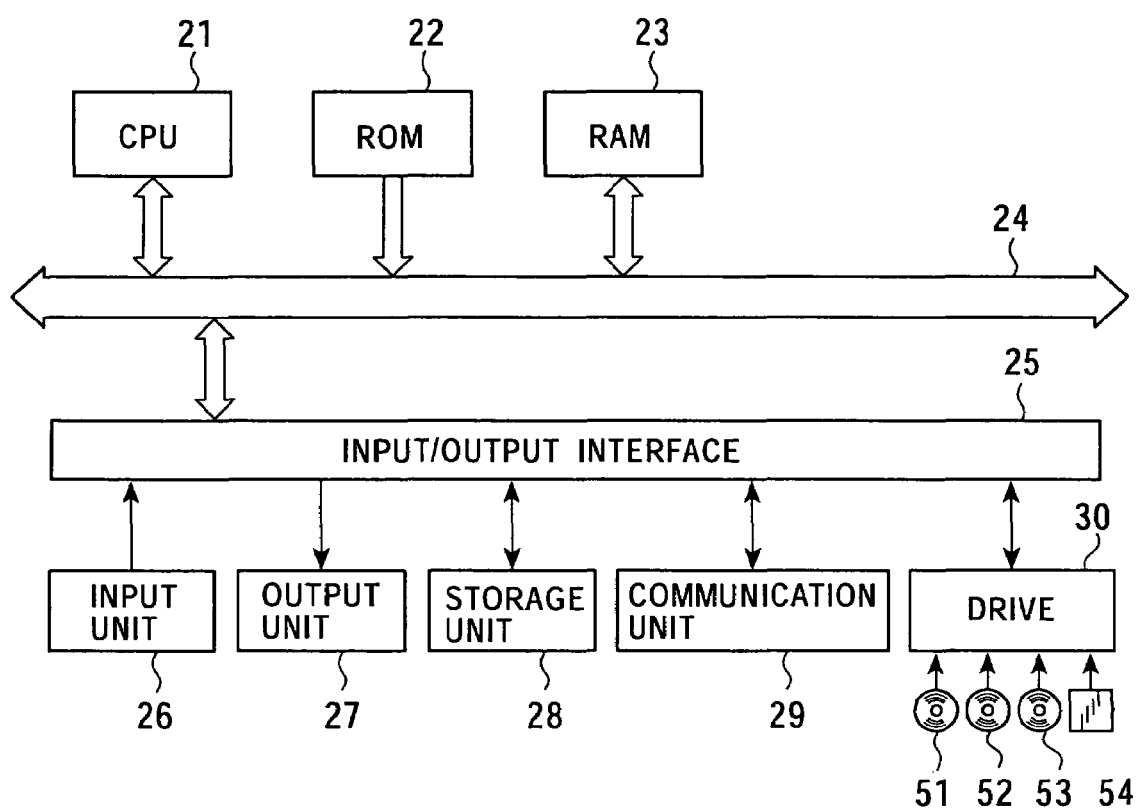
FIG. 1 is a block diagram illustrating the configuration of an embodiment of a signal processing device according to the present invention.

FIG. 1 is a block diagram which illustrates the configuration of an embodiment of a signal processing device according to the present invention.

A CPU (Central Processing Unit) 21 performs various types of processing following programs stored in ROM (Read Only Memory) 22 or a storage unit 28. RAM (Random Access Memory) 23 suitably stores programs for the CPU 21 to execute, data, and so forth. These CPU 21, ROM 22, and RAM 23 are mutually connected via a bus 24.

The CPU 21 is also connected to an input/output interface 25 via the bus 24. The input/output interface 25 is connected to an input unit 26 such as a keyboard, mouse, microphone, or the like, and is connected to an output unit 27 such as a display, speaker, or the like. The CPU 21 performs various types of processing corresponding to instructions input from the input unit 26. The CPU 21 then outputs images, audio, or the like, which are obtained as a result of processing, to the output unit 27.

A storage unit 28 connected to the input/output interface 25 comprises a hard disk, for example, and stores programs for the CPU 21 to execute and various types of data. A communication unit 29 communicates with external devices via the Internet or other networks. In the case of the example, the communication unit 29 also serves as an obtaining unit which obtains output from a sensor.

Also, an arrangement may be made wherein programs are obtained via the communication unit 29, and are stored in the storage unit 28.

A drive 30 connected to the input/output interface 25 drives a magnetic disk 51, optical disk 52, magneto-optical disk 53, semiconductor memory 54, or the like, in the event that those are mounted thereon, and obtains programs and data stored in the storage unit. The obtained programs, data, or the like are transmitted to the storage unit 28 and stored therein, as necessary.

A signal processing device for specifying regions which contain valid information, and performing processing for extracting the contained valid information from the data obtained with a sensor, will now be described, by way of a more specific example. In the following examples, a CCD line sensor or CCD area sensor corresponds to the sensor, region information or mixture ratio corresponds to the valid information, and mixture of foregrounds and background or movement blurring corresponds to distortion in mixed regions.

Figure 2:
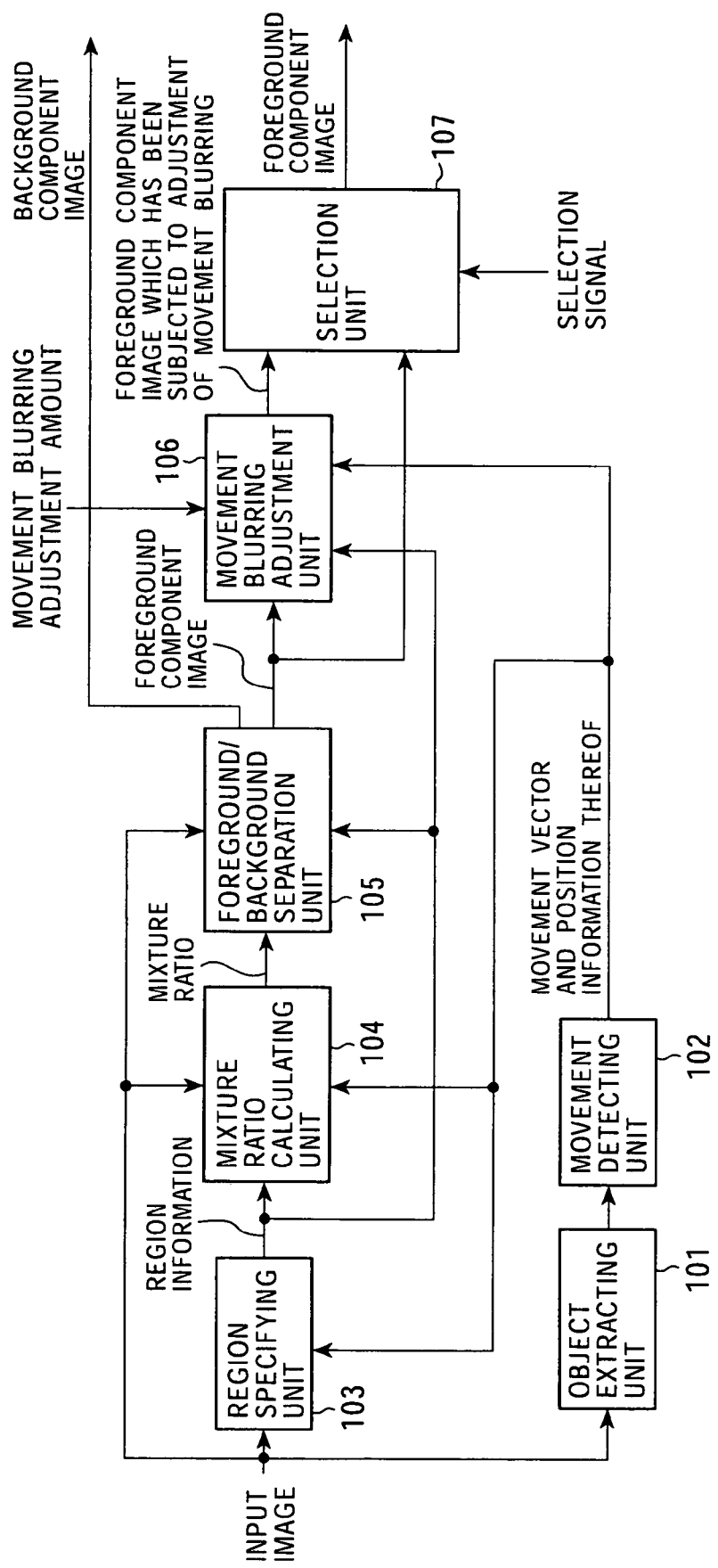
FIG. 2 is a block diagram illustrating the signal processing device.

FIG. 2 is a block diagram which illustrates the signal processing device.

Note that whether each function of the signal processing device is realized by hardware or software does not matter. That is to say, each block diagram in the present Specification may be regarded as not only a hardware block diagram but also as a software function block diagram.

Note that movement blurring means distortion which is included in images corresponding to moving objects, which occurs due to movement of objects which are objects of image-taking in the real world and due to image-taking properties of the sensor.

In the present Specification, images corresponding to objects which are objects of image-taking in the real world are called image objects.

Input images provided to the signal processing device are provided to an object extracting unit 101, a region specifying unit 103, a mixture ratio calculating unit 104, and a foreground/background separation unit 105.

The object extracting unit 101 roughly extracts the image objects corresponding to the foreground object contained in the input image, and supplies the extracted image object to the movement detecting unit 102. The object extracting unit 101 roughly extracts the image object corresponding to the foreground object, for example, by detecting the outlines of the image object corresponding to the foreground object included in input image.

The object extracting unit 101 roughly extracts the image object corresponding to the background object contained in the input image, and supplies the extracted image object to the movement detecting unit 102. The object extracting unit 101 roughly extracts the image object corresponding to the background object, by the difference between the input image and the image object corresponding to the extracted foreground object, for example.

Also, for example, an arrangement may be made wherein the object extracting unit 101 roughly extracts the image objects corresponding to the foreground objects and the image objects corresponding to the background objects based upon the difference between the background images stored in background memory provided therein and the input images.

The movement detecting unit 102 calculates the movement vectors corresponding to the roughly extracted foreground objects by techniques such as block matching, gradation, phase correlation, and pixel recursion, or the like, and provides the calculated movement vectors and movement vector position information (information for specifying the pixel positions corresponding to the movement vectors) to the region specifying unit 103, the mixture ratio calculating unit 104, and the movement blurring adjustment unit 106.

The movement vector output from the movement detecting unit 102 includes information corresponding to a movement amount v.

Also, for example, an arrangement may be made wherein the movement vector per image object is output to the movement blurring adjusting unit 106 with the pixel position information for specifying a pixel with regard to the image object.

The movement amount v is a value which represents the change of position of the image corresponding to the moving object in increments of pixel interval. For example, in the event that the object image corresponding to the foreground moves so as to be displayed at a position four pixels away in the following frame with a given frame as a reference, the movement amount v of the image of the object corresponding to the foreground is 4.

Note that the object extracting unit 101 and the movement detecting unit 102 are needed in the event of adjusting the movement blurring amount corresponding to the moving objects.

The region specifying unit 103 classifies each of pixels of the input images into one of foreground region, background region, or mixed region, and the information (which is called region information hereafter) which indicates which of the foreground region, background region, or mixed region, each pixel belongs to, is provided to the mixture ratio calculation unit 104, the foreground/background separating unit 105, and the movement blurring adjusting unit 106.

The mixture ratio calculating unit 104 calculates the mixture ratio corresponding to the pixels contained in the mixed region 63 (which will be referred to as mixture ratio α hereafter) based upon the input image, the movement vector and the position information thereof supplied from the movement detecting unit 102, and the region information supplied from the region specifying unit 103, and supplies the calculated mixed ratio corresponding to the pixels contained in the mixed region to the foreground/background separating unit 105.

The mixture ratio α is a value which represents the ratio of the image component corresponding to the background object (which will also be referred to as background component hereafter) with the pixel value as indicated in Expression (3) described below.

The foreground/background separating unit 105 separates the input images into foreground component images which consist of only the image components corresponding to the foreground object (which will also be referred to as the foreground component hereafter) and background component images which consist of only the background components based upon the region information supplied from the region specifying unit 103 and the mixture ratio α supplied from the mixture ratio calculating unit 104, and supplies the foreground component images to the movement blurring adjustment unit 106 and a selection unit 107. Note that an arrangement may be made wherein the separated foreground component images are made to be the final output. Accurate foregrounds and backgrounds can be obtained as compared with conventional methods wherein only the foregrounds and backgrounds are specified and separated without taking the mixed region into consideration.

The movement blurring adjustment unit 106 decides the increment of processing, which indicates one or more pixels included in the foreground component images, based upon the movement amount v which is led from the movement vector, and the region information. An increment of processing is the data which designates one group of the pixels which are the object for adjustment processing for the movement blurring value.

The movement blurring adjustment unit 106 adjusts the movement blurring amounts contained in the foreground component images, such as removing, reducing, or increasing the movement blurring amounts contained in the foreground component images, based upon the movement blurring adjustment amounts input to the signal processing device, the foreground component images provided from the foreground/background separation unit 105, and the movement vectors, position information thereof, and processing increments, provided from the movement detection unit 102, and outputs the foreground component image which has been subjected to adjustment of the movement blurring amount to the selection unit 107. An arrangement may be made wherein the movement vectors and the position information are not used.

The selection unit 107 selects one of the foreground component images supplied from the foreground/background separation unit 105 or foreground component images which has been subjected to adjustment of the movement blurring amount, supplied from the movement blurring adjustment unit 106, and outputs the selected foreground component images.

The input images supplied to the signal processing device will now be described, referring to FIG. 3 through FIG. 18.

FIG. 3 is a diagram which describes image-taking by a sensor. The sensor comprises a CCD video camera or the like, for example, including a CCD (Charge-Coupled Device) area sensor which is a solid-state image-taking device. An object 111 corresponding to the foreground in the real world moves between an object 112 corresponding to the background in the real world, and the sensor, for example, from the left side to the right side horizontally in the drawing.

The sensor takes images of the object 111 corresponding to the foreground with the object 112 corresponding to the background. The sensor outputs the taken images in increments of one frame. For example, the sensor outputs images of 30 frames per second. In this case, the exposure period of the sensor is 1/30 seconds. The exposure period represents a period from the sensor beginning conversion of input light into electric charges, up to the end of conversion of input light to electric charges. The exposure period is also called a shutter period hereafter.

Figure 4:
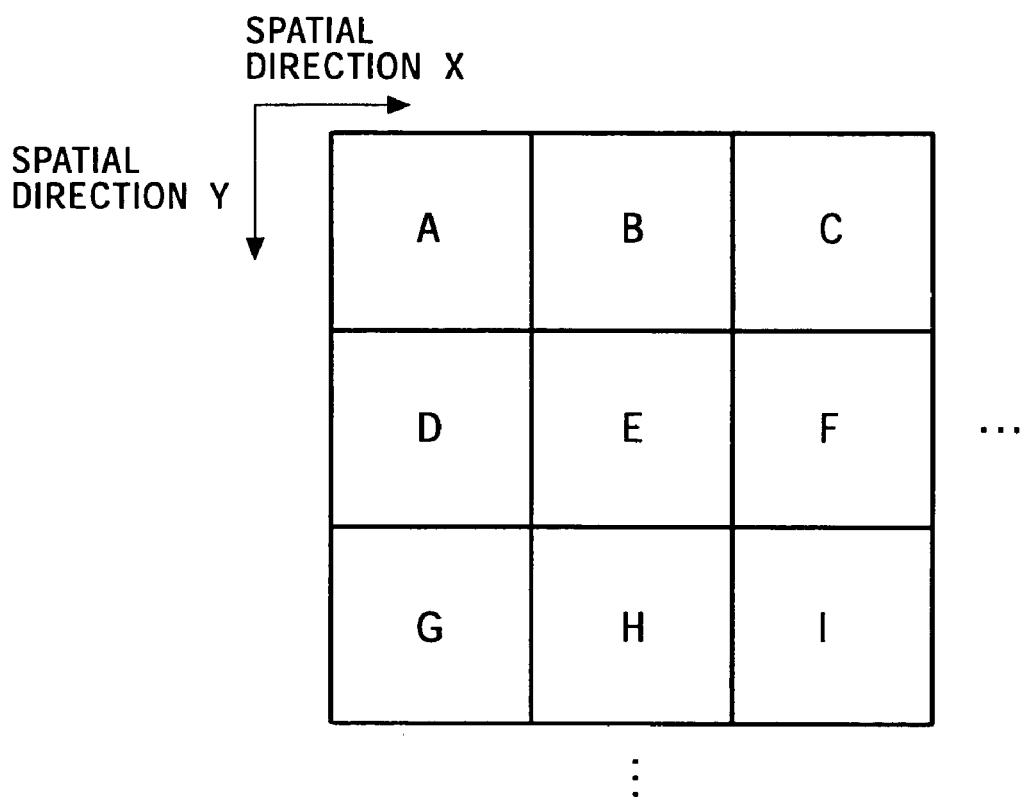
FIG. 4 is a diagram describing an arrangement of pixels.

FIG. 4 is a diagram which describes an arrangement of pixels. In FIG. 4, A through I denote individual pixels. These pixels are arranged on a plane corresponding to the image.

One detecting element corresponding to one pixel is disposed on the sensor. Upon the sensor taking images, one detecting element outputs pixel values corresponding to one pixel which makes up the image. For example, a position in the X direction of the detecting elements corresponds to a position in the horizontal direction on the image, and a position in the Y direction of the detecting elements corresponds to a position in the vertical direction on the image.

Figure 5:
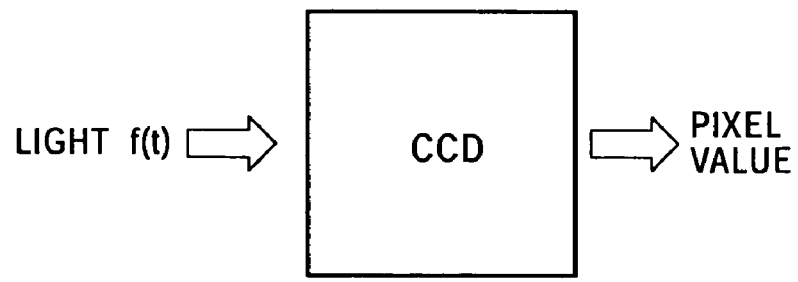
FIG. 5 is a diagram describing operation of a detecting device.

As shown in FIG. 5, for example, the detecting element of the CCD converts the input light into charges for a period corresponding to the shutter period, and accumulates the converted charges. The quantity of charges is approximately proportional to the strength of the input light and the period during which the light is input. The detecting element adds the charges converted from the input light to the accumulated charges in the period corresponding to the shutter period. That is to say, the detecting element integrates the input light during the period corresponding to the shutter period, and accumulates the amount of charges corresponding to the integrated light. It can also be said that the detecting element has integrating effects with regard to time.

The charges accumulated in the detecting element are converted into a voltage value by a circuit not shown in the drawings, which is further converted to pixel values such as digital data or the like, and is output. Accordingly, individual pixel values output from a sensor have values projected in one-dimensional space, which is from a result wherein a given portion having a spatial extension of the object corresponding to the foreground or the background, is integrated for the shutter period.

The signal processing device extracts valid information buried in output signals due to such accumulation operations of the sensor, such as the mixture ratio α, for example. The signal processing device adjusts the distortion amounts occurring due to the mixture of the foreground image objects themselves, such as movement blurring amounts. Also, the signal processing device adjusts the distortion amounts which occur due to mixture of the foreground image objects and the background image objects.

Figure 6A:
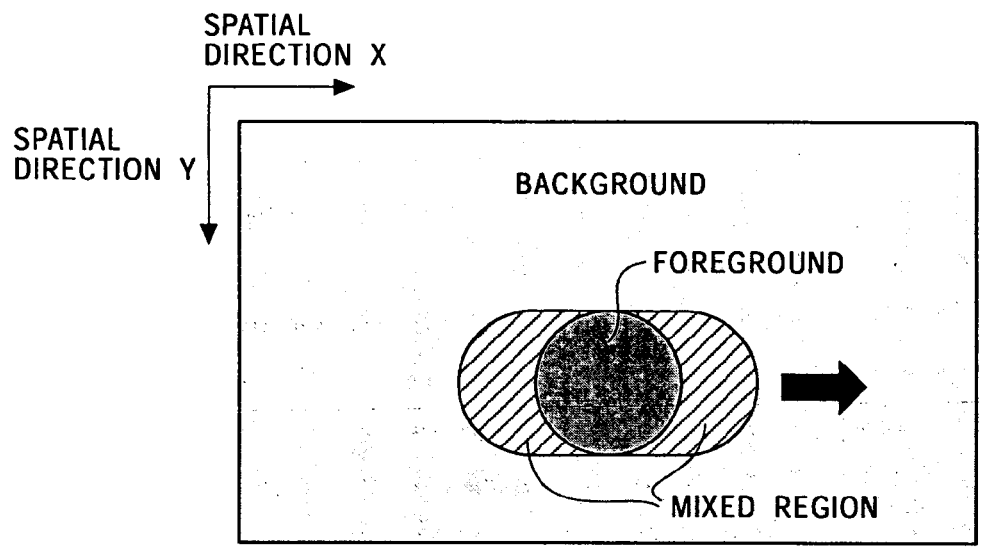
FIG. 6A is a diagram describing an image obtained by taking an image of an object corresponding to a moving foreground, and an object corresponding to a still background.

FIG. 6A shows an image which is obtained by taking images of the object corresponding to the foreground with motion, and the object corresponding to the still object. With the example illustrated in FIG. 6A, the object corresponding to the foreground moves from the left to the right horizontally on the screen.

Figure 6B:
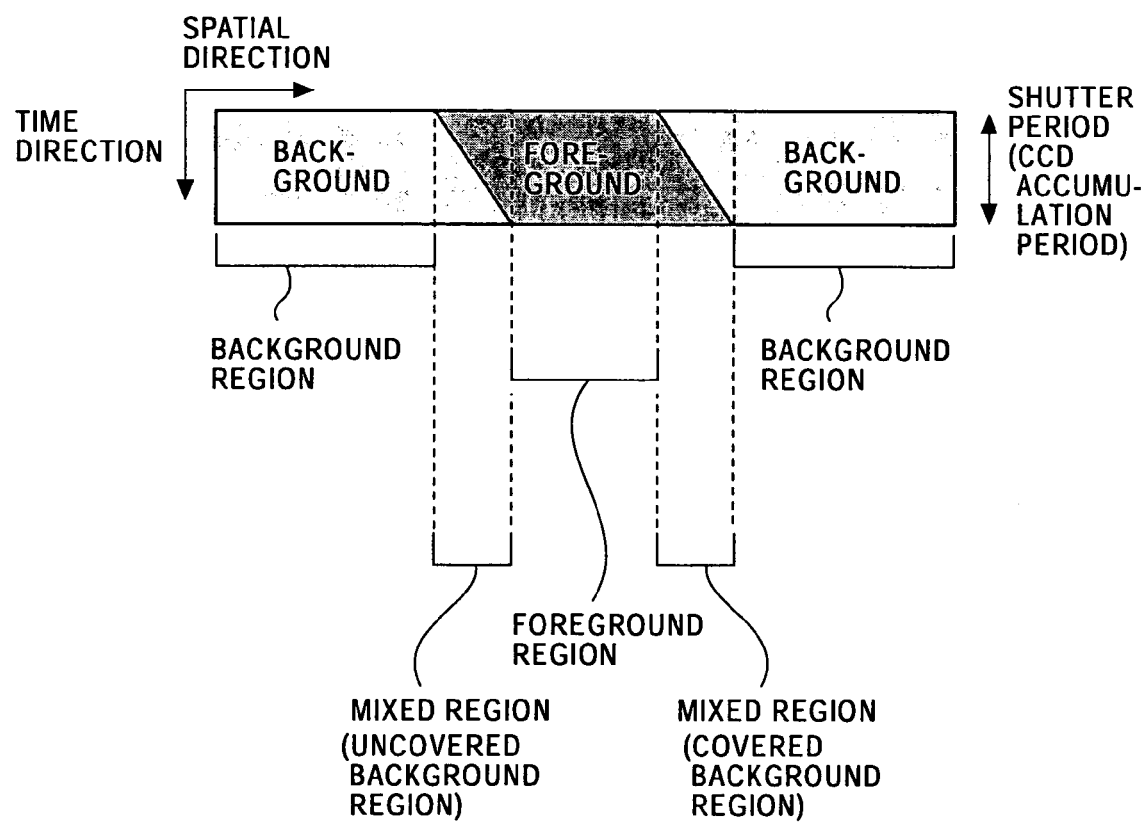
FIG. 6B is a diagram describing a model diagram of an image obtained by taking an image of an object corresponding to a moving foreground, and an object corresponding to a still background.

FIG. 6B is a model diagram wherein pixel values corresponding to one line of the image shown in FIG. 6A develop over the time direction. The horizontal direction in FIG. 6B corresponds to the spatial X direction in FIG. 6A.

The pixels in the background regions are made up of only the background components, i.e., the image components corresponding to the background objects. The pixels in the foreground regions are made up of only the foreground components, i.e., the image components corresponding to the foreground objects.

The pixel values of pixels in mixed regions are made up of the background components and the foreground components. Since the pixels in the mixed region consists of the background components and the foreground components, the mixed region can also be said to be a distortion region. The mixed regions are further classified into covered background regions and uncovered background regions.

The covered background region is a mixed region at a position corresponding to a leading portion in the progress direction of the foreground object with regard to the foreground region, and accordingly is a region wherein the background components are covered by the foreground corresponding to elapsing of time.

Conversely, the uncovered background region is a mixed region at a position corresponding to a trailing portion in the progress direction of the foreground object with regard to the foreground region, and accordingly is a region wherein the background components emerge corresponding to elapsing of time.

As described above, images including the foreground region, background region, covered background region, or uncovered background region, are input as input images to the region specifying unit 103, the mixture ratio calculating unit 104, and the foreground/background separation unit 105.

Figures 7, 8:
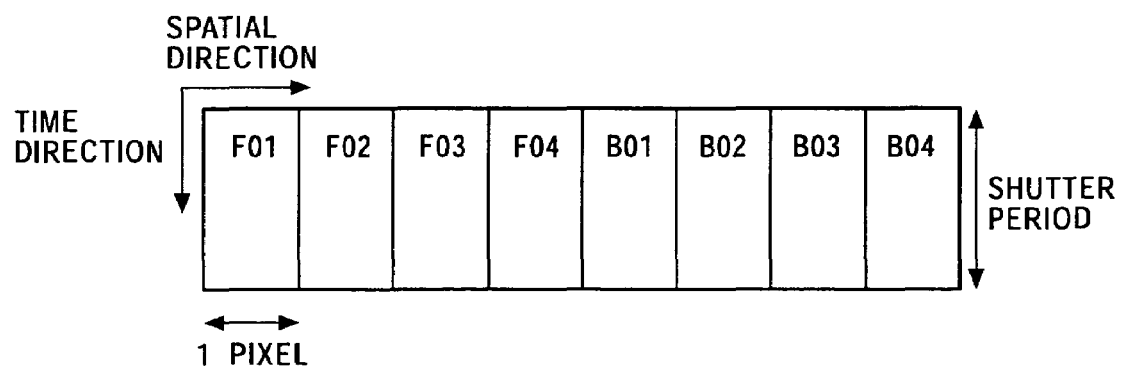
FIG. 7 is a diagram describing background region, foreground region, mixed region, covered background region, and uncovered background region.
FIG. 8 is a model diagram which develops, over the time direction, the pixel values of pixels adjacently arrayed in one row, in an image wherein an object corresponding to a still foreground and an object corresponding to a still background are subjected to image-taking.

FIG. 7 is a diagram which describes the background region, foreground region, mixed region, covered background region, and uncovered background region, as described above. In the event of corresponding to the images shown in FIG. 6, the background region is the still portion, the foreground region is the moving portion, the covered background region of the mixed region is the portion which changes from the background to the foreground, and the uncovered background region of the mixed region is the portion which changes from the foreground to the background.

FIG. 8 is a model diagram wherein pixel values of the pixels arrayed adjacently in one line in the image that has been taken of the objects corresponding to the still foregrounds and the objects corresponding to the still backgrounds, develop over the time direction. For example, pixels arrayed in one line in a screen may be selected, as pixels adjacently arrayed in one line.

The pixel values F01 through F04 shown in FIG. 8 are pixel values of pixels corresponding to the still foreground object. The pixel values B01 through B04 shown in FIG. 8 are pixel values of pixels corresponding to the still background object.

The vertical direction in FIG. 8 represents elapsing of time from the top to the bottom in the drawing. The position of the upper side of the rectangle in FIG. 8 corresponds to the time at which the sensor begins conversion of the input light into charges, and the position of the lower side of the rectangle in FIG. 8 corresponds to the time at which the sensor ends the conversion of the input light into charges. That is to say, the distance from the upper side to the lower side of the rectangle in FIG. 8 corresponds to the shutter period.

An arrangement wherein the shutter period equals the frame interval will now be described below, by way of an example.

The horizontal direction in FIG. 8 corresponds to the spatial direction X as described in FIG. 6. More particularly, shown by way of an example in FIG. 8, the distance from the left side of the rectangle denoted by "F01" to the right side of the rectangle denoted by "B04", is eight times long as the pixel pitch, that is to say, corresponds to the interval of eight continuous pixels.

In the event that the foreground objects and the background objects keep still, the light input to the sensor is not altered during the period corresponding to the shutter period.

Now, the period corresponding to the shutter period is divided into two or more periods of equal length. For example, in the event that the virtual dividing number is 4, the model diagram shown in FIG. 8 can be represented by the model diagram shown in FIG. 9. The virtual dividing number is set corresponding to the movement amount v or the like of the object corresponding to the foreground within the shutter period. For example, corresponding to the movement amount v of 4, the virtual dividing number is 4, and the period corresponding to the shutter period is divided into 4 periods.

The uppermost row in the drawing corresponds to the first of the divided periods from the shutter being opened. The second row from the top in the drawing corresponds to the second of the divided periods from the shutter being opened. The third row from the top in the drawing corresponds to the third of the divided periods from the shutter being opened. The fourth row from the top in the drawing corresponds to the fourth of the divided periods from the shutter being opened.

The divided shutter period corresponding to the moving amount v is also called a shutter period/v hereafter.

In the event that the object corresponding to the foreground keeps still, the foreground component F01/v equals the value in which the pixel value F01 is divided by the virtual dividing number, since the light input to the sensor is not altered. Similarly, in the event that the object corresponding to the foreground keeps still, the foreground component F02/v equals the value of the pixel value F02 being divided by the virtual dividing number, the foreground component F03/v equals the value of the pixel value F03 being divided by the virtual dividing number, and the foreground component F04/v equals the value of the pixel value F04 being divided by the virtual dividing number.

In the event that the object corresponding to the background keeps still, the background component B01/v equals the value of the pixel value B01 being divided by the virtual dividing number, since the light input to the sensor is not altered. Similarly, in the event that the object corresponding to the background keeps still, the background component B02/v equals the value of the pixel value B02 being divided by the virtual dividing number, B03/v equals the value of the pixel value B03 being divided by the virtual dividing number, and B04/v equals the value of the pixel value B04 being divided by the virtual dividing number.

That is to say, in the event that the object corresponding to the foreground keeps still, the foreground component F01/v corresponding to the first shutter period/v from the shutter opening, the foreground component F01/v corresponding to the second shutter period/v from the shutter opening, the foreground component F01/v corresponding to the third shutter period/v from the shutter opening, and the foreground component F01/v corresponding to the fourth shutter period/v from the-shutter opening, are the same value, since the light corresponding to the foreground object which is input to the sensor is not altered during the period corresponding to the shutter period. F02/v through F04/v have the same relationship as F01/v.

In the event that the object corresponding to the background keeps still, the background component B01/v corresponding to the first shutter period/v from the shutter opening, the background components B01/v corresponding to the second shutter period/v from the shutter opening, the background components B01/v corresponding to the third shutter period/v from the shutter opening, and the background components B01/v corresponding to the fourth shutter period/v from the shutter opening, are the same value, since the light corresponding to the background object which is input to the sensor is not altered during the period corresponding to the shutter period. B02/v through B04/v have the same relationship as B01/v.

A case will now be described wherein the object corresponding to the foreground moves while the object corresponding to the background keeps still.

FIG. 10 is a model diagram wherein pixel values of the pixels on one line including the covered background region develop over the time direction in the event that the object corresponding to the foreground moves towards the right side in the drawing. In FIG. 10, the movement amount v of the foreground is 4. Since one frame is a short period, an assumption may be made that the object corresponding to the foreground is a rigid body, and moves at a constant velocity. In FIG. 10, the object image corresponding to the foreground moves so as to be displayed at a position four pixels to the right in the following frame, with reference to a given frame.

In FIG. 10, the left-most pixel through the fourth pixel from the left, belong to the foreground region. In FIG. 10, the fifth through the seventh pixels from the left belong to the covered background region of the mixed region. In FIG. 10, the right-most pixel belongs to the background region.

Since the object corresponding to the foreground moves so as to hide the object corresponding to the background with elapsing of time, the components contained in the pixel values of the pixels which belong to the covered background region change from the background components to the foreground components at a certain point of the period corresponding to the shutter period.

For example, the pixel value M shown with a heavy frame in FIG. 10, is represented by Expression (1).

$$M = B02/v + B02/v + F07/v + F06/v \qquad (1)$$

For example, since the fifth pixel from the left includes a background component corresponding to one shutter period/v and foreground components corresponding to the three shutter period/vs, the mixture ratio α of the fifth pixel from the left is 1/4. Since the sixth pixel from the left includes background components corresponding to the two shutter period/vs and two foreground components corresponding to the two shutter period/vs, the mixture ratio α of the sixth pixel from the left is 1/2. Since the seventh pixel from the left includes background components corresponding to the three shutter period/vs and a foreground component corresponding to the one shutter period/v, the mixture ratio α of the seventh pixel from the left is 3/4.

Since an assumption may be made that the object corresponding to the foreground is a rigid body and the foreground image moves at a constant velocity so as to be displayed at a position four pixels to the right in the following frame, the foreground component F07/v of the first shutter period/v from the shutter opening of the fourth pixel from the left in FIG. 10, for example, equals the foreground component corresponding to the second shutter period/v from the shutter opening of the fifth pixel from the left in FIG. 10. Similarly, the foreground component F07/v equals the foreground component corresponding to the third shutter period/v from the shutter opening of the sixth pixel from the left in FIG. 10, and the foreground component corresponding to the fourth shutter period/v from the shutter opening of the seventh pixel from the left side in FIG. 10, respectively.

Since an assumption may be made that the object corresponding to the foreground is a rigid body and that the foreground image moves at a constant velocity so as to be displayed at a point four pixels to the right in the following frame, the foreground component F06/v of the first shutter period/v from the shutter opening of the third pixel from the left in FIG. 10, for example, equals the foreground component corresponding to the second shutter period/v from the shutter opening of the fourth pixel from the left in FIG. 10. Similarly, the foreground component F06/v equals the foreground component corresponding to the third shutter period/v from the shutter opening of the fifth pixel from the left in FIG. 10, and the foreground component corresponding to the fourth shutter period/v from the shutter opening of the sixth pixel from the left in FIG. 10, respectively.

An assumption may be made that since the object corresponding to the foreground is a rigid body and the foreground image moves at a constant velocity so as to be displayed at a position four pixels to the right in the following frame, the foreground component F05/v of the first shutter period/v from the shutter opening of the second pixel from the left in FIG. 10, for example, equals the foreground component corresponding to the second shutter period/v from the shutter opening of the third pixel from the left in FIG. 10. Similarly, the foreground component F05/v equals the foreground component corresponding to the third shutter period/v from the shutter opening of the fourth pixel from the left in FIG. 10, and the foreground component corresponding to the fourth shutter period/v from the shutter opening of the fifth pixel from the left in FIG. 10, respectively.

Since an assumption may be made that the object is a rigid body and the foreground image moves at a constant velocity so as to be displayed at a position four pixels to the right in the following frame, the foreground component F04/v corresponding to the first shutter period/v from the shutter opening of the left-most pixel in FIG. 10, for example, equals the foreground component corresponding to the second shutter period/v from the shutter opening of the second pixel from the left in FIG. 10. Similarly, the foreground component F04/v equals the foreground component corresponding to the third shutter period/v from the shutter opening of the third pixel from the left in FIG. 10, and the foreground component corresponding to the fourth shutter period/v from the shutter opening of the fourth pixel from the left in FIG. 10, respectively.

As described above, the foreground region corresponding to the moving object includes movement blurring, so this can be said to be a distorted region.

Figure 11:
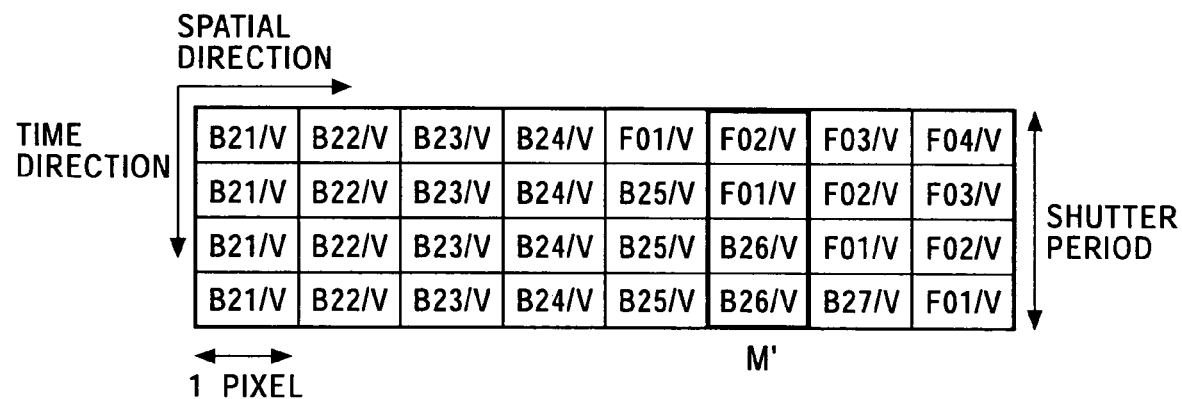
FIG. 11 is a model diagram wherein the pixel values are developed over the time direction, and periods corresponding to shutter time are divided.

FIG. 11 is a model diagram wherein the pixel values of the pixels on one line including the uncovered background region develop over the time direction in the event that the foreground moves toward the right side in the drawing. In FIG. 11, the movement amount v of the foreground is 4. Since one frame is a short time, an assumption may be made that the object corresponding to the foreground is a rigid body, and moves at a constant velocity. In FIG. 11, the object image corresponding to the foreground moves to the right side by four pixels in the following frame with reference to a given frame.

In FIG. 11, the left-most pixel through the fourth pixel from the left, belong to the background region. In FIG. 11, the fifth through the seventh pixels from the left belong to the mixed region of the uncovered background. In FIG. 11, the right-most pixel belongs to the foreground region.

Since the object corresponding to the foreground which has hidden the object corresponding to the background moves so as to be removed from the front of the object corresponding to the background with elapsing of time, the components included in the pixel values of the pixels which belong to the uncovered background region change from the foreground components to the background components at a certain point in the period corresponding to the shutter period.

For example, the pixel value M' indicated with a heavy frame in FIG. 11, is represented by Expression (2).

$$M' = F02/v + F01/v + B26/v + B26/v \quad (2)$$

For example, since the fifth pixel from the left includes the background components corresponding to the three shutter period/vs, and the foreground component corresponding to the one shutter period/v, the mixture ratio α of the fifth pixel from the left is 3/4. Since the sixth pixel from the left includes the background components corresponding to the two shutter period/vs and the foreground components corresponding to the two shutter period/vs, the mixture ratio α of the sixth pixel from the left is 1/2. Since the seventh pixel from the left includes the background component corresponding to the one shutter period/v and the foreground components corresponding to the three shutter period/vs, the mixture ratio α of the seventh pixel from the left is 1/4.

Further generalizing Expression (1) and Expression (2), the pixel value M is represented by Expression (3).

$$M = \alpha \cdot B + \sum_i Fi/v \quad (3)$$

Here, α denotes the mixture ratio. B denotes the pixel value of the background, and Fi/V denotes the foreground component.

Since an assumption may be made that the object corresponding to the foreground is a rigid body and moves at a constant velocity, and the movement amount v is 4, for example, the foreground component F01/v of the first shutter period/v from the shutter opening of the fifth pixel from the left in FIG. 11 equals the foreground component corresponding to the second shutter period/v from the shutter opening of the sixth pixel from the left in FIG. 11. Similarly, F01/v equals the foreground component corresponding to the third shutter period/v from the shutter opening of the seventh pixel from the left in FIG. 11, and the foreground component corresponding to the fourth shutter period/v from the shutter opening of the eighth pixel from the left in FIG. 11, respectively.

Since an assumption may be made that the object corresponding to the foreground is a rigid body and moves at a constant velocity, and the virtual dividing number is 4, the foreground component F02/v of the first shutter period/v from the shutter opening of the sixth pixel from the left in FIG. 11, for example, equals the foreground component corresponding to the second shutter period/v from the shutter opening of the seventh pixel from the left in FIG. 11. Similarly, the foreground component F02/v equals the foreground component corresponding to the third shutter period/v from the shutter opening of the eighth pixel from the left in FIG. 11.

Since an assumption may be made that the object corresponding to the foreground is an rigid body and moves at a constant velocity, and movement amount v is 4, the foreground component F03/v of the first shutter period/v from the shutter opening of the seventh pixel from the left in FIG. 11, for example, equals the foreground component corresponding to the second shutter period/v from the shutter opening of the eighth pixel from the left in FIG. 11.

While a description has been made in the description of FIG. 9 through FIG. 11 wherein the virtual dividing number is 4, the virtual dividing number corresponds to the movement amount v. The movement amount v generally corresponds to the movement velocity of the object corresponding to the foreground. For example, in the event that the object corresponding to the foreground moves so as to be displayed at a position four pixels to the right in the following frame with reference to a given frame, the movement amount v is 4. The virtual dividing number is 4 corresponding to the movement amount v. Similarly, for example, in the event that the object corresponding to the foreground moves so as to be displayed at a position six pixels to the left in the following frame with reference to a given frame, the movement amount v is 6, and the virtual dividing number is 6.

Figure 12:
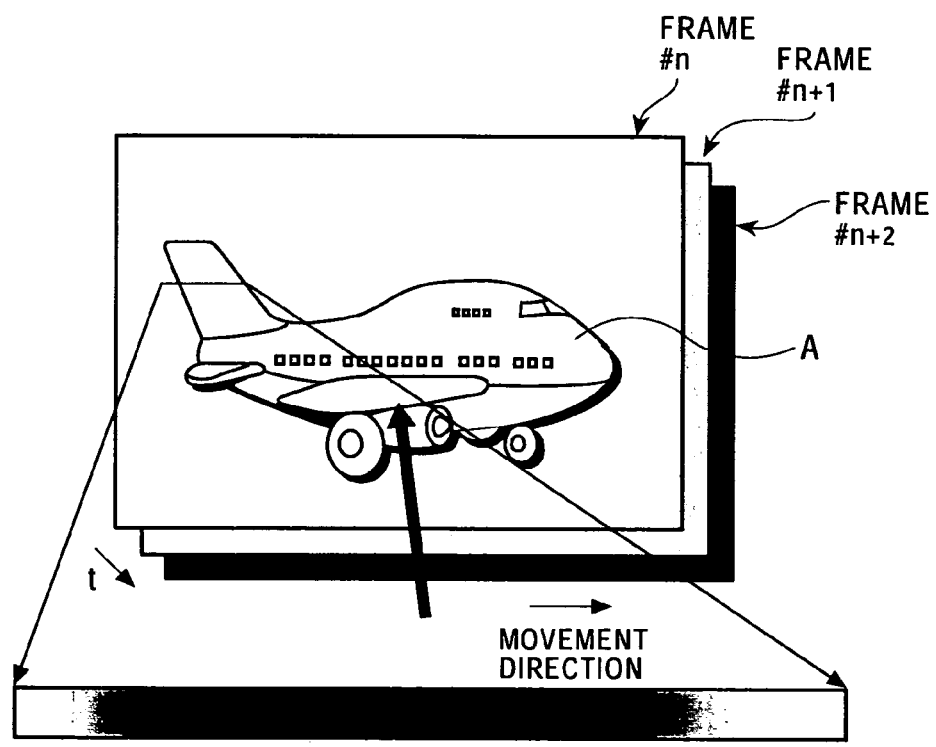
FIG. 12 is a diagram illustrating an example of extracting pixels of the foreground region, background region, and mixed region.
Figure 13:
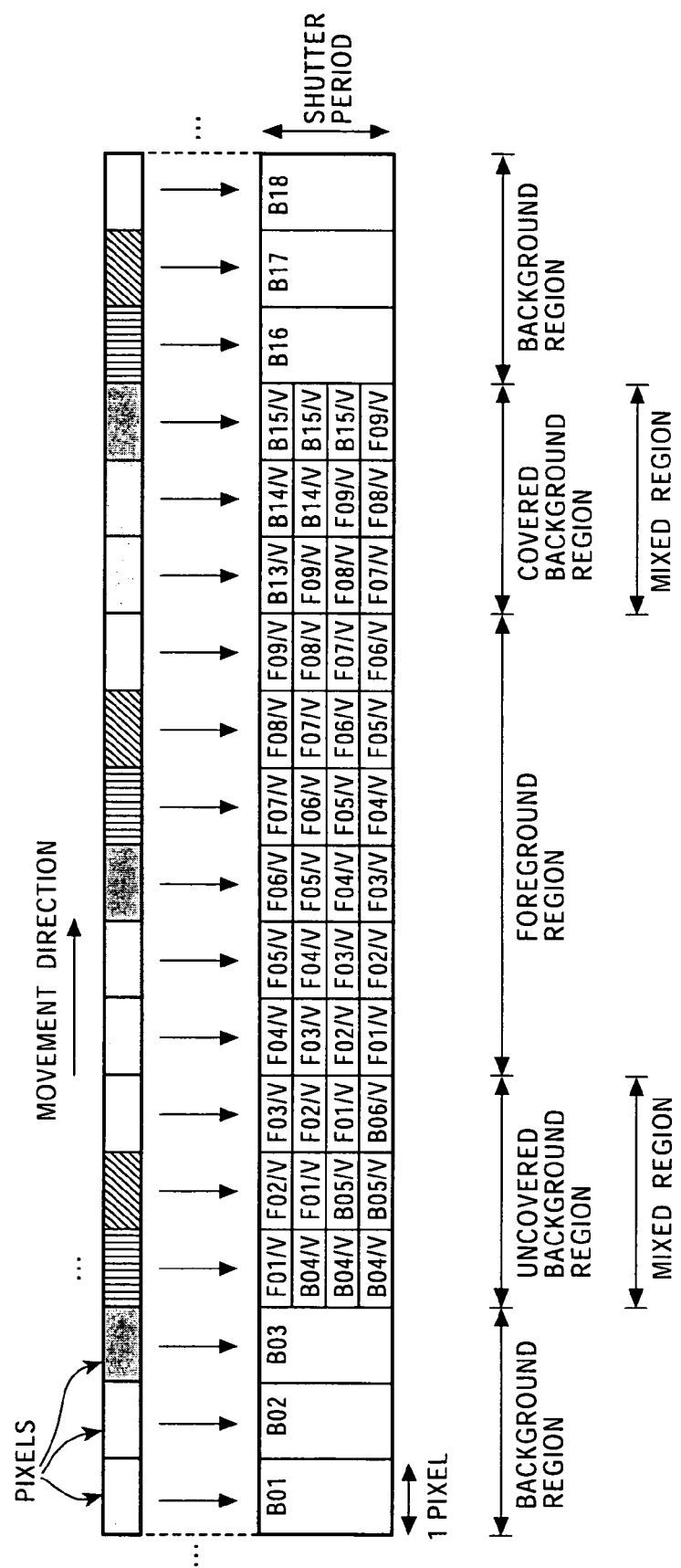
FIG. 13 is a diagram illustrating how pixels correspond to a model wherein pixel values are developed over the time direction.

FIG. 12 and FIG. 13 illustrate the relationship between the foreground region, the background region, and the mixed region which consists of the covered background region and the uncovered background region, and the foreground components and the background components, corresponding to the divided shutter period.

FIG. 12 illustrates an example wherein the pixels of the foreground region, the background region, and the mixed region, are extracted from the image including the foreground corresponding to the object which moves in front of the still background. In an example shown in FIG. 12, the object corresponding to the foreground denoted by A moves horizontally on the screen.

The frame #n+1 is the frame following the frame #n, and the frame #n+2 is the frame following the frame #n+1.

FIG. 13 illustrates a model wherein the pixels of the foreground region, the background region, and the mixed region are extracted from one of frame #n through frame #n+2, and the pixel values of the extracted pixels are developed over the time direction, the movement amount v at 4.

Since the object corresponding to the foreground moves, the pixel values of the foreground region consist of four different foreground components corresponding to the period of shutter period/v. For example, the left-most pixel of the pixels of the foreground region shown in FIG. 13 consists of F01/v, F02/v, F03/v, and F04/v. That is to say, the pixels of the foreground region include movement blurring.

Since the object corresponding to the background keeps still, the light corresponding to the background input to the sensor is not altered during the period corresponding to the shutter period. In this case, the pixel values of the background region do not contain movement blurring.

The pixel value of the pixel which belongs to the mixed region made up of the covered background region or the uncovered background region consists of the foreground components and the background components.

Next, a model will be described wherein, in the event that the image corresponding to the object moves, the pixel values of the pixels which are arrayed adjacently in a single line on multiple frames, and at the same position in the frames, develop over the time direction. For example, in the event that the image corresponding to the object moves horizontally on the screen, the pixels arrayed in a single line can be selected as pixels arrayed adjacently in a single line.

Figure 14:
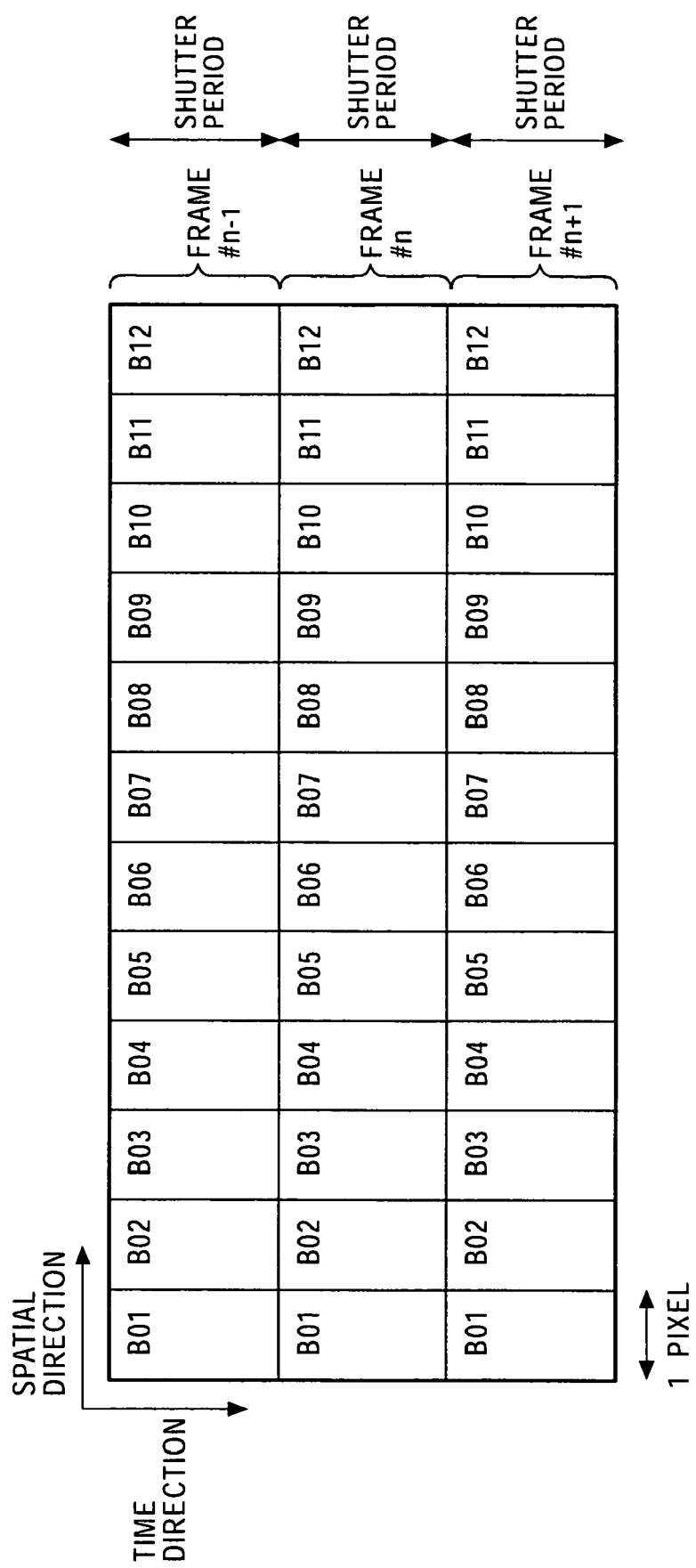
FIG. 14 is a model diagram wherein the pixel values are developed over the time direction, and periods corresponding to shutter time are divided.

FIG. 14 is a model diagram wherein the pixels arrayed adjacently in a single line on three frames of images which are taken of the object corresponding to the still background, and are at the same position in the frames, develop over the time direction. The frame #n is the frame following the frame #n-1, and the frame #n+1 is the frame following the frame #n. Other frames are denoted in the same way.

The pixel values of the B01 through B12 shown in FIG. 14 are the pixel values of the pixels corresponding to the object of the still background. Since the object corresponding to the background keeps still, the pixel values of the corresponding pixels do not change in the frame #n-1 through the frame #n+1. For example, the pixels in the frame #n and the pixels in the frame #n+1 at the position corresponding to the pixel having a pixel value B05 in the frame n-1, have a pixel value B05, respectively.

Figure 15:
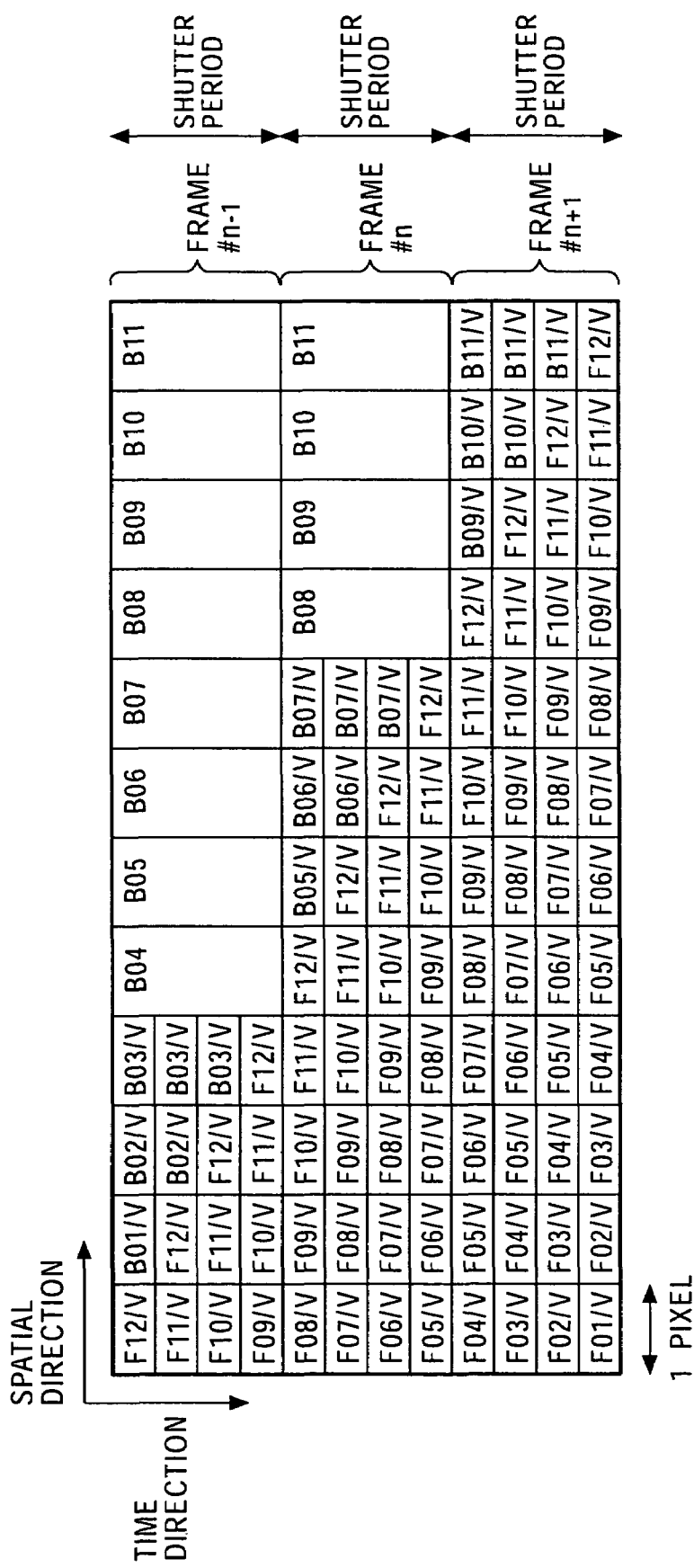
FIG. 15 is a model diagram wherein the pixel values are developed over the time direction, and periods corresponding to shutter time are divided.

FIG. 15 is a model diagram wherein the pixel values of pixels arrayed adjacently in a single line on three frames of images taken of the object corresponding to the foreground which moves to the right side in the drawing with the object corresponding to the still background, and at the same position in the frames, develop over the time direction. The models shown in FIG. 15 includes the covered background region.

Since an assumption may be made in FIG. 15 that the object corresponding to the foreground is a rigid body and moves at a constant velocity, and the foreground image moves so as to be displayed at a position four pixels to the right side in the following frame, the foreground movement amount v is 4, and the virtual dividing number is 4.

For example, the foreground component of the first shutter period/v from the shutter opening of the left-most pixel of the frame #n-1 in FIG. 15 is F12/v, the foreground component of the second shutter period/v from the shutter opening of the second pixel from the left in FIG. 15 is also F12/v. The foreground component of the third shutter period/v from the shutter opening of the third pixel from the left in FIG. 15, and the foreground component of the fourth shutter period/v from the shutter opening of the fourth pixel from the left in FIG. 15, are F12/v.

The foreground component of the second shutter period/v from the shutter opening of the left-most pixel in the frame #n-1 in FIG. 15 is F11/v, and the foreground component of the third shutter period/v from the shutter opening of the second pixel from the left in FIG. 15 is also F11/v. The foreground component of the fourth shutter period/v from the shutter opening of the third pixel from the left in FIG. 15 is F11/v.

The foreground component of the third shutter period/v from the shutter opening of the left-most pixel in the frame #n-1 in FIG. 15 is F10/v, and the foreground component of the fourth shutter period/v from the shutter opening of the second pixel from the left in FIG. 15 is also F10/v. The foreground component of the fourth shutter period/v from the shutter opening of the left-most pixel in the frame #n-1 in FIG. 15 is F09/v.

Since the object corresponding to the background keeps still, the background component of the first shutter period/v from the shutter opening of the second pixel from the left in the frame #n-1 in FIG. 15 is B01/v. The background components of the first and second shutter period/vs from the shutter opening of the third pixel from the left in the frame #n-1 in FIG. 15 are B02/v. The background components of the first through third shutter period/vs from the shutter opening of the fourth pixel from the left in the frame #n-1 in FIG. 15 are B03/v.

In the frame #n-1 in FIG. 15, the left-most pixel belongs to the foreground region, and the second through fourth pixels from the left belong to the mixed region of the covered background region.

The fifth through twelfth pixels from the left in the frame #n-1 in FIG. 15 belong to the background region, and the pixel values thereof are F04 through F11, respectively.

The first through fifth pixels from the left in the frame #n in FIG. 15 belong to the foreground region. The foreground component of the shutter period/v in the foreground region in the frame #n, is one of F05/v through F12/v.

Since an assumption may be made that the object corresponding to the foreground is a rigid body and moves at a constant velocity, and the foreground image moves so as to be displayed at a position four pixels to the right side in the following frame, the foreground component of the first shutter period/v from the shutter opening of the fifth pixel from the left in the frame #n in FIG. 15 is F12/v, the foreground component of the second shutter period/v from the shutter opening of the sixth pixel from the left in FIG. 15 is also F12/v. The foreground component of the third shutter period/v from the shutter opening of the seventh pixel from the left in FIG. 15, and the foreground component of the fourth shutter period/v from the shutter opening of the eighth pixel from the left in FIG. 15, are F12/v.

The foreground component of the second shutter period/v from the shutter opening of the fifth pixel from the left in the frame #n in FIG. 15 is F11/v, and the foreground component of the third shutter period/v from the shutter opening of the sixth pixel from the left in FIG. 15 is also F11/v. The foreground component of the fourth shutter period/v from the shutter opening of the seventh pixel from the left in FIG. 15 is F11/v.

The foreground component of the third shutter period/v from the shutter opening of the fifth pixel from the left in the frame #n in FIG. 15 is F10/v, and the foreground component of the fourth shutter period/v from the shutter opening of the sixth pixel from the left in FIG. 15 is also F10/v. The foreground component of the fourth shutter period/v from the shutter opening of the fifth pixel from the left in the frame #n in FIG. 15 is F09/v.

Since the object corresponding to the background keeps still, the background component of the first shutter period/v from the shutter opening of the sixth pixel from the left in the frame #n in FIG. 15 is B05/v. The background components of the first and second shutter period/vs from the shutter opening of the seventh pixel from the left in the frame #n in FIG. 15 are B06/v. The background components of the first through third shutter period/vs from the shutter opening of the eighth pixel from the left in the frame #n in FIG. 15 are B07/v.

In the frame #n in FIG. 15, the sixth through eighth pixels from the left belong to the mixed region of the covered background region.

The ninth through twelfth pixels from the left in the frame #n in FIG. 15 belong to the background region, and the pixel values are B08 through B11, respectively.

The first through ninth pixels from the left in the frame #n+1 in FIG. 15 belong to the foreground region. The foreground region of the shutter period/v in the foreground region in the frame #n+1 is one of F01/v through F12/v.

Since an assumption may be made that the object corresponding to the foreground is a rigid body and moves at a constant velocity, and the foreground image moves so as to be displayed at a position four pixels to the right side in the following frame, the foreground component of the first shutter period/v from the shutter opening of the ninth pixel from the left in the frame #n+1 in FIG. 15 is F12/v, and the foreground component of the second shutter period/v from the shutter opening of the tenth pixel from the left in FIG. 15 is also F12/v. The foreground component of the third shutter period/v from the shutter opening of the eleventh pixel from the left in FIG. 15, and the foreground component of the fourth shutter period/v from the shutter opening of the twelfth pixel from the left in FIG. 15, are F12/v.

The foreground component of the second shutter period/v from the shutter opening of the ninth pixel from the left in the frame #n+1 in FIG. 15 is F11/v, and the foreground component of the third shutter period/v from the shutter opening of the tenth pixel from the left in FIG. 15 is also F11/v. The foreground component of the fourth shutter period/v from the shutter opening of the eleventh pixel from the left in FIG. 15 is F11/v.

The foreground component of the third shutter period/v from the shutter opening of the ninth pixel from the left in the frame #n+1 in FIG. 15 is F10/v, and the foreground component of the fourth shutter period/v from the shutter opening of the tenth pixel from the left in FIG. 15 is F10/v. The foreground component of the fourth shutter period/v from the shutter opening of the ninth pixel from the left in the frame #n+1 in FIG. 15 is F09/v.

Since the object corresponding to the background keeps still, the background component of the first shutter period/v from the shutter opening of the tenth pixel from the left in the frame #n+1 in FIG. 15 is B09/v. The background components of the first and second shutter period/vs from the shutter opening of the eleventh pixel from the left in the frame #n+1 in FIG. 15 are B10/v. The background components of the first through third shutter period/vs from the shutter opening of the twelfth pixel from the left in the frame #n+1 in FIG. 15 are B11/v.

In the frame #n+1 in FIG. 15, the tenth through twelfth pixels from the left side correspond to the mixed region which is the covered background region.

Figure 16:
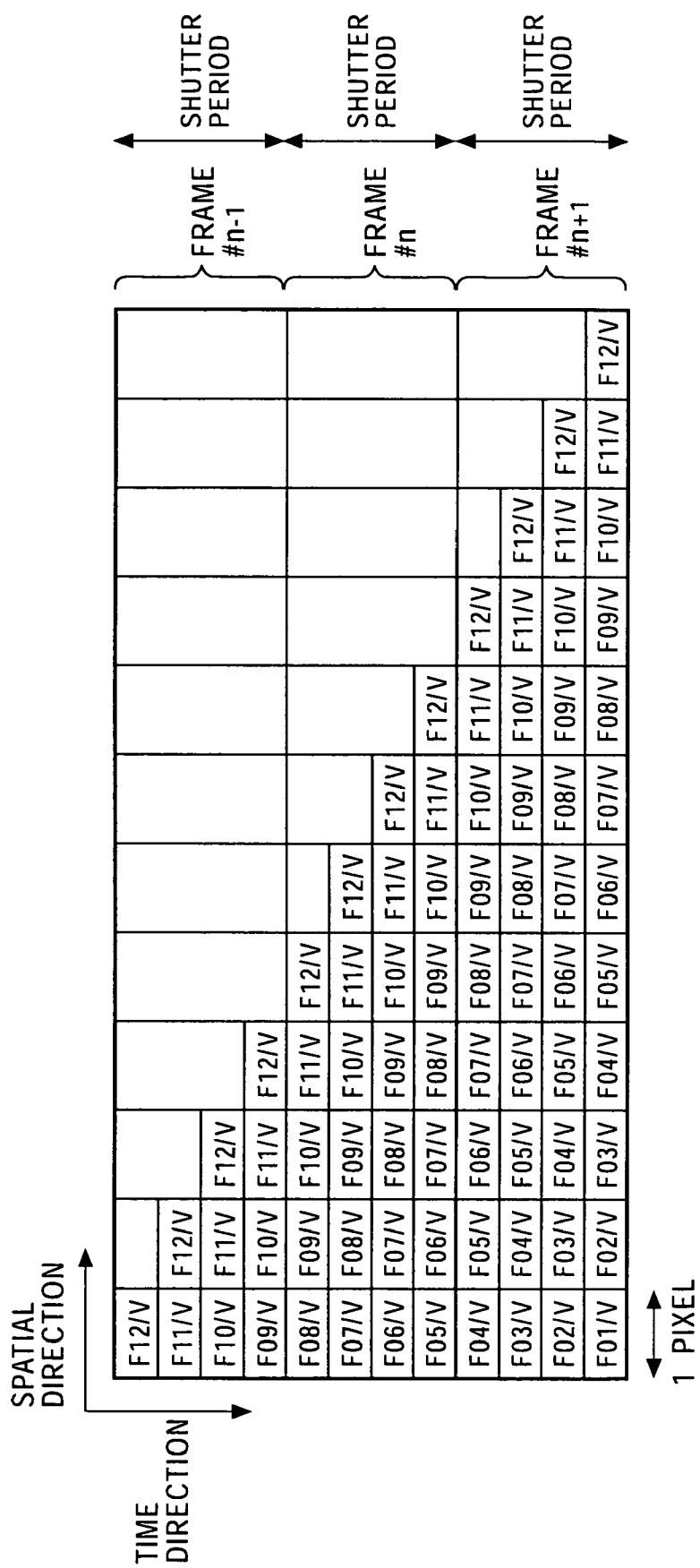
FIG. 16 is a model diagram wherein the pixel values are developed over the time direction, and periods corresponding to shutter time are divided.

FIG. 16 is a model diagram wherein the foreground components are extracted from the pixel values illustrated in FIG. 15.

Figure 17:
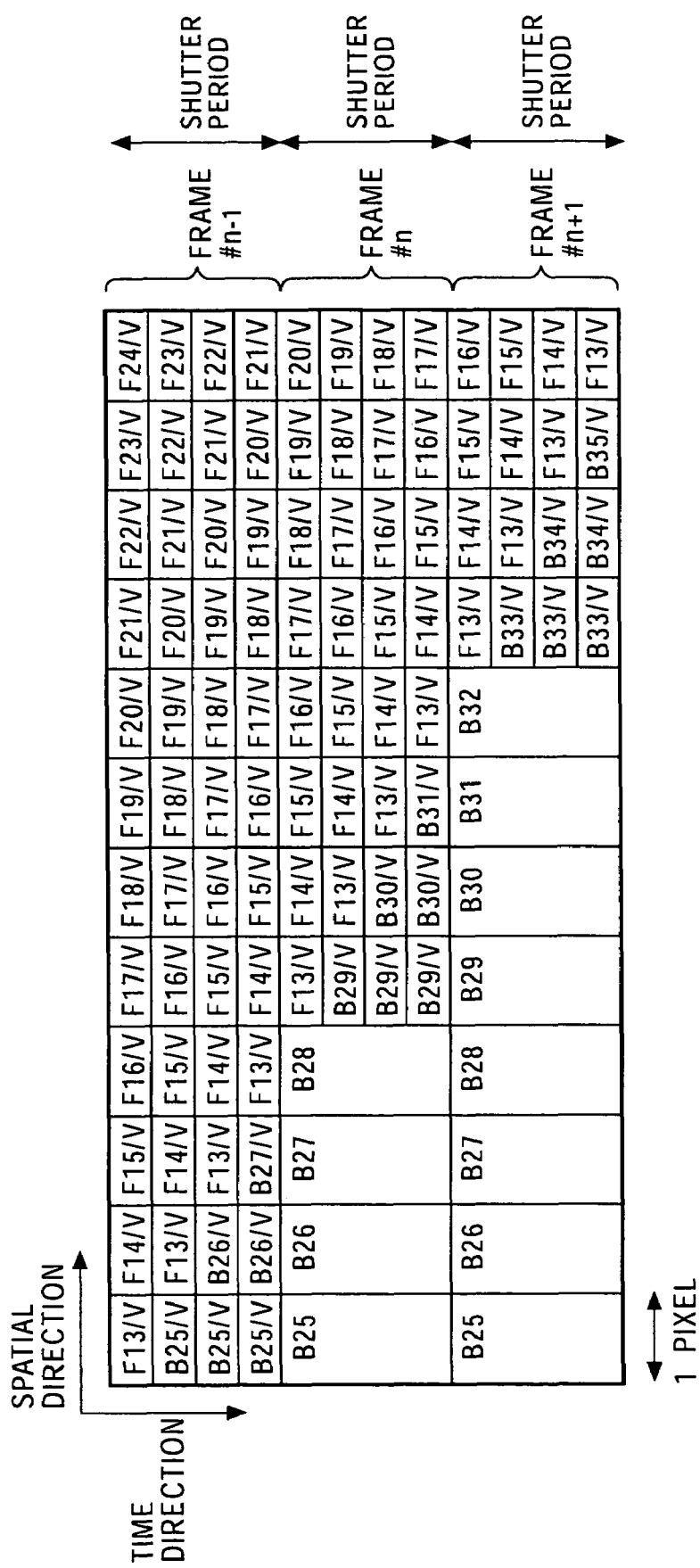
FIG. 17 is a model diagram wherein the pixel values are developed over the time direction, and periods corresponding to shutter time are divided.

FIG. 17 is a model diagram wherein the pixel values of the pixels adjacently arrayed in a row in three frames of the images which are taken of the foreground corresponding to the object which moves to the right side in the drawing with the still background, and are at the same position in the frames, develop over the time direction. In FIG. 17, the model diagram includes the uncovered background region.

In FIG. 17, an assumption may be made that the object corresponding to the foreground is a rigid body, and moves at a constant velocity. Since the object corresponding to the foreground moves so as to be displayed at a position four pixels to the right side in the following frame, the movement amount v is 4.

For example, the foreground component of the first shutter period/v from the shutter opening of the left-most pixel in the frame #n−1 in FIG. 17 is F13/v, and the foreground component of the second shutter period/v from the shutter opening of the second pixel from the left in FIG. 17 is also F13/v. The foreground component of the third shutter period/v from the shutter opening of the third pixel from the left in FIG. 17, and the foreground component of the fourth shutter period/v from the shutter opening of the fourth pixel from the left in FIG. 17, are F13/v.

The foreground component of the first shutter period/v from the shutter opening of the second pixel from the left in the frame #n−1 in FIG. 17 is F14/v, and the foreground component of the second shutter period/v from the shutter opening of the third pixel from the left in FIG. 17 is also F14/v. The foreground component of the first shutter period/v from the shutter opening of the third pixel from the left in FIG. 17 is F15/v.

Since the object corresponding to the background keeps still, the background component of the second through fourth shutter period/vs from the shutter opening of the left-most pixel in the frame #n−1 in FIG. 17 is B25/v. The background component of the third and fourth shutter period/vs from the shutter opening of the second pixel from the left in the frame #n−1 in FIG. 17 are B26/v. The background component of the fourth shutter period/v from the shutter opening of the third pixel from the left in the frame #n−1 in FIG. 17 is B27/v.

In the frame #n−1 in FIG. 17, the left-most pixel through the third pixel belong to a mixed region of the uncovered background region.

The fourth through twelfth pixels from the left in the frame #n−1 in FIG. 17 belong to the foreground region. The foreground component in the frame is one of F13/v through F24/v.

The left-most pixel through the fourth pixel from the left in the frame #n in FIG. 17 belong to the background region, and the pixel values are B25 through B28, respectively.

Since an assumption may be made that the object corresponding to the foreground is a rigid body and moves at a constant velocity, and the foreground image moves so as to be displayed at a position four pixels to the right side in the following frame, the foreground component of the first shutter period/v from the shutter opening of the fifth pixel from the left in the frame #n in FIG. 17 is F13/v, and the foreground component of the second shutter period/v from the shutter opening of the sixth pixel from the left in FIG. 17 is also F13/v. The foreground component of the third shutter period/v from the shutter opening of the seventh pixel from the left in FIG. 17, and the foreground component of the fourth shutter period/v from the shutter opening of the eighth pixel from the left in FIG. 17, are F13/v.

The foreground component of the first shutter period/v from the shutter opening of the sixth pixel from the left in the frame #n in FIG. 17 is F14/v, and the foreground component of the second shutter period/v from the shutter opening of the seventh pixel from the left in FIG. 17 is also F14/v. The foreground component of the first shutter period/v from the shutter opening of the eighth pixel from the left in FIG. 17 is F15/v.

Since the object corresponding to the background keeps still, the background components of the second through fourth shutter period/vs from the shutter opening of the fifth pixel from the left in the frame #n in FIG. 17 are B29/v. The background components of the third and fourth shutter period/vs from the shutter opening of the sixth pixel from the left in the frame #n in FIG. 17 are B30/v. The background component of the fourth shutter period/v from the shutter opening of the seventh pixel from the left in the frame #n in FIG. 17 is B31/v.

In the frame #n in FIG. 17, the fifth through seventh pixels from the left belong to the mixed region of the uncovered background region.

The eighth through twelfth pixels from the left in the frame #n in FIG. 17 belong to the foreground region. The value corresponding to the period of the shutter period/v in the foreground region in the frame #n is one of F13/v through F20/v.

The left-most pixel through the eighth pixel from the left in the frame #n+1 in FIG. 17, belong to the background region, and the pixel values thereof are B25 through B32, respectively.

Since an assumption may be made that the object corresponding to the foreground is a rigid body and moves at a uniform velocity, and the foreground image moves so as to be displayed at a position four pixels to the right side in the following frame, the foreground component of the first shutter period/v from the shutter opening of the ninth pixel from the left in the frame #n+1 in FIG. 17 is F13/v, and the foreground component of the second shutter period/v from the shutter opening of the tenth pixel from the left in FIG. 17 is also F13/v. The foreground component of the third shutter period/v from the shutter opening of the eleventh pixel from the left in FIG. 17, and the foreground component of the fourth shutter period/v from the shutter opening of the twelfth pixel from the left in FIG. 17, are F13/v.

The foreground component of the first shutter period/v from the shutter opening of the tenth pixel from the left in the frame #n+1 in FIG. 10 is F14/v, and the foreground component of the second shutter period/v from the shutter opening of the eleventh pixel from the left in FIG. 17 is also F14/v. The foreground component of the first shutter period/v from the shutter opening of the twelfth pixel from the left in FIG. 17 is F15/v.

Since the object corresponding to the background keeps still, the background components of the second through fourth shutter period/vs from the shutter opening of the ninth pixel from the left in the frame #n+1 in FIG. 17 are B33/v. The background components of the third and fourth shutter period/vs from the shutter opening of the tenth pixel from the left in the frame #n+1 in FIG. 17 are B34/v. The background component of the fourth shutter period/v from the shutter opening of the eleventh pixel from the left in the frame #n+1 in FIG. 17 is B35/v.

In the frame #n+1 in FIG. 17, the ninth through eleventh pixels from the left belong to the mixed region of the uncovered background region.

The twelfth pixel from the left in the frame #n+1 in FIG. 17 belongs to the foreground region. The foreground component of the shutter period/v in the foreground region in the frame #n+1 is one of F13/v through F16/v.

Figure 18:
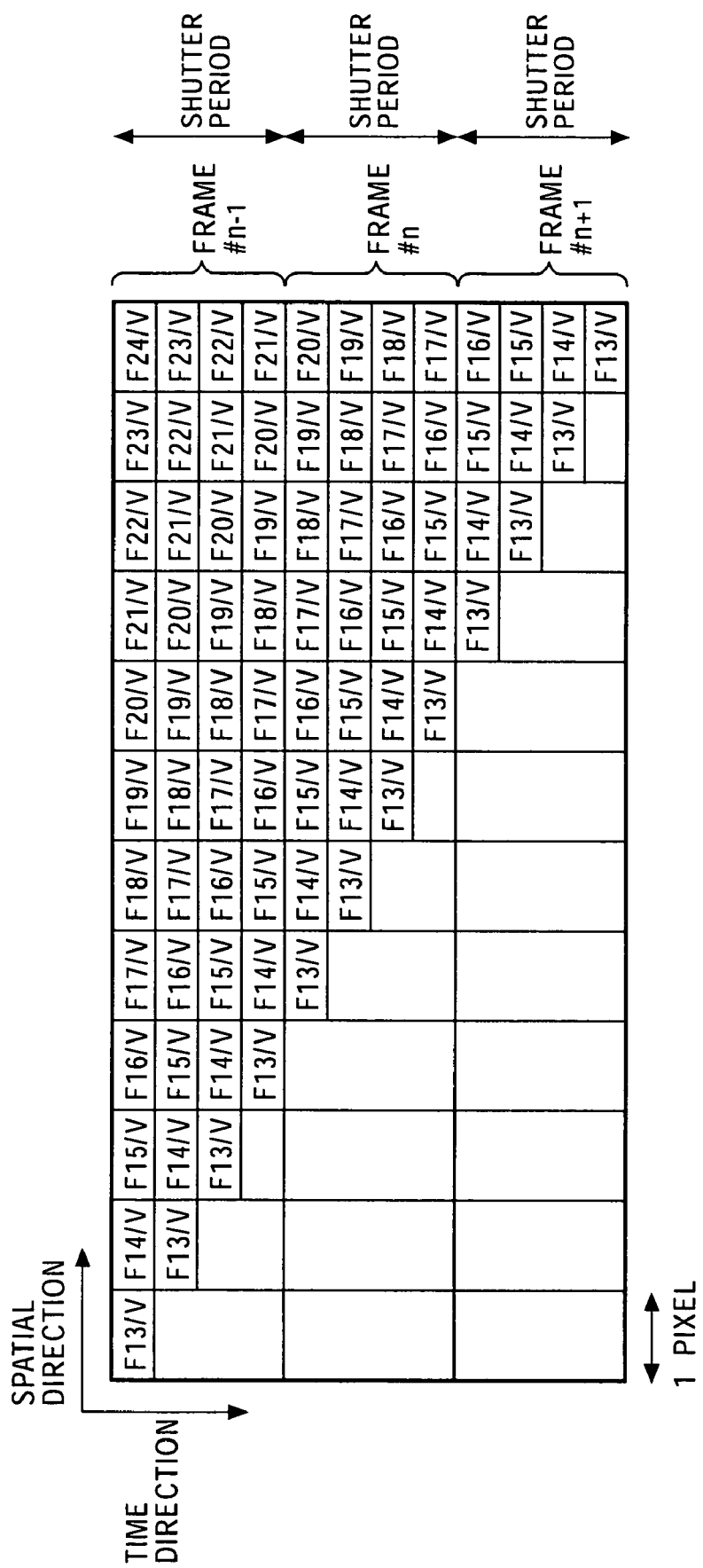
FIG. 18 is a model diagram wherein the pixel values are developed over the time direction, and periods corresponding to shutter time are divided.

FIG. 18 is a model diagram of the image wherein the foreground components are extracted from the pixel values shown in FIG. 17.

Returning to FIG. 2, the region specifying unit 103 correlates a flag which indicates that a pixel belongs to the foreground region, the background region, the uncovered background region, or uncovered background region, with each of the pixels, using the pixel values in multiple frames, and supplies the flags to the mixture ratio calculating unit 104 and the movement blurring adjustment unit 106, as region information.

The mixture ratio calculating unit 104 calculates the mixture ratio $\alpha$ for each of the pixels included in the mixed region based upon the pixel values in the multiple frames and the region information, and supplies the calculated mixture ratio $\alpha$ to the foreground/background separation unit 105.

The foreground/background separation unit 105 extracts the foreground component images which consist of only the foreground components based upon the pixel values in the multiple frames, the region information, and the mixture ratio $\alpha$, and supplies to the movement blurring adjustment unit 106.

The movement blurring adjustment unit 106 adjusts the amount of the movement blurring contained in the foreground image based upon the foreground component images supplied from the foreground/background separation unit 105, the movement vector supplied from the movement detecting unit 102, and the region information supplied from the region specifying unit 103, and outputs the foreground component images which have been subjected to adjustment of the movement blurring.

Figure 19:
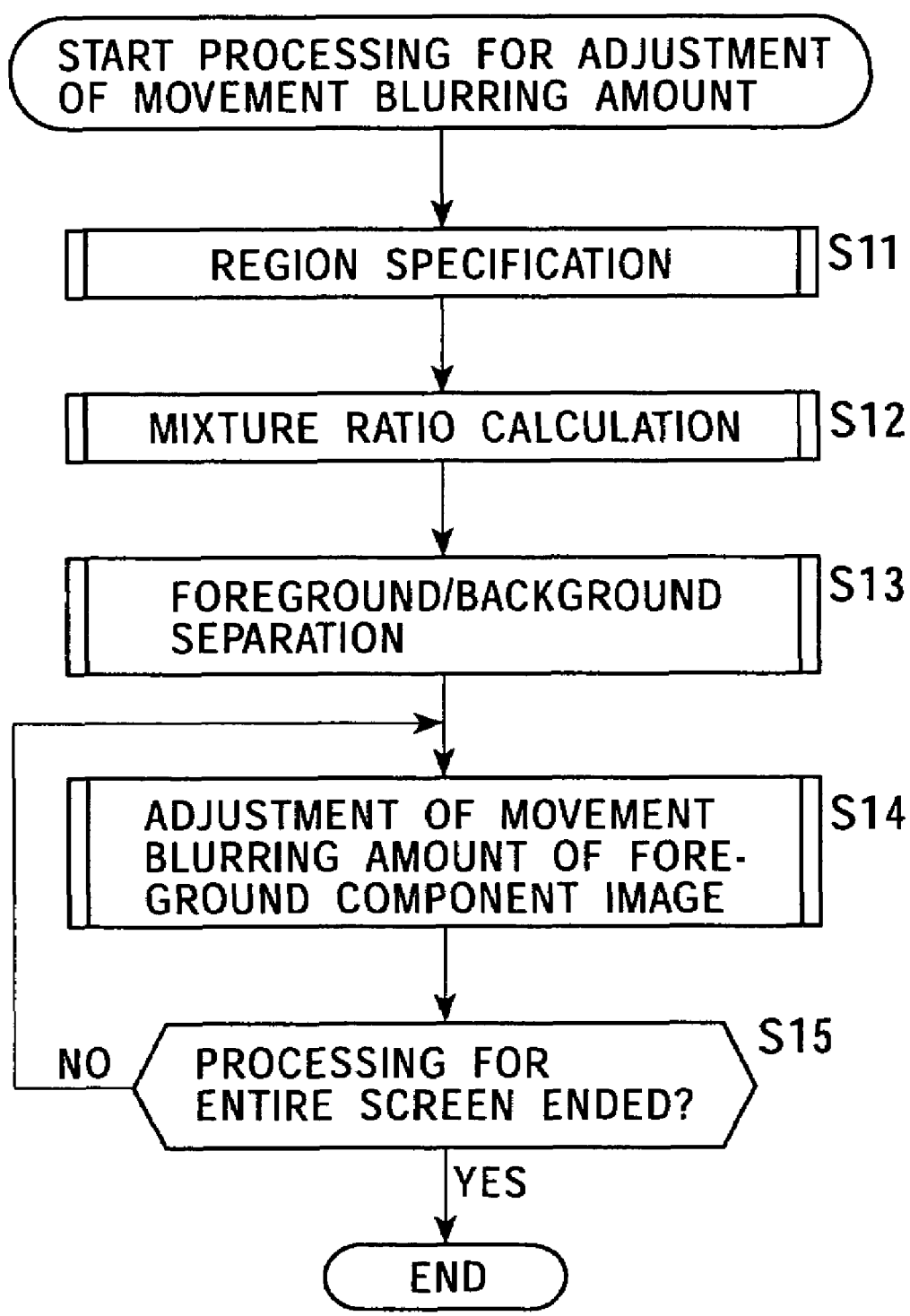
FIG. 19 is a flowchart describing the processing for adjusting the amount of movement blurring.

The processing of adjustment of the amount of the movement blurring by the signal processing device will be described, referring to the flowchart in FIG. 19. In Step S11, the region specifying unit 103 performs processing of region specification for generating the region information which indicates which of the foreground region, the background region, the covered background region, or the uncovered background region, each pixel of the input image belongs to, based upon the input image. The processing of the region specification will be described in detail later. The region specification unit 103 supplies the generated region information to the mixture ratio calculation unit 104.

Note that in Step S11, the region specification unit 103 may generate the region information which indicates which of the foreground region, the background region, or the mixed region (with no distinction between the covered background region and the uncovered background region) each pixel of the input image belongs to, based upon the input image. In this case, the foreground/background separation unit 105 and the movement blurring adjustment unit 106 judges whether the mixed region is the covered background region or the uncovered background region, based upon the direction of the movement vector. For example, in the event that the foreground region, the mixed region, and the background region are in sequence corresponding to the direction of the movement vector, judgment is made that the mixed region is the covered background region, and in the event that the background region, the mixed region, and the foreground region are in sequence, corresponding to the direction of the movement vector, judgment is made that the mixed region is the uncovered background region.

In Step S12, the mixture ratio calculating unit 104 calculates the mixture ratio α for each pixel included in the mixed region based upon the input image and the region information. The processing of the mixture ratio calculation will be described in detail later. The mixture ratio calculating unit 104 supplies the calculated mixture ratio α to the foreground/background separation unit 105.

In Step S13, the foreground/background separation unit 105 extracts the foreground components from the input image based upon the region information and the mixture ratio α, and supplies as the foreground component image to the movement blurring adjustment unit 106.

In Step S14, the movement blurring adjustment unit 106 generates an increment of processing which indicates the position on an image for the pixels arrayed in the movement direction, which belongs to one of the uncovered background region, the foreground region, or the covered background region, and adjusts the amount of movement blurring included in the foreground component corresponding to the increment of processing, based upon the movement vectors and the region information. The processing of adjustment of the amount of the movement blurring will be described in detail later.

In Step S15, the signal processing device judges whether the processing of the entire image has ended or not, and in the event that judgment is made that the processing has not ended for the entire image, the flow proceeds to Step S14, and the processing of adjustment of the amount of the movement blurring for the foreground components corresponding to the increment of processing is repeated.

In Step S15, in the event that the processing of the entire image has ended, the processing ends.

As described above, the signal processing device can separate the foreground and the background, and can adjust the amount of the movement blurring included in the foreground. That is to say, the signal processing device can adjust the amount of the movement blurring included in the sampled data of the pixel values of the pixel of the foreground.

The configuration of the region specifying unit 103, the mixture ratio calculating unit 104, the foreground/background separation unit 105, and the movement blurring adjustment unit 106 will be described below.

Figure 20:
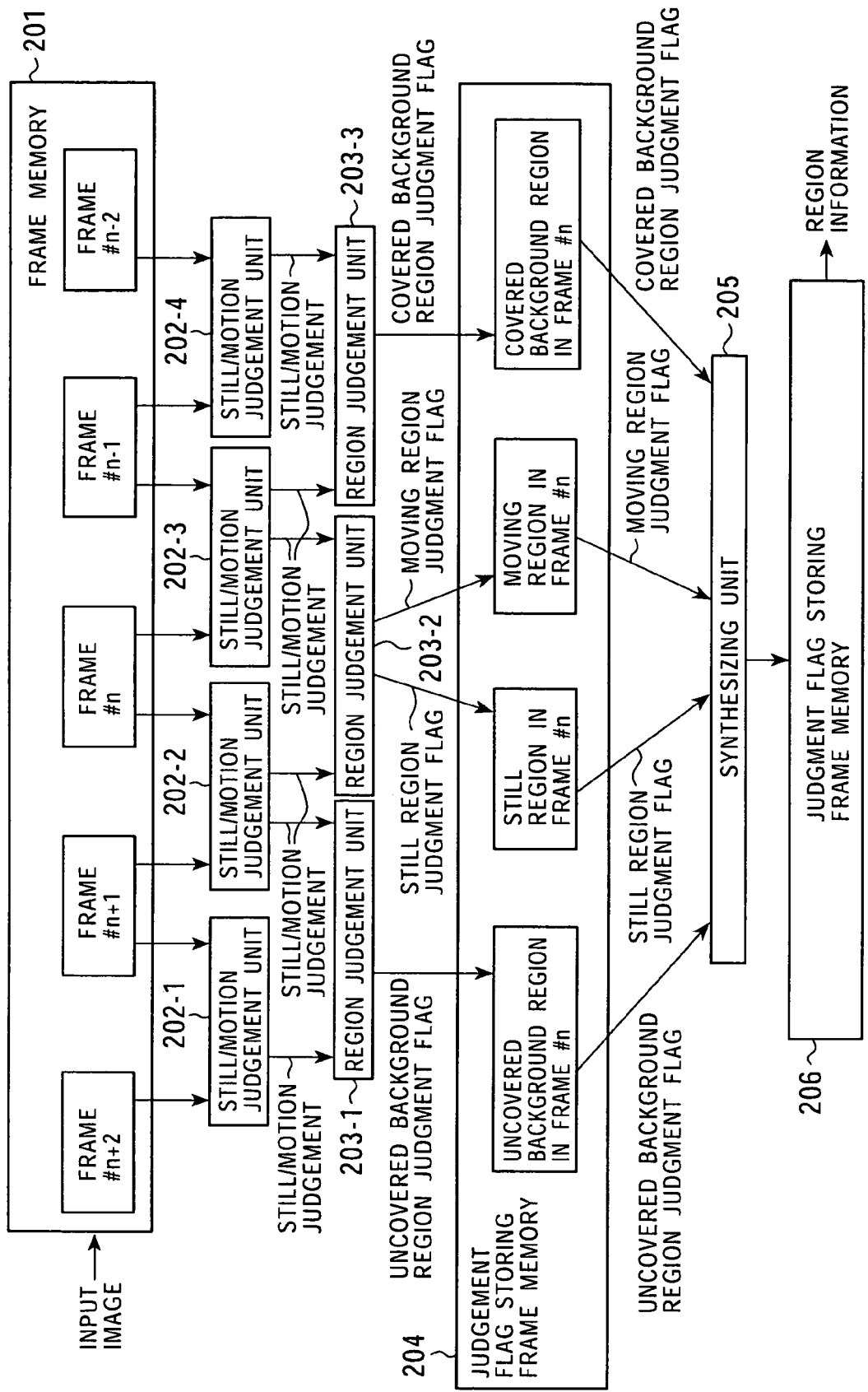
FIG. 20 is a block diagram illustrating an example of the configuration of the region specifying unit 103.

FIG. 20 is a block diagram which illustrates an example of the configuration of the region specifying unit 103. The region specifying unit 103, of which the structure is shown in FIG. 20, does not use the movement vectors. Frame memory 201 stores the input images in increments of one frame. In the event that the object of the processing is the frame #n, the frame memory 201 stores the frame #n−2 which is two frames previous from the frame #n, the frame #n−1 which is one frame previous from the frame #n, the frame #n, the frame #n+1 which is one frame following the frame #n, and the frame #n+2 which is two frames following the frame #n.

A still/motion judgment unit 202-1 reads out the pixel value of the pixel in the frame #n+2, which is at the same position as the position of the pixel on the image, which is the object of specifying the region in the frame #n, and the pixel value of the pixel in the frame #n+1, which is at the same position as the position of the pixel on the image, which is the object of specifying the region of the frame #n, from the frame memory 201, and calculates the absolute value of the difference between the read out pixel values. The still/motion judgment unit 202-1 judges whether the absolute value of the difference between the pixel value in the frame #n+2 and the pixel value in the frame #n+1 is greater than the predetermined threshold value Th, and in the event that judgment is made that the absolute value of the difference is greater than the threshold value Th, the still/motion judgment unit 202-1 supplies the still/motion judgment, indicating motion, to a region judgment unit 203-1. In the event that judgment is made that the absolute value of the difference between the pixel value of the frame #n+2 and the pixel value of the pixel of the frame #n+1 is equal to or less than the threshold value Th, the still/motion judgment unit 202-1 supplies the still/motion judgment, indicating "still", to the region judgment unit 203-1.

A still/motion judgment unit 202-2 reads out the pixel value of the pixel in the frame #n+1, which is at the same position as the position of the pixel on the image, which is the object of specifying the region in the frame #n, and the pixel value of pixel which is the object in the frame #n from the frame memory 201, and calculates the absolute value of the difference between the pixel values. The still/motion judgment unit 202-2 judges whether the absolute value of the difference between the pixel value in the frame #n+1 and the pixel value in the frame #n is greater than the predetermined threshold value Th, and in the event that judgment is made that the absolute value of the difference between the pixel values is greater than the threshold value Th, the still/motion judgment indicating motion is supplied to the region judgment unit 203-1 and the region judgment unit 203-2. In the event that judgment is made that the absolute value of the difference between the pixel value of the pixel in the frame #n+1 and the pixel value of the pixel in the frame #n is equal to or smaller than the threshold value Th, the still/motion judgment unit 202-2 supplies the still/motion judgment, indicating "still", to the region judgment unit 203-1 and the region judgment unit 203-2.

The still/motion judgment unit 202-3 reads out the pixel value of the pixel, which is the object of specifying the region in the frame #n, and the pixel value of the pixel in the frame #n−1, which is at the same position as the position on the image of the pixel, which is the object of specifying the region in the frame #n, from the frame memory 201, and calculates the absolute value of the difference between the pixel values. The still/motion judgment unit 202-3 judges whether the absolute value of the difference between the pixel value in the frame #n and the pixel value in the frame #n−1 is greater than the predetermined value Th, and in the event that judgment is made that the absolute value of the difference between the pixel values is greater than the threshold value Th, the still/motion judgment indicating motion is supplied to the region judgment unit 203-2 and the region judgment unit 203-3. In the event that judgment is made that the absolute value of the difference between the pixel values of the pixel in the frame #n and the pixel value of the pixel in the frame #n−1 is equal to or smaller than the threshold value Th, the still/motion judgment unit 202-3 supplies the still/motion judgment indicating "still" to the region judgment unit 203-2 and the region judgment unit 203-3.

The still/motion judgment unit 202-4 reads out the pixel value of the pixel in the frame #n−1 at the same position as the position of the pixel on the image, which is the object of specifying the region in the frame #n, and the pixel value of the pixel in the frame #n−2 at the same position as the position on the image of the pixel, which is the object of specifying the region in the frame #n, from the frame memory 201, and calculates the absolute value of the difference between the pixel values. The still/motion judgment unit 202-4 judges whether the absolute value of the difference between the pixel value in the frame #n−1 and the pixel value in the frame #n−2 is greater than the predetermined threshold value Th, and in the event that judgment is made that the absolute value of the difference between the pixel values is greater than the threshold value Th, the still/motion judgment indicating motion is supplied to the region judgment unit 203-3. In the event that judgment is made that the absolute value of the difference between the pixel value of the pixel in the frame #n−1 and the pixel value of the pixel in the frame #n−2 is equal to or smaller than the threshold value Th, the still/motion judgment unit 202-4 supplies the still/motion judgment indicating "still" to the region judgment unit 203-3.

In the event that the still/motion judgment supplied from the still/motion judgment unit 202-1 indicates "still", and the still/motion judgment supplied from the still/motion judgment unit 202-2 indicates motion, the region judgment unit 203-1 judges that the pixel which is the object of specifying the region in the frame #n belongs to the uncovered background region, and sets the uncovered background region judgment flag corresponding to the judged pixel in the region, to "1", which indicates that the pixel belongs to the uncovered background region.

In the event that the still/motion judgment supplied from the still/motion judgment unit 202-1 indicates motion, or the still/motion judgment supplied from the still/motion judgment unit 202-2 indicates still, the region judgment unit 203-1 judges that the pixel which is the object of specifying the region in the frame #n does not belong to the uncovered background region, and sets the uncovered background region judgment flag corresponding to the judged pixel in the region to "0", which indicates that the pixel does not belong to the uncovered background region.

The region judgment unit 203-1 supplies the uncovered background region judgment flag which has been set to "1" or "0", as described above, to the judgment flag storing memory 204.

In the event that the still/motion judgment supplied from the still/motion judgment unit 202-2 indicates "still", and the still/motion judgment supplied from the still/motion judgment unit 202-3 indicates "still", the region judgment unit 203-3 judges that the pixel which is the object of specifying the region in the frame #n belongs to the still region, and sets the still region judgment flag corresponding to the pixel judged in the region, to "1", which indicates that the pixel belongs to the still region.

In the event that the still/motion judgment supplied from the still/motion judgment unit 202-2 indicates motion, or the still/motion judgment supplied from the still/motion judgment unit 202-3 indicates motion, the region judgment unit 203-2 judges that the pixel which is the object of specifying the region in the frame #n does not belong to the still region, and sets the still region judgment flag corresponding to the judged pixel in the region, to "0", which indicates that the pixel does not belong to the still region.

The region judgment unit 203-2 supplies the still region judgment flag which has been set to "1" or "0" as described above, to judgment flag storing frame memory 204.

In the event that the still/motion judgment supplied from the still/motion judgment unit 202-2 indicates motion, and the still/motion judgment supplied from the still/motion judgment indicates motion, the region judgment unit 203-2 judges the pixel which is the object of specifying the region in the frame #n belongs to the moving region, and sets the moving region judgment flag corresponding to the judged pixel in the region, to "1", which indicates that the pixel belongs to the moving region.

In the event that the still/motion judgment supplied from the still/motion judgment unit 202-2 indicates "still", or the still/motion judgment supplied from the still/motion judgment unit 202-3 indicates "still", the region judgment unit 203-2 judges that the pixel which is the target of specifying the region in the frame #n does not belong to the moving region, and sets the moving region judgment flag corresponding to the judged pixel in the region, to "0", which indicates that the pixel does not belong to the moving region.

The region judgment unit 203-2 supplies the moving region judgment flag which has been set "1" or "0", to the judgment flag storing frame memory 204.

In the event that the still/motion judgment unit supplied from the still/motion judgment unit 202-3 indicates motion, and the still/motion judgment supplied from the still/motion judgment unit 202-4 indicates "still", the region judgment unit 203-3 judges that the pixel which is the target of specifying the region in the frame #n belongs to the covered background region, and sets the covered background region judgment flag to "1", which indicates that the pixel belongs to the covered background region.

In the event that the still/motion judgment supplied from the still/motion judgment unit 202-3 indicates "still", or the still/motion judgment supplied from the still/motion judgment unit 202-4 indicates motion, the region judgment unit 203-3 judges that the pixel which is the object of specifying the region in the frame #n does not belong to the covered background region, and sets the covered background region judgment flag to "0", which indicates that the pixel does not belong to the covered background region.

The region judgment unit 203-3 supplies the covered background region judgment flag which has been set to "1" or "0" as described above, to the judgment flag storing frame memory 204.

The judgment flag storing frame memory 204 stores the uncovered background region judgment flag supplied from the region judgment unit 203-1, the still region judgment flag supplied from the region judgment unit 203-2, the moving region judgment flag supplied from the region judgment unit 203-2, and the covered background region judgment flag supplied from the region judgment unit 203-3.

The judgment flag storing frame memory 204 supplies the uncovered background region judgment flag, the still region judgment flag, the moving region judgment flag, and the covered background region judgment flag, which is stored therein, to a synthesizing unit 205. The synthesizing unit 205 generates the region information which indicates which of the uncovered background region, the still region, the moving region, or the covered background region, each pixel belongs to, and supplies the information to judgment flag storing frame memory 206, based upon the uncovered background region judgment flag, the still region judgment flag, the moving region judgment flag, and the covered background region judgment flag, which are supplied from the judgment flag storing frame memory 204.

The judgment flag storing frame memory 206 stores the region information supplied from the synthesizing unit 205, and outputs the stored region information.

An example for processing performed by the region specifying unit 103 will now be described with reference to FIG. 21 through FIG. 25.

Figure 21:
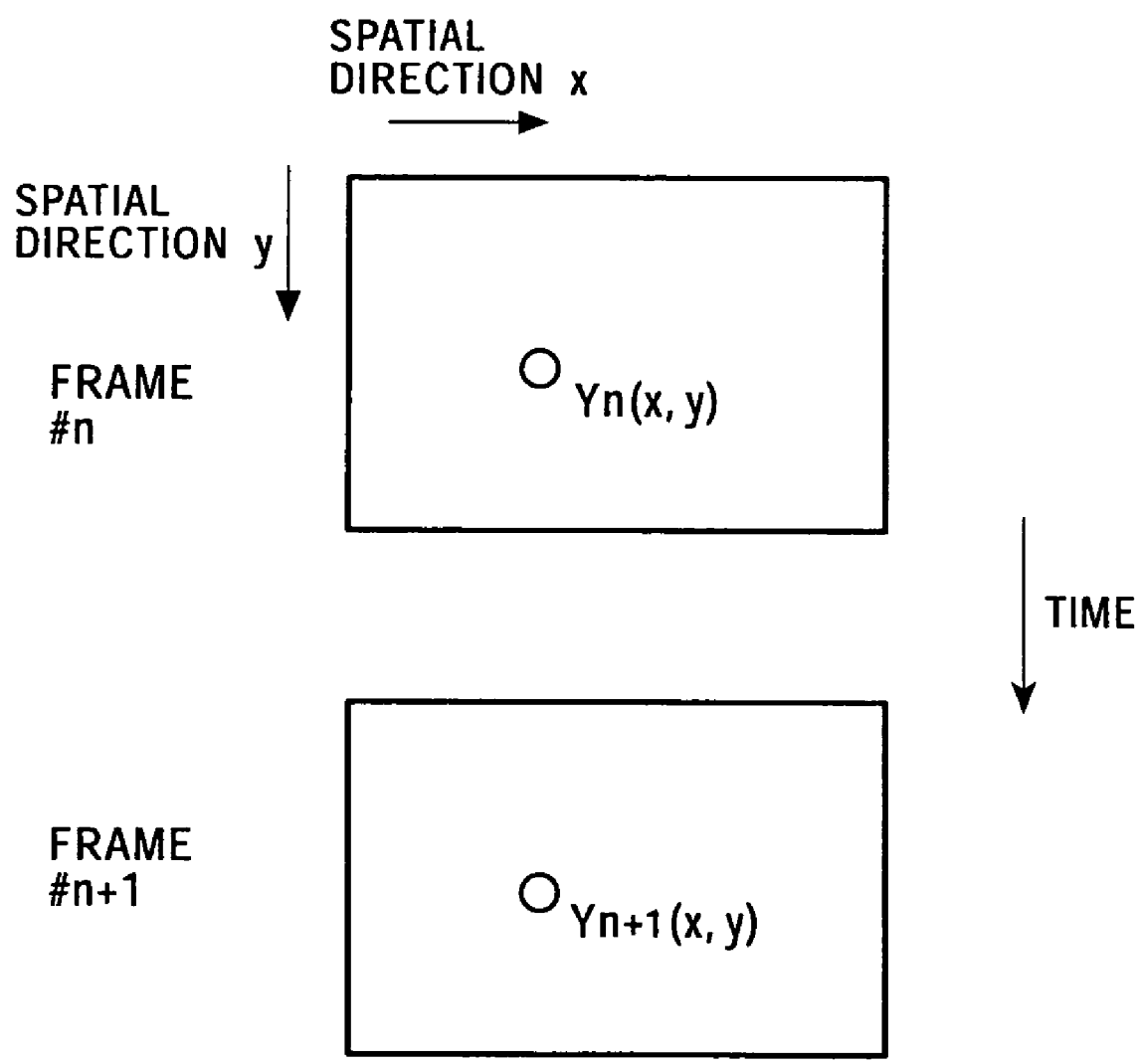
FIG. 21 is a diagram describing an image wherein an object corresponding to the foreground is moving.

In the event that the object corresponding to the foreground moves, the position of the image corresponding to the object on the screen changes with each frame. As shown in FIG. 21, in the frame #n, the image corresponding to the object which is at the position indicated by Yn (x,y) is at the position Yn+1 (x,y) in the following frame #n+1.

Figure 22:
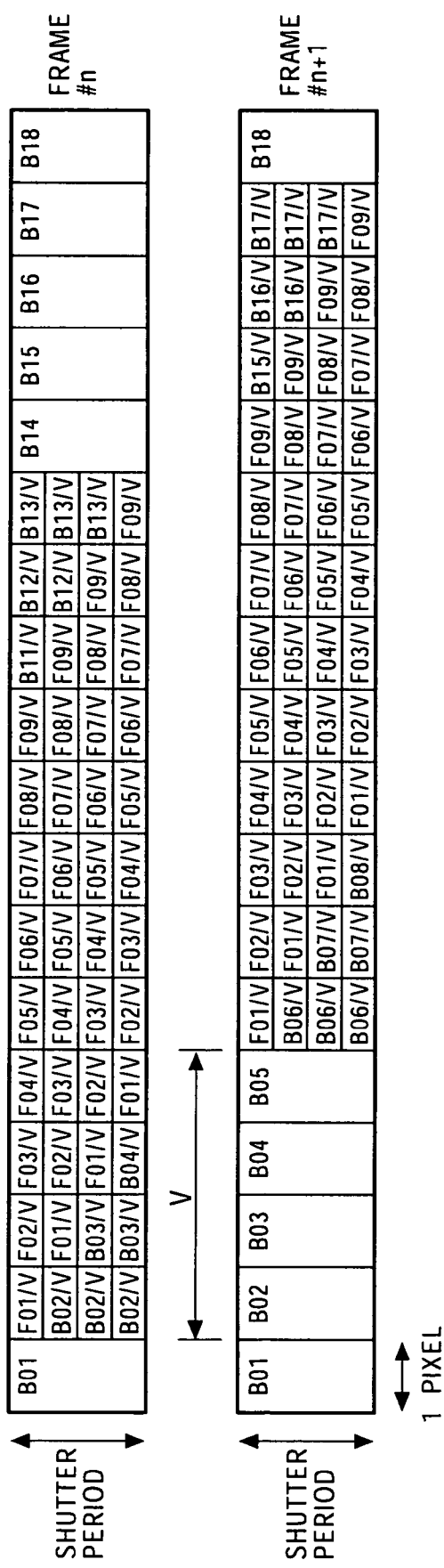
FIG. 22 is a model diagram wherein the pixel values are developed over the time direction, and periods corresponding to shutter time are divided.

FIG. 22 is a model diagram wherein the pixel values of pixels of the image corresponding to the foreground object, which are adjacently arrayed in sequence in a image movement direction, develop over the time direction. For example, in the event that the image moving direction corresponding to the foreground object is horizontal to the screen, the model diagram in FIG. 22 indicates the model wherein the pixel values of adjacent pixels in one line develop over the time direction.

In FIG. 22, the line in the frame #n is the same as the line in the frame #n+1.

The foreground components corresponding to the object, which are included in the second pixel through thirteenth pixel from the left in the frame #n, are included in the sixth through seventeenth pixels from the left in the frame #n+1.

In the frame #n, the pixels belonging to the covered background region are the eleventh through thirteenth pixels from the left, and the pixels belonging to the uncovered background region are the second through fourth pixels from the left. In the frame #n+1, the pixels belonging to the covered background region are the fifteenth through seventeenth pixels from the left, and the pixels belonging to the uncovered background region are sixth through eighth pixels from the left.

With the example shown in FIG. 22, the movement amount v is 4, since the foreground components included in the frame #n move by four pixels in the frame #n+1. The virtual dividing number is 4, corresponding to the movement value v.

Next, a description will be made regarding the change of the pixel values of the pixels belonging to the mixed region in the frames previous to and following the frame of interest.

Figure 23:
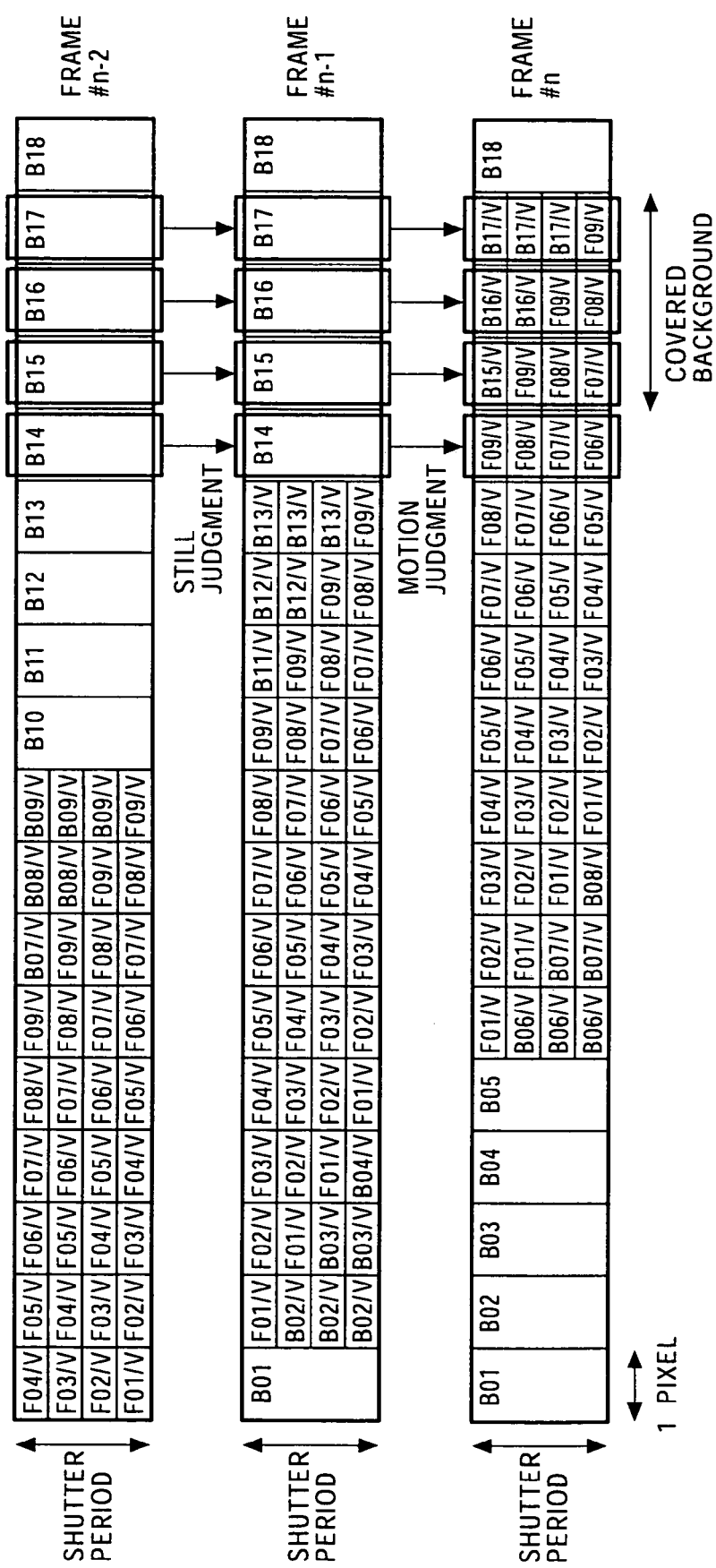
FIG. 23 is a model diagram wherein the pixel values are developed over the time direction, and periods corresponding to shutter time are divided.

In the frame #n wherein the background keeps still and the movement amount v of the foreground is 4, shown in FIG. 23, the pixels belonging to the covered background region are the fifteenth through seventeenth pixels from the left. Since the movement amount v is 4, in the previous frame #n−1, the fifteenth through seventeenth pixels from the left include only the background components, and belong to the background region. Also, in the frame # n−2 which is one further before, the fifteenth through seventeenth pixels from the left contain only the background components, and belong to the background region.

Note that since the object corresponding to the background keeps still, the pixel values of the fifteenth pixel from the left in the frame #n−1 do not change from the pixel value of the fifteenth pixel from the left in the frame #n−2. Similarly, the pixel values of the sixteenth pixel from the left in the frame #n−1 do not change from the pixel value of the sixteenth pixel from the left in the frame #n−2, and the pixel values of the seventeenth pixel from the left in the frame #n−1 do not change from the pixel value of the seventeenth pixel from the left in the frame #n−2.

That is to say, the pixels of the frame #n−1 and frame #n−2 corresponding to the pixels belonging to the covered background region in the frame #n consists of only the background components, so the pixel values do not change, and accordingly the absolute value of the difference therebetween is approximately zero. Accordingly, judgment is made that the still/motion judgment for the pixels of the frame #n−1 and the frame #n−2 corresponding to the pixels belonging to the mixed region in the frame #n is still by the still/motion judgment unit 202-4.

Since the pixels belonging to the covered background region in the frame #n include the foreground components, the pixel values are different from the case wherein the pixel values in the frame #n−1 consist of only the background components. Accordingly, judgment is made that the still/motion judgment for the pixels belonging to the mixed region in the frame #n and the pixels in the frame #n−1 corresponding thereto is motion by the still/motion judgment unit 202-3.

As described above, the region judgment unit 203-3 judges that the corresponding pixels belong to the covered background region in the event that the still/motion judgment unit 202-3 supplies the results of the still/motion judgment which indicates motion, and the still/motion judgment unit 202-4 supplies the results of the still/motion judgment which indicates "still".

Figure 24:
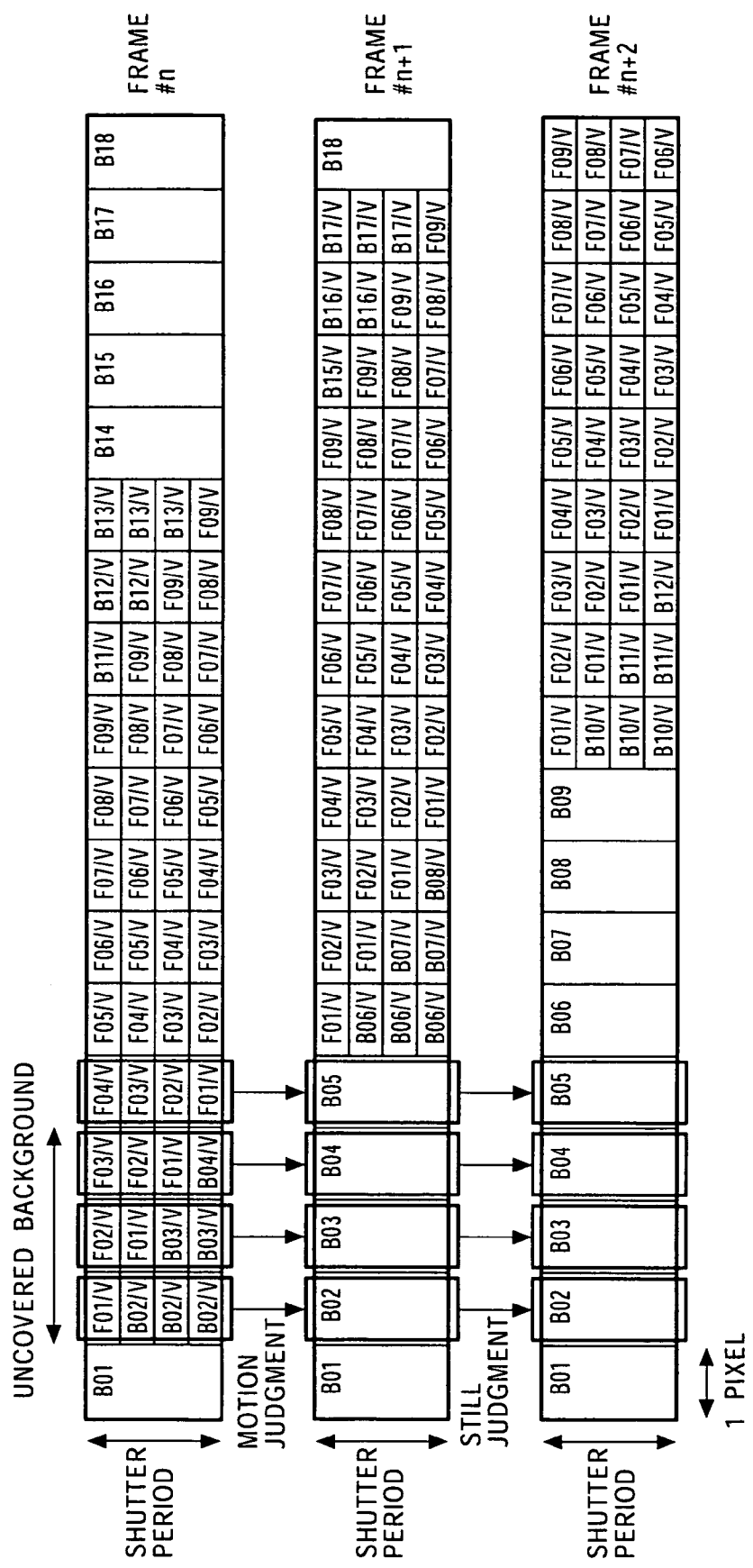
FIG. 24 is a model diagram wherein the pixel values are developed over the time direction, and periods corresponding to shutter time are divided.

In the frame #n wherein the background keeps still and the foreground movement amount v is 4 as shown in FIG. 24, the pixels included in the uncovered background region are the second through fourth from the left. Since the movement amount v is 4, in the frame #n+1 following the frame #n, the second through fourth pixels from the left include only the background components, and belong to the background region. Also, in the frame #n+2 further one frame following the frame #n+1, the second through fourth pixels from the left contain only the background components, and belong to the background region.

Note that since the object corresponding to the background keeps still, the pixel values of the second pixel from the left in the frame #n+2 does not change from the pixel value of the second pixel from the left in the frame #n+1. Similarly, the pixel values of the third pixel from the left in the frame #n+2 do not change from the pixel value of the third pixel from the left in the frame #n+1, and the pixel values of the fourth pixel from the left in the frame #n+2 do not change from the pixel value of the fourth pixel from the left in the frame #n+1.

That is to say, the pixels of the frame #n+1 and the frame #n+2, corresponding to the uncovered background region in the frame #n, consist of only the background components, so the pixel values thereof do not change, and accordingly the absolute value of the difference thereof is approximately zero. Accordingly, judgment is made that the still/motion judgment for the pixels of the frame #n+1 and the frame #n+2 corresponding to the pixels belonging to the mixed region in the frame #n is "still" by the still/motion judgment unit 202-1.

Since the pixels belonging to the uncovered background region in the frame #n include the foreground components, the pixel values are different from the case wherein the pixels consists of only the background components in the frame #n+1. Accordingly, judgment is made that the still/motion judgment for the pixels belonging to the mixed region in the frame #n and the pixels corresponding thereto in the frame #n+1 is motion by the still/motion judgment unit 202-2.

As described above, the region judgment unit 203-1 judges that the corresponding pixels belong to the uncovered background region in the event that the still/motion judgment unit 202-2 supplies the results of the still/motion judgment which indicates motion, and the still/motion judgment unit 202-1 supplies the still/motion judgment which indicates "still".

FIG. 25 is a diagram which illustrates judgment conditions of the region specifying unit 103 in the frame #n. In the event that the pixel in the frame #n−2 at the same position as the position of the pixel which is the object of judgment on the image in the frame #n, and the pixel in the frame #n−1 at the same position as the position of the pixel which is the object of judgment on the image in the frame #n, are judged to be "still", and the pixel in the frame #n−1 at the same position as the position of the pixel which is the object of judgment on the image in the frame #n, and the pixel in the frame #n are judged to be motion, the region specifying unit 103 judges that the pixel which is the object of judgment of the frame #n belongs to the covered background region.

In the event that the pixel in the frame #n−1 at the same position as the position of the pixel which is the object of judgment on the image in the frame #n, and the pixel in the frame #n, are judged to be "still", and the pixel in the frame #n and the pixel in the frame #n+1 at the same position as the position of the pixel which is the object of judgment on the image in the frame #n, are judged to be "still", the region specifying unit 103 judges that the pixel which is the object of judgment of the frame #n belongs to the still region.

In the event that the pixel in the frame #n−1 at the same position as the position of the pixel which is the object of judgment on the image in the frame #n, and the pixel in the frame #n, are judged to be motion, and the pixel of the frame #n and the pixel in the frame #n+1 at the same position as the position of the pixel which is the object of judgment on the image in the frame #n, are judged to be motion, the region specifying unit 103 judges that the pixel which is the object of judgment of the frame #n belongs to the movement region.

In the event that the pixel of the frame #n and the pixel in the frame #n+1 at the same position as the position of the pixel which is the object of judgment on the image in the frame #n, are judged to be motion, and the pixel in the frame #n+1 at the same position as the position of the pixel which is the object of judgment on the image in the frame #n, and the pixel in the frame #n+2 at the same position as the position of the pixel which is the object of judgment on the image in the frame #n, are judged to be "still", the region specifying unit 103 judges that the pixel which is the object of judgment of the frame #n belongs to the uncovered background region.

Figure 26A:
FIG. 26A is a diagram illustrating an example of the results of region specification made by the region specifying unit 103.
Figure 26B:
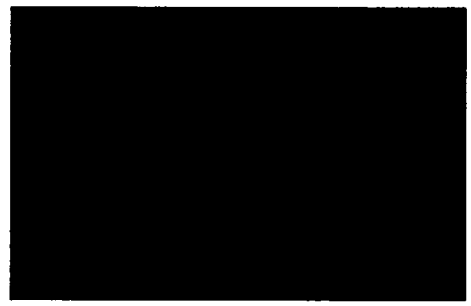
FIG. 26B is a diagram illustrating an example of the results of region specification made by the region specifying unit 103.

FIG. 26A through FIG. 26D are diagrams which illustrate examples of results of the region specifying unit 103 specifying the region. In FIG. 26A, the pixels which are judged to belong to the covered background region are displayed in white. In FIG. 26B, the pixels which are judged to belong to the uncovered background region are displayed in white.

Figure 26C:
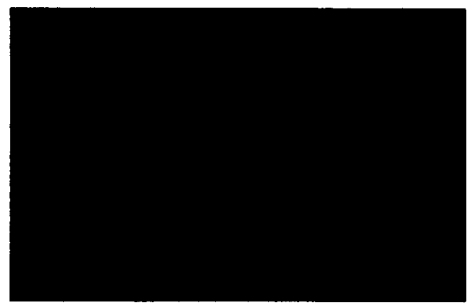
FIG. 26C is a diagram illustrating an example of the results of region specification made by the region specifying unit 103.
Figure 26D:
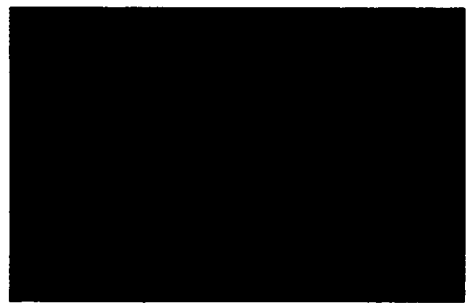
FIG. 26D is a diagram illustrating an example of the results of region specification made by the region specifying unit 103.

In FIG. 26C, the pixels which are judged to belong to the movement region are displayed in white. In FIG. 26D, the pixels which are judged to belong to the still region are displayed in white.

Figure 27:
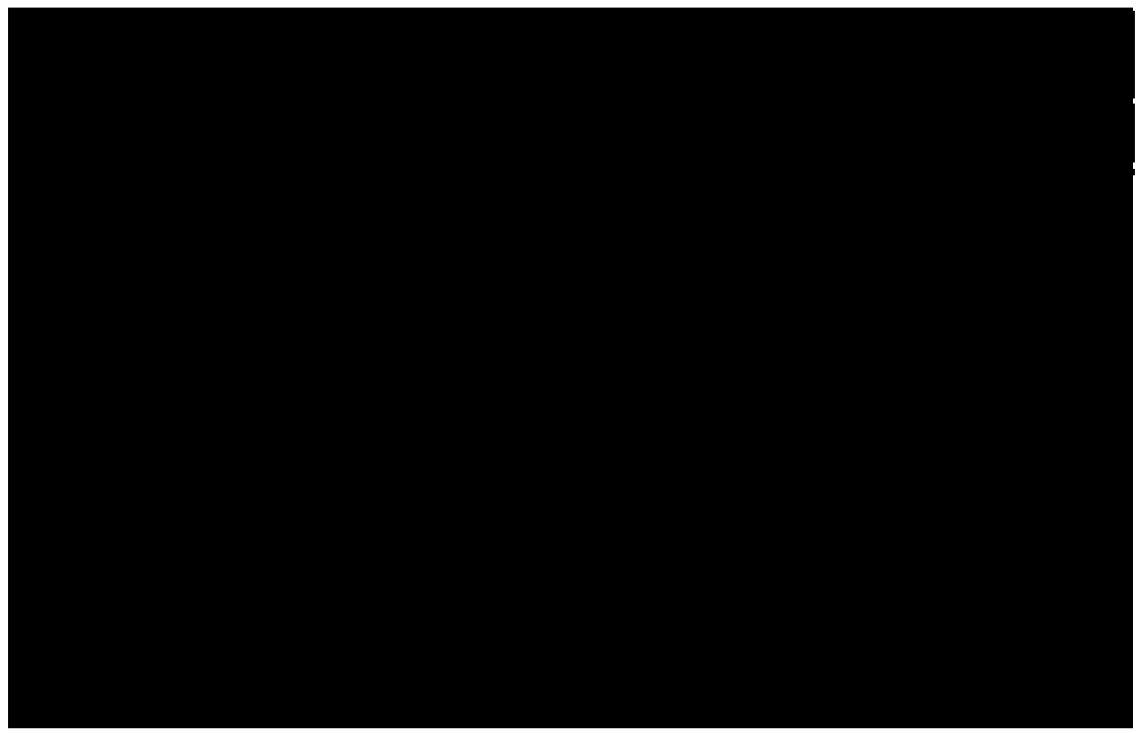
FIG. 27 is a diagram illustrating an example of the results of region specification made by the region specifying unit 103.

FIG. 27 is a diagram which illustrates the region information as an image, indicating the mixed region of the region information which the judgment flag storing frame memory 206 outputs. In FIG. 27, the pixels which are judged to belong to the covered background region or the uncovered background region, i.e., the pixels judged to belong to the mixed region, are displayed in white. The region information indicating the mixed region, which the judgment flag storing frame memory 206 outputs, indicates the mixed region and the portions which have texture within the foreground region and are surrounded by portions which have no texture.

Figure 28:
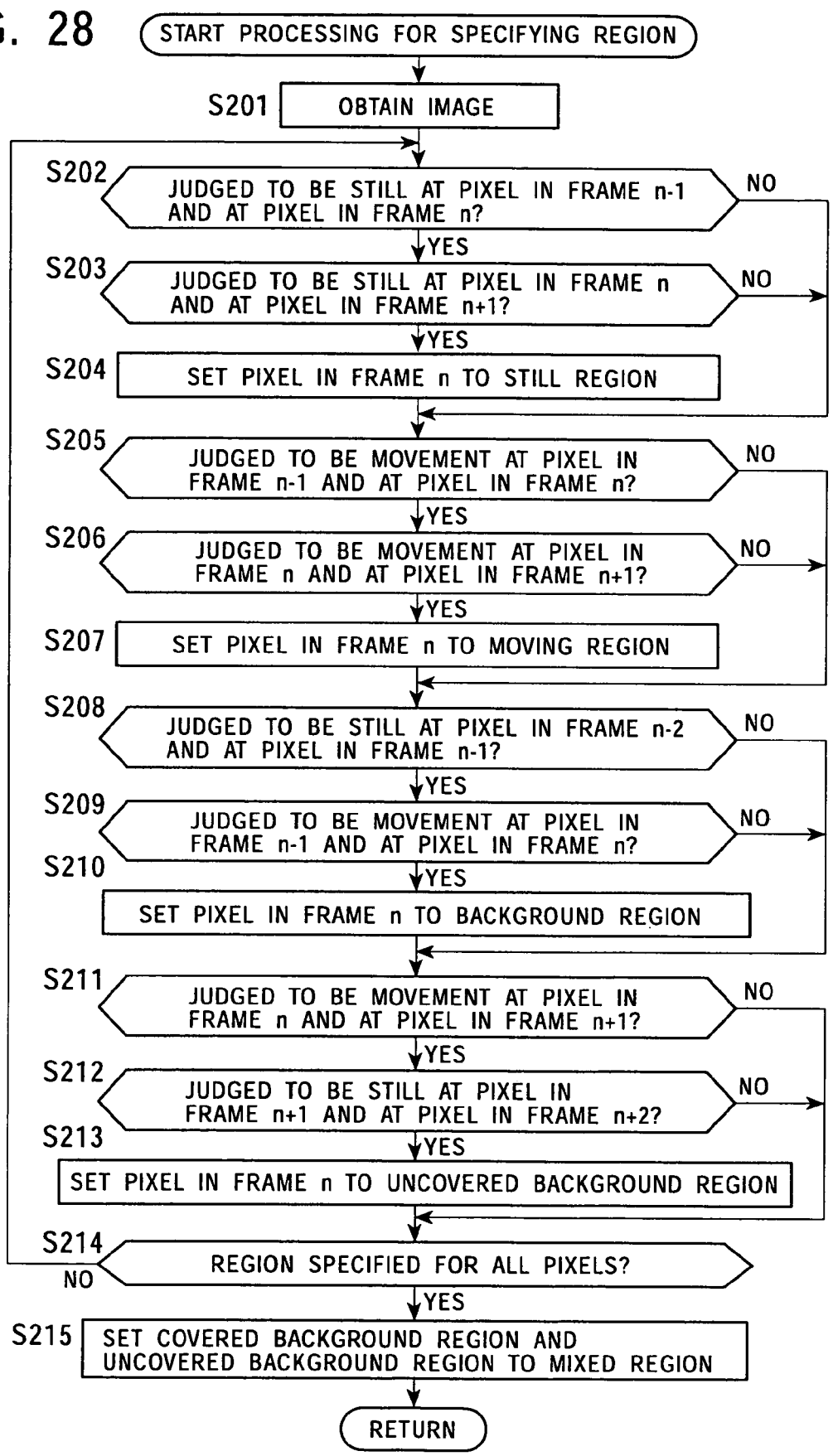
FIG. 28 is a flowchart describing processing for region specifying.

Next, referring to the flowchart in FIG. 28, the processing for region specifying by the region specifying unit 103 will be described. In Step S201, the frame memory 201 obtains the images of the frame #n−2 through the frame #n+2, including the frame #n which is the object of judgment.

In Step S202, the still/motion judgment unit 202-3 judges whether or not the pixel of the frame #n−1 and the pixel of the frame #n at the same position as the frame #n−1 keeps still, and in the event of judgment of "still", the flow proceeds to Step S203, and the still/motion judgment unit 202-2 judges whether or not the pixel of the frame #n and the pixel of the frame #n+1 at the same position keep still.

In Step S203, in the event that the pixel of the frame #n and the pixel of the frame #n+1 at the same position are judged to be "still", the flow proceeds to Step S204, and the region judgment unit 203-2 sets the still region judgment flag corresponding to the judged pixel in the region to "1" which indicates the pixel belongs to the still region. The region judgment unit 203-2 supplies the still region judgment flag to the judgment flag storing frame memory 204, and the procedure proceeds to Step S205.

In Step S202, in the event that the pixel of the frame #n−1 and the pixel of the frame #n at the same position are judged to be motion, or in Step S203, the pixel of the frame #n and the pixel of the frame #n+1 at the same position as the frame #n are judged to be motion, the pixel of the frame #n does not belong to the still region, and accordingly the processing in Step S204 is skipped, and the procedure proceeds to Step S205.

In Step S205, the still/motion judgment unit 202-3 judges whether or not the pixel of the frame #n−1 and the pixel of the frame #n at the same position are in motion, and in the event of judgment of motion, the flow proceeds to Step S206, and the still/motion judgment unit 202-2 judges whether or not the pixel of the frame #n and the pixel of the frame #n+1 at the same position are in motion.

In Step S206, in the event that the pixel of the frame #n and the pixel of the frame #n+1 at the same position are judged to be motion, the flow proceeds to Step S207, the region judgment unit 203-2 set the movement region judgment flag corresponding to the judged pixel in the region to "1" which indicates that the pixel belongs to the movement region. The region judgment unit 203-2 supplies the movement region judgment flag to the judgment flag storing frame memory 204, and the procedure proceeds to Step S208.

In Step S205, in the event that the pixel of the frame #n−1 and the pixel of the frame #n at the same position are judged to be "still", or in Step 206, in the event that the pixel of the frame #n and the pixel of the frame #n+1 at the same position are judged to be "still", since the pixel of the frame #n does not belong to the movement region, the processing in Step S207 is skipped, and the procedure proceeds to Step S208.

In Step S208, the still/motion judgment unit 202-4 judges whether or not the pixel of the frame #n−2 and the pixel of the frame #n−1 at the same position keeps still, and in the event of judgment of "still", the flow proceeds to Step S209, and the still/motion judgment unit 202-3 judges whether or not the pixel of the frame #n−1 and the pixel of the frame #n at the same position are in motion.

In Step S209, in the event that the pixel of the frame #n−1 and the pixel of the frame #n at the same position are judged to be motion, the flow proceeds to Step S210, and the region judgment unit 203-3 sets the covered background region judgment flag corresponding to the judged pixel in the region to "1" which indicates that the pixel belongs to the covered background region. The region judgment unit 203-3 supplies the covered background region judgment flag to the judgment flag storing frame memory 204, and the procedure proceeds to Step S211.

In Step 208, in the event that the pixel of the frame #n−2 and the pixel of the frame #n−1 at the same position are judged to be motion, or in Step 209, in the event that the pixel of the frame #n−1 and the pixel of the frame #n at the same position are judged to be "still", the pixel of the frame #n does not belong to the covered background region, so the processing in Step S210 is skipped, and the procedure proceeds to Step S211.

In Step S211, the still/motion judgment unit 202-2 judges whether or not the pixel of the frame #n and the pixel of the frame #n+1 at the same position are in motion, and in the event of judgment of motion, the flow proceeds to Step S212, and the still/motion judgment unit 202-1 judges whether or not the pixel of the frame #n+1 and the pixel of the frame #n+2 at the same position keep still.

In Step S212, in the event that the pixel of the frame #n+1 and the pixel of the frame #n+2 at the same position are judged to be "still", the flow proceeds to Step S213, and the region judgment unit 203-1 sets the uncovered background region judgment flag corresponding to the judged pixel in the region to "1" which indicates that the pixel belongs to-the uncovered background region. The region judgment unit 203-1 supplies the uncovered background region judgment flag to the judgment flag storing frame memory 204, and the procedure proceeds to Step S214.

In Step S211, in the event that the pixel of the frame #n and the pixel of the frame #n+1 at the same position are judged to be "still", or in Step 212, in the event that the pixel of the frame #n+1 and the pixel of the frame #n+2 at the same position are judged to be motion, since the pixel of the frame #n does not belong to the uncovered background region, the processing in Step S213 is skipped, and the procedure proceeds to Step S214.

In Step 214, the region specifying unit 103 judges whether or not all the pixels in the frame #n are region-specified, and in the event that judgment is made that not all pixels are region-specified, the procedure returns to Step S202, and repeats the processing of specifying the region for other pixels.

In Step S214, in the event that judgment is made that all the pixels in frame are region-specified, the flow proceeds to Step S215, and the synthesizing unit 205 generates the region information which indicates the mixed region based upon the uncovered background region judgment flag and the covered background region judgment flag, which are stored in the judgment flag storing frame memory 204, and furthermore generates the region information which indicates which of uncovered background region, the still region, the movement region, or the covered background region, each pixel belongs to, sets the generated region information for the judgment flag storing frame memory 206, and the processing ends.

As described above, the region specifying unit 103 can generate region information which indicates which of movement region, the still region, the uncovered background region, or the covered background region, each pixel included in the frame belongs to.

Note that an arrangement may be made wherein the region specifying unit 103 generates the region information corresponding to the mixed region and the region information made up of flags which indicates which of the movement region, the still region, or the mixed region, each of pixels included in the frame belongs to, by applying the logical sum to the region information corresponding to the uncovered background region and the covered background region.

In the event that the object corresponding to the foreground has texture, the region specifying unit 103 can specify the movement region more accurately.

The region specifying unit 103 can output the region information indicating the movement region as the region information indicating the foreground region, or output the region information indicating the still region as the region information indicating the background region.

While description has been made wherein the object corresponding to the background keeps still, the processing of specifying the region above described can be applied even if the image corresponding to the background region includes motion. For example, in the event that the image corresponding to the background region moves in a constant manner, the region specifying unit 103 shift the entire image corresponding to the movement, and performs processing in the same manner as with the case wherein the object corresponding to the background keeps still. Also, in the event that the image corresponding to the background region includes a different motion at each position, the region specifying unit 103 selects the pixel corresponding to the motion, and performs the above-described processing.

Figure 29:
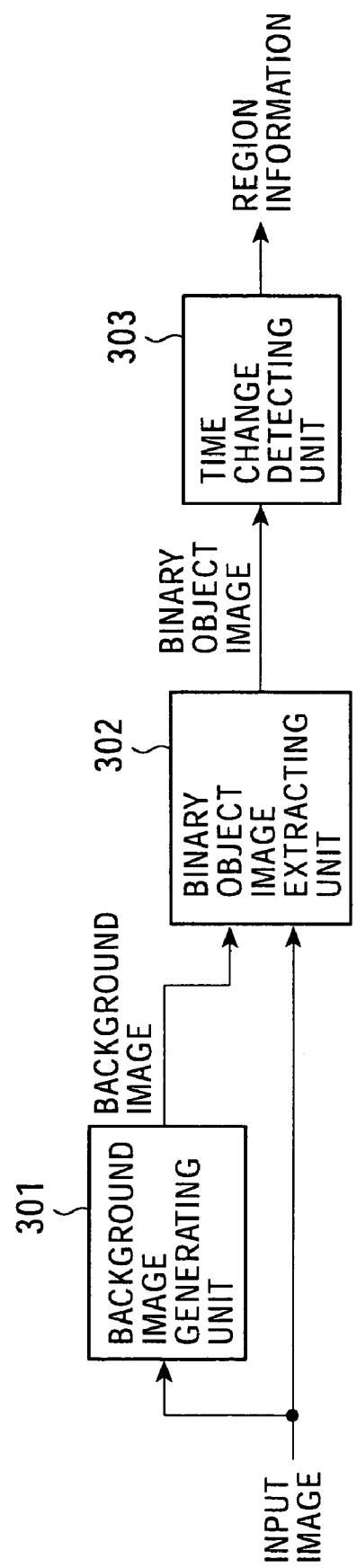
FIG. 29 is a block diagram illustrating an example of another configuration of the region specifying unit 103.

FIG. 29 is a block diagram which illustrates an example of another configuration of the region specifying unit 103, The region specifying unit 103 shown in FIG. 29 does not use movement vectors. A background image generating unit 301 generates the background image corresponding to the input image, and supplies the generated background image to a binary object image extracting unit 302. The background image generating unit 301 extracts, for example, the image object corresponding to the background object included in the input image, and generates the background image.

Figure 30:
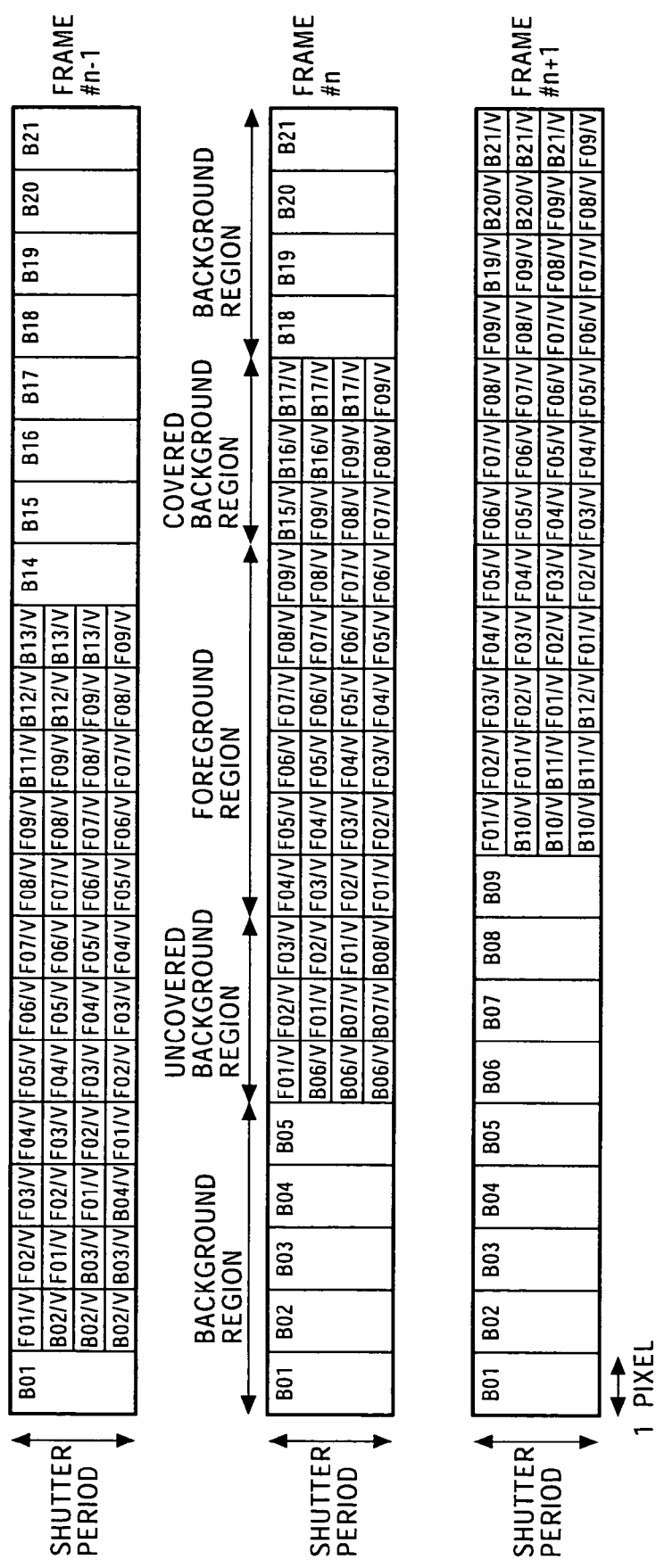
FIG. 30 is a model diagram wherein the pixel values are developed over the time direction, and periods corresponding to shutter time are divided.

An example of a model diagram is illustrated in FIG. 30 wherein the pixel values of the pixels arrayed in sequence adjacently in a movement direction of the image corresponding to the foreground object, develop over the time direction. For example, in the event that the movement direction of the image corresponding to the foreground object is horizontal to the screen, the model diagram in FIG. 30 illustrates a model wherein the pixel values of the adjacent pixels in one line develop over the time direction.

In FIG. 30, the line in the frame #n is the same as the line in the frame #n−1 and the line in the frame #n+1.

In the frame #n, the foreground components corresponding to the object, which are included in the sixth pixel through seventeenth pixel from the left, are included in the second through thirteenth pixels from the left in the frame #n−1, and are included in the tenth through 21st pixels from the left in the frame #n+1.

In the frame #n−1, the pixels belonging to the covered background region are the eleventh through thirteenth pixels from the left, and the pixels belonging to the uncovered background region are the second through fourth pixels from the left. In the frame #n, the pixels belonging to the covered background region are the fifteenth through the seventeenth pixels from the left, and the pixels belonging to the uncovered background region are the sixth through eighth pixels from the left. In the frame #n+1, the pixels belonging to the covered background region are the nineteenth through 21st pixels from the left, and the pixels belonging to the uncovered background region are the tenth through twelfth pixels from the left.

In the frame #n−1, the pixels belonging to the background region are the first from the left, and the fourteenth through 21st pixels from the left. In the frame #n, the pixels belonging to the background region are the first through fifth pixels from the left, and the eighteenth through 21st pixels from the left. In the frame #n+1, the pixels belonging to the background region are the first through ninth pixels from the left.

Figure 31:
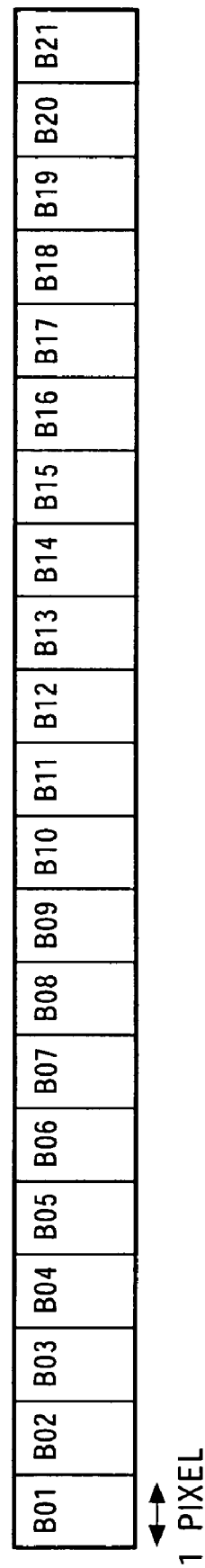
FIG. 31 is a diagram illustrating an example of a background image.

An example of the background image corresponding to the example shown in FIG. 30, which is generated by the background image generating unit 301, is illustrated in FIG. 31. The background image is made up of the pixels corresponding to the background object, and does not include image components corresponding to the foreground object.

The binary object image extracting unit 302 generates a binary object image based upon the correlation between the background image and the input image, and supplies the generated binary object image to a time change detecting unit 303.

Figure 32:
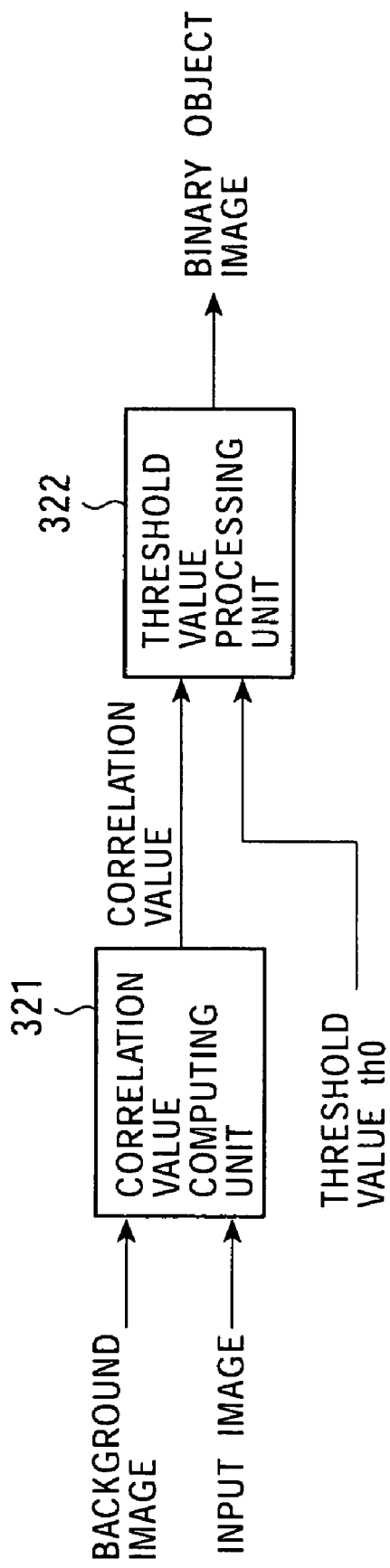
FIG. 32 is a block diagram illustrating the configuration of a binary object image extracting unit 302.

FIG. 32 is a block diagram which illustrates the structure of the binary object image extracting unit 302. A correlation value computing unit 321 computes the correlation between the background image and the input image supplied from the background generating unit 301, generates a correlation value, and supplies the generated correlation value to a threshold value processing unit 322.

The correlation value computing unit 321 applies Expression (4) to a block 3×3 wherein $X_4$ is centered in the background image as shown in FIG. 33A, and a block 3×3 wherein $Y_4$ is centered in the background image as shown in FIG. 33B, and calculates the correlation value corresponding to the $Y_4$, for example.

$$\text{Correlation Value} = \frac{\sum_{i=0}^{8}(Xi - \overline{X})\sum_{i=0}^{8}(Yi - \overline{Y})}{\sqrt{\sum_{i=0}^{8}(Xi - \overline{X})^2 \cdot \sum_{i=0}^{8}(Yi - \overline{Y})^2}} \quad (4)$$

$$\overline{X} = \frac{\sum_{i=0}^{8} Xi}{9} \quad (5)$$

$$\overline{Y} = \frac{\sum_{i=0}^{8} Yi}{9} \quad (6)$$

The correlation value computing unit 321 supplies the correlation value calculated corresponding to each pixel as described above to the threshold value processing unit 322.

Also, an arrangement may be made wherein the correlation value computing unit 321, for example, applies Expression (7) to the block 3 by 3 in the background image wherein $X_4$ is centered as shown in FIG. 34A, and the block 3 by 3 in the input image wherein $Y_4$ is centered corresponding to the block in the background image, and calculates the sum of absolute value of difference corresponding to $Y_4$.

$$\text{Sum of Absolute Value of Difference} = \sum_{i=0}^{8}|(Xi - Yi)| \quad (7)$$

The correlation value computing unit 321 supplies the difference absolute value sum calculated as described above as the correlation value to the threshold value processing unit 322.

The threshold value processing unit 322 compares the pixel value of the correlation image with the threshold value th0, and in the event that the correlation value is equal to or less than the threshold value th0, the threshold value processing unit 322 sets the pixel value of the binary object image to 1, and in the event that the correlation value is greater than the threshold value th0, the threshold value processing unit 322 sets the pixel value of the binary object image to 0, and accordingly the processing unit 322 outputs the binary object image of which each pixel value is set to 0 or 1. The threshold value processing unit 322 may store the threshold value th0 beforehand, and may use the threshold value th0 which is input externally.

Figure 35:
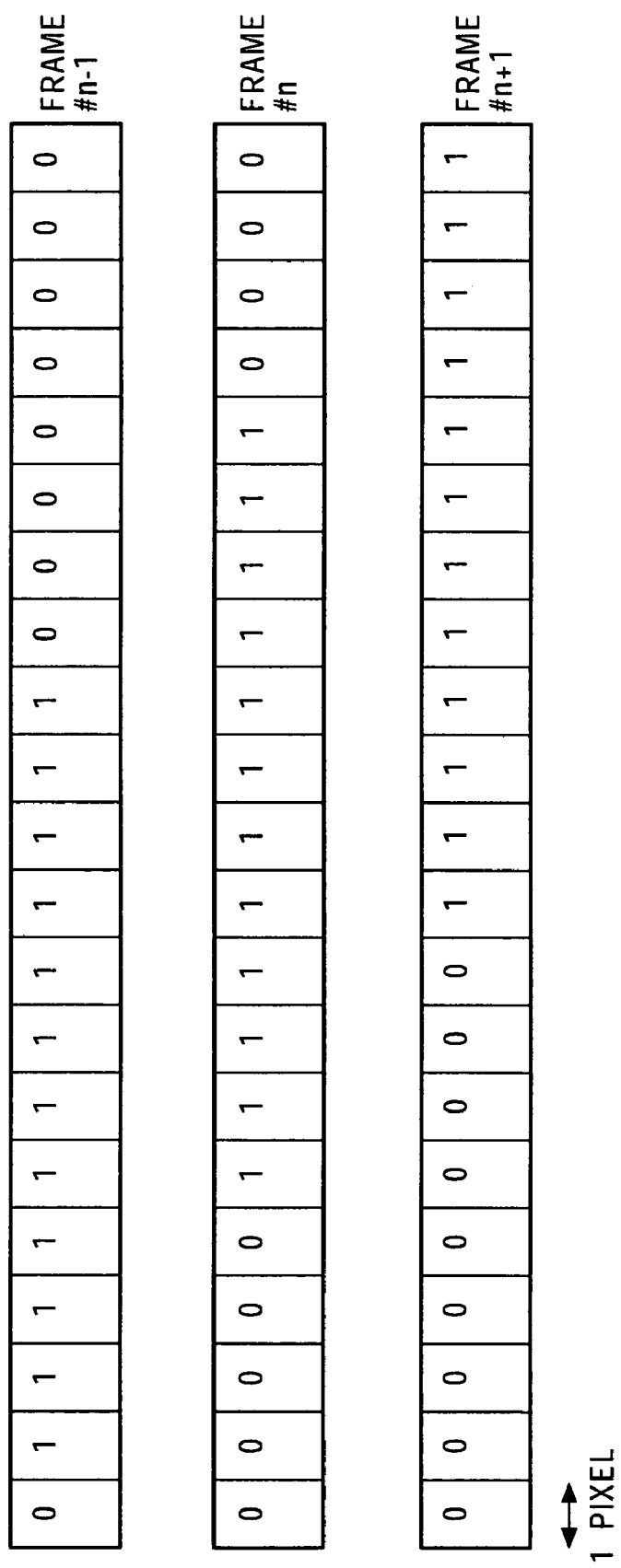
FIG. 35 is a diagram illustrating an example of a binary object image.

FIG. 35 is a diagram which illustrates an example of the binary object image corresponding to the model of the input image shown in FIG. 30. In the binary object image, a pixel value of a pixel having a high correlation with the background image is set to 0.

Figure 36:
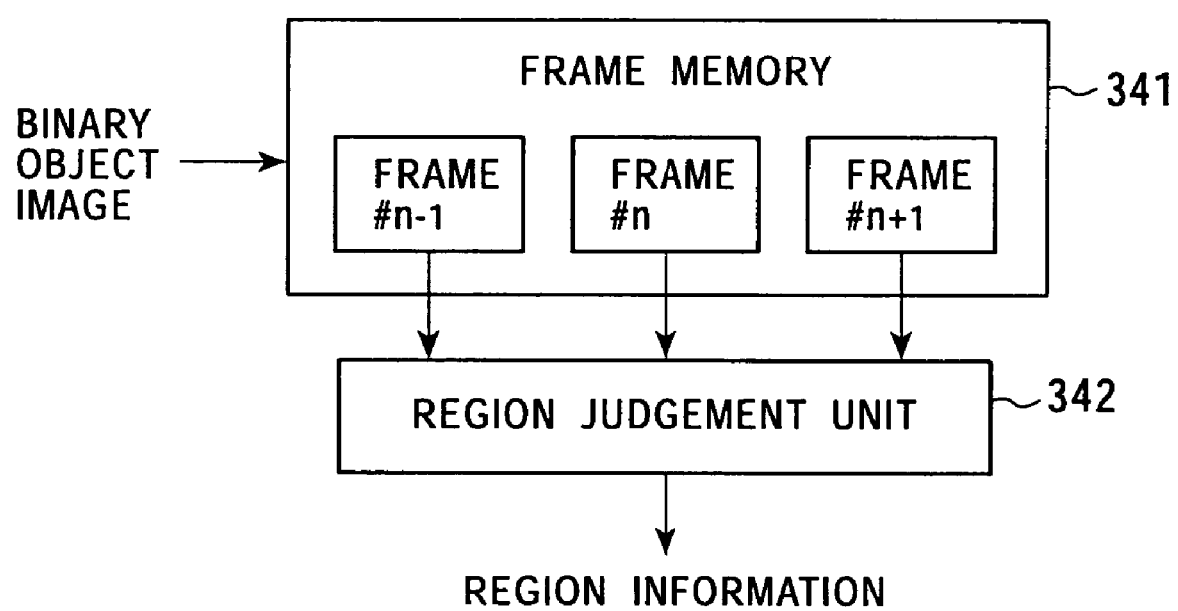
FIG. 36 is a block diagram illustrating the configuration of a time change detecting unit 303.

FIG. 36 is a block diagram which illustrates the structure of the time change detecting unit 303. Frame memory 341 stores the binary object images of the frame #n−1, frame #n, and frame #n+1, supplied from the binary object image extracting unit 302 at the point of judgment of the region for the pixel of the frame #n.

A region judgment unit 342 judges the region for each pixel of the frame #n based upon the binary object images of the frame #n−1, frame #n, and frame #n+1, which are stored in the frame memory 341, generates the region information, and outputs the generated region information.

FIG. 37 is a diagram which describes the judgment made by the region judgment unit 342. In the event that the pixel of interest of the binary object image of the frame #n is 0, the region judgment unit 342 judges the pixel of interest of the frame #n to belong to the background region.

In the event that the pixel of interest of the binary object image of the frame #n is 1, the pixel value of the corresponding pixel of the binary object image of the frame #n−1 is 1, and the corresponding pixel of the binary object image of the frame #n+1 is 1, the region judgment unit 342 judges the pixel of interest of the frame #n to belong to the foreground region.

In the event that the pixel of interest of the binary object image of the frame #n is 1, and the corresponding pixel of the binary object image of the frame #n−1 is 0, the region judgment unit 342 judges the pixel of interest of the frame #n to belong to the covered background region.

In the event that the pixel of interest of the binary object image of the frame #n is 1, and the corresponding pixel of the binary object image of the frame #n+1 corresponding to the frame #n is 0, the region judgment unit 342 judges the pixel of interest of the frame #n to belong to the uncovered background region.

Figure 38:
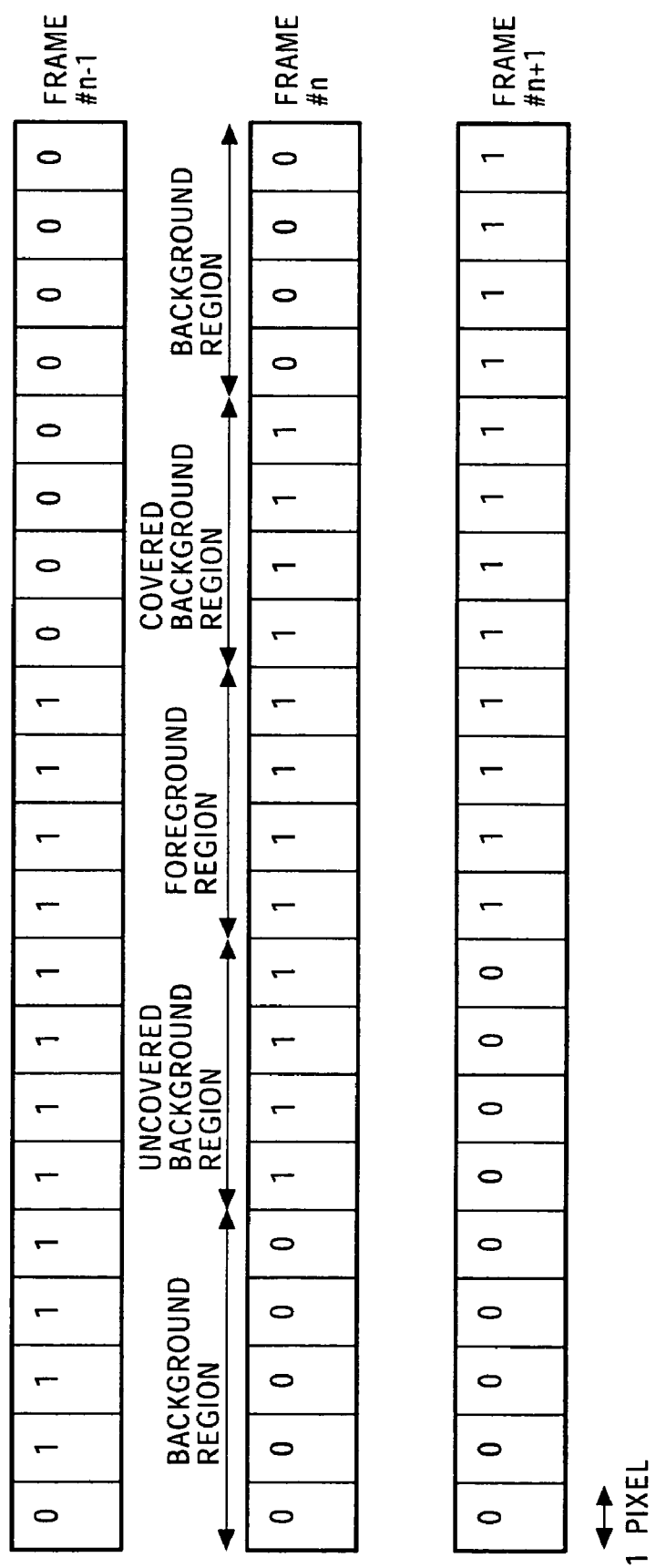
FIG. 38 is a diagram illustrating an example of judgment made by the time change detecting unit 303.

FIG. 38 is a diagram which illustrates an example wherein the time change detecting unit 303 judges the binary object image corresponding to the model of the input image shown in FIG. 30. The time change detecting unit 303 judges the first through fifth pixels from the left of the frame #n to belong to the background region since the corresponding pixels of the binary object image of the frame #n are 0.

The time change detecting unit 303 judges the sixth through ninth pixels from the left to belong to the uncovered background region since the corresponding pixels of the binary object image of the frame #n are 1, and the corresponding pixels of the frame #n+1 are 0.

The time change detecting unit 303 judges the tenth through thirteenth pixels from the left to belong to the foreground region since the pixel values of the pixels of the binary object image of the frame #n are 1, and the corresponding pixels of the frame #n+1 are 1.

The time change detecting unit 303 judges the fourteenth through seventeenth pixels from the left to belong to the covered background region since the pixels of the binary object image of the frame #n are 1, and the corresponding pixels of the frame #n−1 are 0.

The time change detecting unit 303 judges the eighteenth through 21st pixels from the left to belong to the background region since the corresponding pixels of the binary object image of the frame #n are 0.

Figure 39:
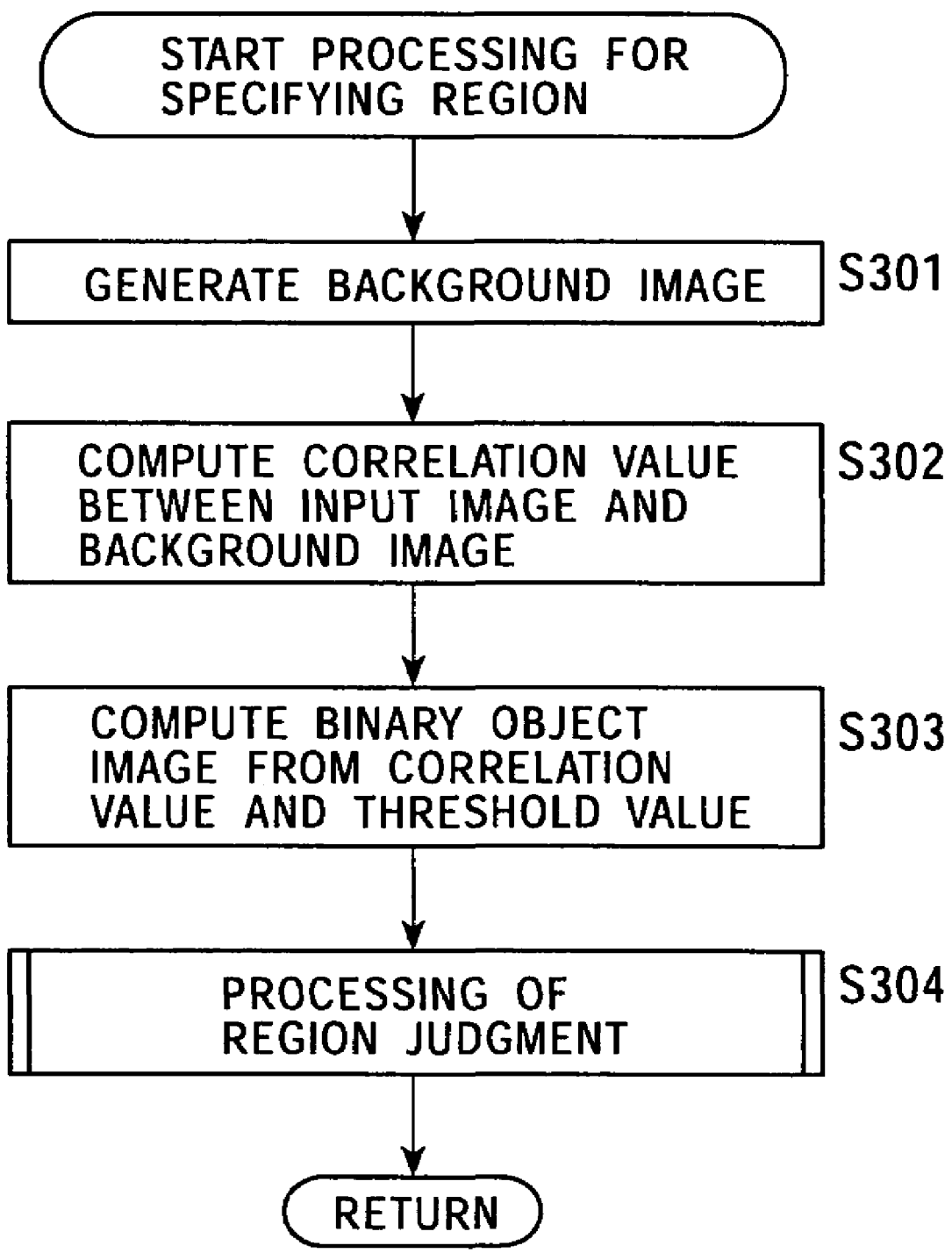
FIG. 39 is a flowchart describing processing for region specification by the region judgment unit 103.

The processing of specifying the region by the region judgment unit 103 will be now described, referring to the flowchart shown in FIG. 39. In Step S301, the background image generating unit 301 of the region judgment unit 103, for example, generates the background image by extracting the image object corresponding to the background object included in the input image based upon the input image, and supplies the generated background image to the binary object image extracting unit 302.

In Step S302, the binary object image extracting unit 302 computes the correlation value between the input image and the background image supplied from the background image generating unit 301 by the computation described referring to FIG. 33, for example. In Step S303, the binary object image extracting unit 302 computes the binary object image from the correlation value and the threshold value th0 by comparing the correlation value with the threshold value th0, for example.

In Step S304, the time change detecting unit 303 performs processing of region judgment, and the processing ends.

Figure 40:
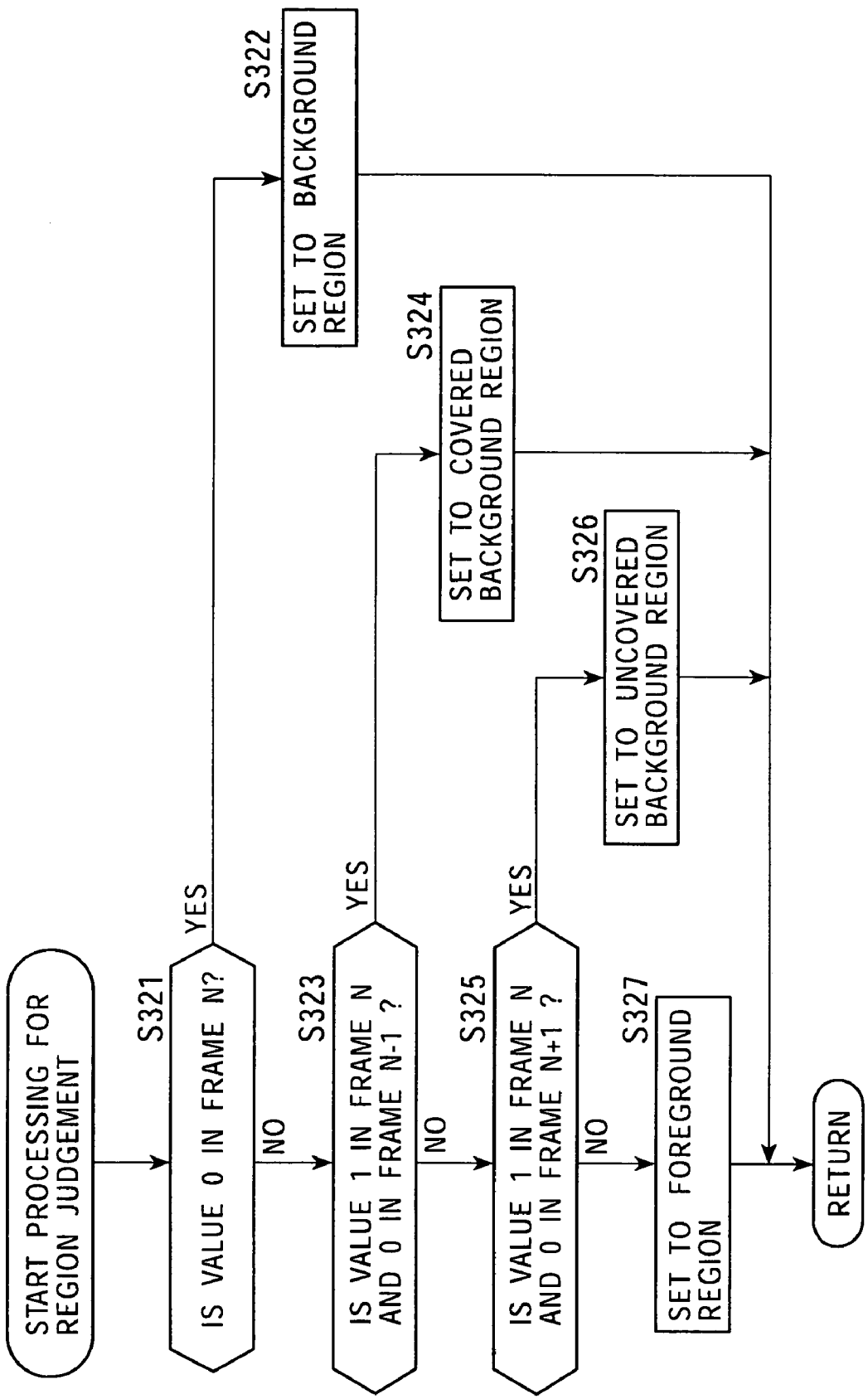
FIG. 40 is a flowchart for describing the processing for region specification in detail.

The processing of the region judgment corresponding to Step S304 will be described in detail, referring to the flowchart shown in FIG. 40. In Step S321, the region judgment unit 342 of the time change detecting unit 303 judges whether or not the pixel of interest in the frame #n stored in the frame memory 341 is 0, and in the event that the judgment is made that the pixel of the interest in the frame #n is 0, the flow proceeds to Step S322, makes settings to the effect that the pixel of interest in the frame #n belongs to the background region, and the processing ends.

In Step S321, in the event that judgment is made that the pixel of interest in the frame #n is 1, the flow proceeds to Step S323, and the region judgment unit 342 of the time change detecting unit 303 judges whether or not the pixel of interest in the frame #n stored in the frame memory 341 is 1, and the corresponding pixel in the frame #n−1 is 0, and in the event that judgment is made that the pixel of interest in the frame #n is 1, and the pixel value of the corresponding pixel in the frame #n−1 is 0, the flow proceeds to Step S324, makes settings to the effect that the pixel of interest in the frame #n belongs to the covered background region, and the processing ends.

In Step S323, in the event that judgment is made that the pixel of interest in the frame #n is 0, or the corresponding pixel in the frame #n−1 is 1, the flow proceeds to Step S325, and the region judgment unit 342 of the time change detecting unit 303 judges whether or not the pixel of interest in the frame #n stored in the frame memory 341 is 1, and the corresponding pixel in the frame #n+1 is 0, and in the event that judgment is made that the pixel of interest in the frame #n is 1, and the corresponding pixel in the frame #n+1 is 0, the flow proceeds to Step S326, makes settings to the effect that the pixel of interest in the frame #n belongs to the uncovered background region, and the processing ends.

In Step S325, in the event that judgment is made that the pixel of interest in the frame #n is 0, or the corresponding pixel in the frame #n+1 is 1, the flow proceeds to Step S327, and the region judgment unit 342 of the time change detecting unit 303 sets the pixel of interest in the frame #n for the foreground region, and the processing ends.

As described above, the region specifying unit 103 can classify the pixel of the input image into one of the foreground region, the background region, the covered background region, or the uncovered background region, and generate region information corresponding to the classified results.

Figure 41:
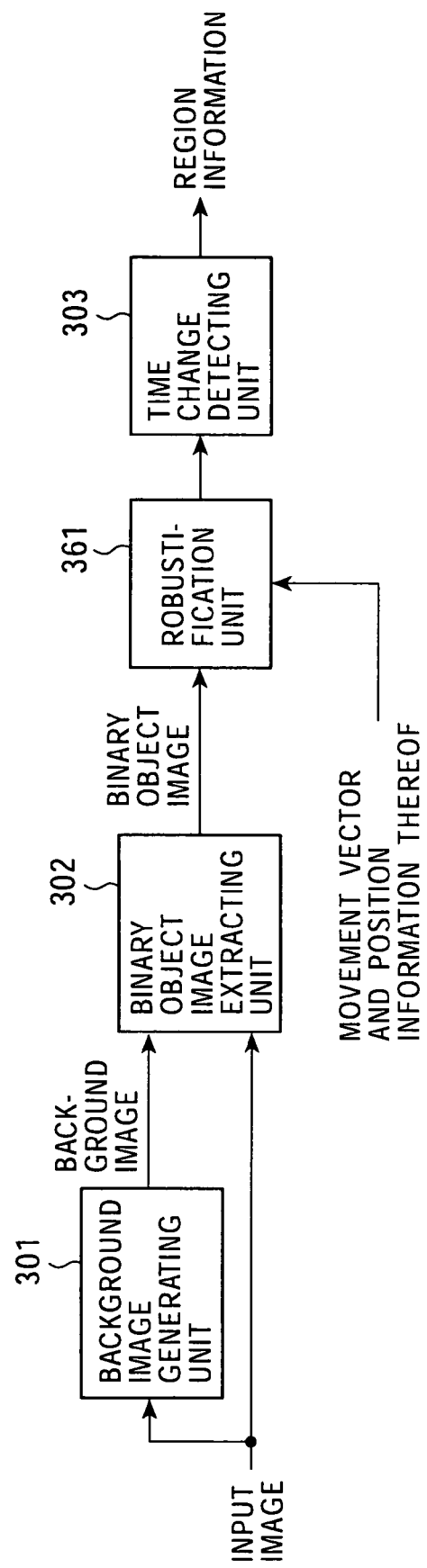
FIG. 41 is a block diagram illustrating yet another configuration of the region specifying unit 103.

FIG. 41 is a block diagram which illustrates another structure of the region specifying unit 103. The region specifying unit 103 shown in FIG. 41 uses the movement vector and the position information thereof, which are supplied from the movement detecting unit 102. Portions the same as those shown in FIG. 29 are denoted by the same reference numerals, and description thereof will be omitted.

A robustification unit 361 generates a robustified binary object image based upon N frames of the binary object image supplied from the binary object image extracting unit 302, and outputs to the time change detecting unit 303.

Figure 42:
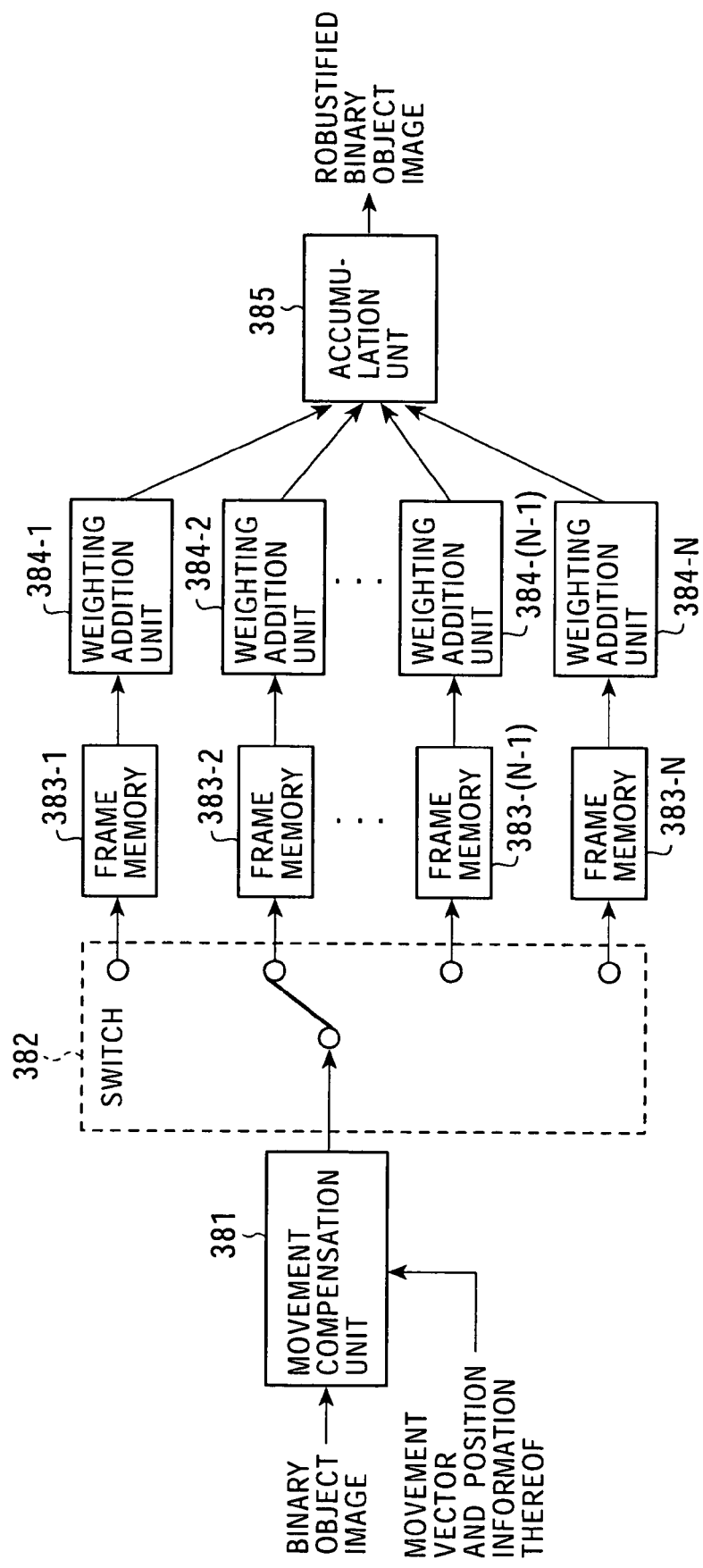
FIG. 42 is a block diagram describing the configuration of a robustification unit 361.

FIG. 42 is a block diagram which describes the structure of the robustification unit 361. A movement compensation unit 381 compensates for the movement of the binary object image of N frames based upon the movement vector and the position information thereof supplied from the movement detecting unit 102, and outputs the binary object image, in which the movement has been compensated, to the switch 382.

Figure 43:
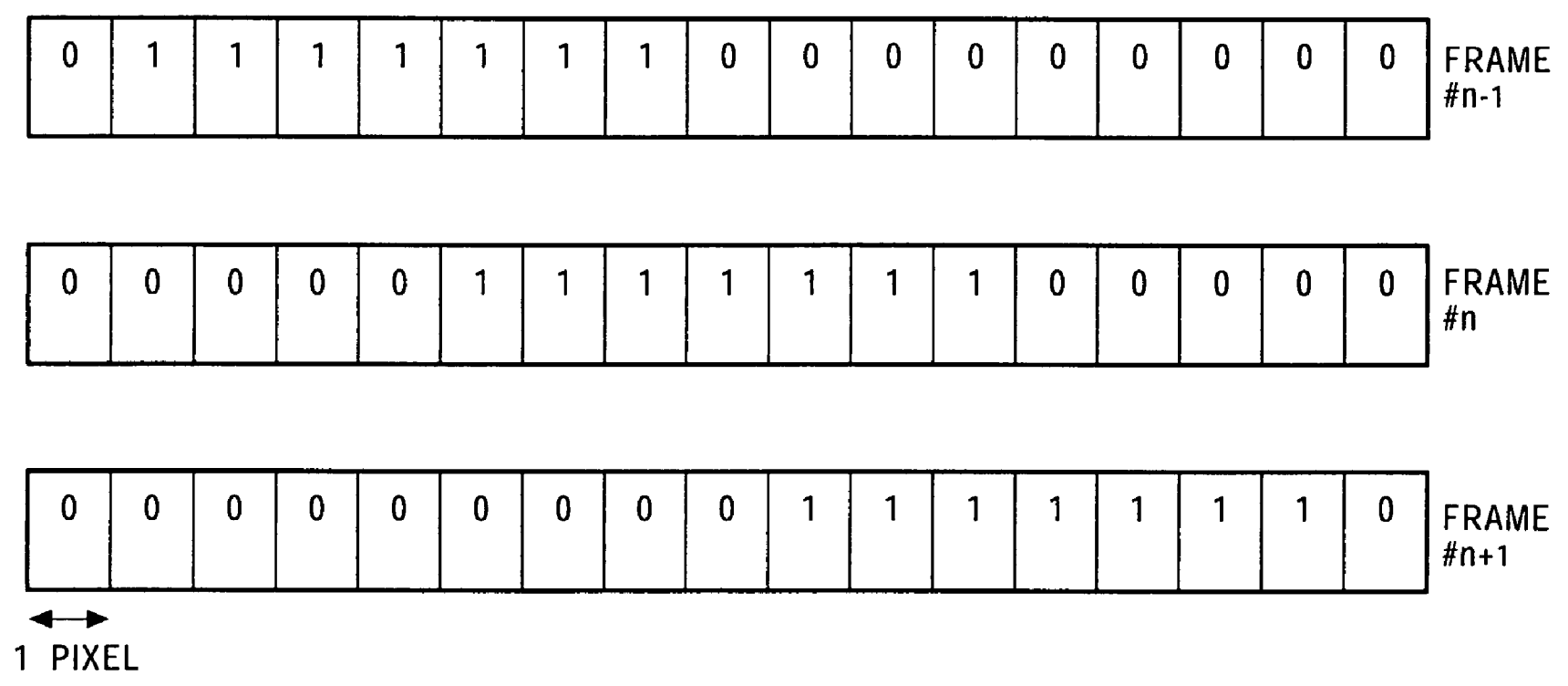
Figure 44:
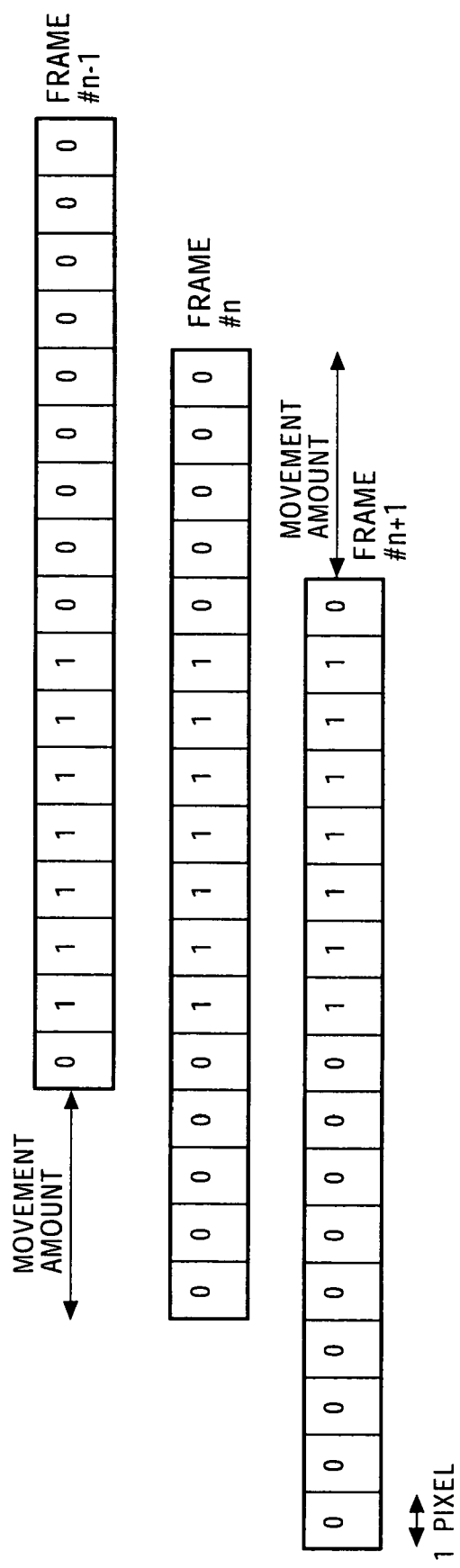
FIG. 44 is a diagram describing movement compensation of a movement compensation unit 381.

The movement compensation of the movement compensation unit 381 will be described with reference to examples shown in FIG. 43 and FIG. 44. For example, in cases wherein the region in the frame #n is judged, in the event that there is input of the binary object images of the frame #n−1, the frame #n, and the frame #n+1, shown by way of the example in FIG. 43, the movement compensation unit 381 compensates for movement of the binary object image of the frame #n−1 and the binary object image of the frame #n+1, based upon the movement vector supplied from the movement detecting unit 102, and supplies the binary object image in which movement has been compensated to the switch 382, as indicated in the example shown in FIG. 44.

The switch 382 outputs the binary object image, in which the movement of the first frame has been compensated, to the frame memory 383-1, and outputs the binary object image in which the movement of the second frame to the frame memory 383-2 has been compensated. Similarly, the switch 382 outputs each of the binary object images of which the third through N−1'th frames have been subjected to compensation for the movement to each of frame memory 383-3 through frame memory 383-(N−1), respectively, and outputs the binary object image of which the N'th frame has been subjected to movement compensation to frame memory 383-N.

The frame memory 383-1 stores the binary object image of which the first frame has been compensated for movement, and outputs the stored binary object image to a weighting addition unit 384-1. The frame memory 383-2 stores the binary object image of which the second frame has been compensated for movement, and outputs the stored binary object image to a weighting addition unit 384-2.

Similarly, each of the frame memory 383-3 through the frame memory 383-(N−1) stores each of the binary object images of which one of the third frame through N−1'th frame has been subjected to compensation for the movement, and outputs the stored binary object image to each of the weighing addition unit 384-3 through the weighing addition unit 384-(N−1). The frame memory 383-N stores the binary object image of which N'th frame has been subjected to compensation for the movement, and outputs the stored binary object image to a weighing addition unit 384-N.

The weighing addition unit 384-1 multiplies the pixel value of the binary object image of which the first frame has been subjected to compensation for the movement supplied from the frame memory 383-1 by the predetermined weight w2, and supplies to an accumulation unit 385. The weighing addition unit 384-2 multiplies the pixel value of the binary object image of the second frame which has been subjected to movement compensation supplied from the frame memory 383-2 by the predetermined weight w2, and supplies to an accumulation unit 385.

Similarly, each of the weighting addition unit 384-3 through the weighing addition unit 384-(N−1) multiplies the pixel value of the binary object image of one of the third through N−1'th frames, which has been subjected to movement compensation supplied from one of the frame memory 383-3 through the frame memory 383-(N−1) by the predetermined weights w3 through w(N−1), and supplies to the accumulation unit 385. A weighing addition unit 384-N multiplies the pixel value of the binary object image of the N'th frame supplied from the frame memory 383-N which has been subjected to movement compensation by the predetermined weight wN, and supplies to the accumulation unit 385.

The accumulation unit 385 accumulates the pixel value corresponding to the binary object image, wherein each of the first through N'th frames which are compensated for movement is multiplies by one of the predetermined weights w1 through wN, and generates the binary object image by comparing the accumulated pixel value with the predetermined threshold value th0.

As described above, the robustification unit 361 generates the robustified binary object image from the N frames of binary object images, which is supplied to the time change detecting unit 303, so the region specifying unit 103 of which the structure is shown in FIG. 41 can specify the region more accurately as compared with the case shown in FIG. 29, even if the input image includes noise.

Figure 45:
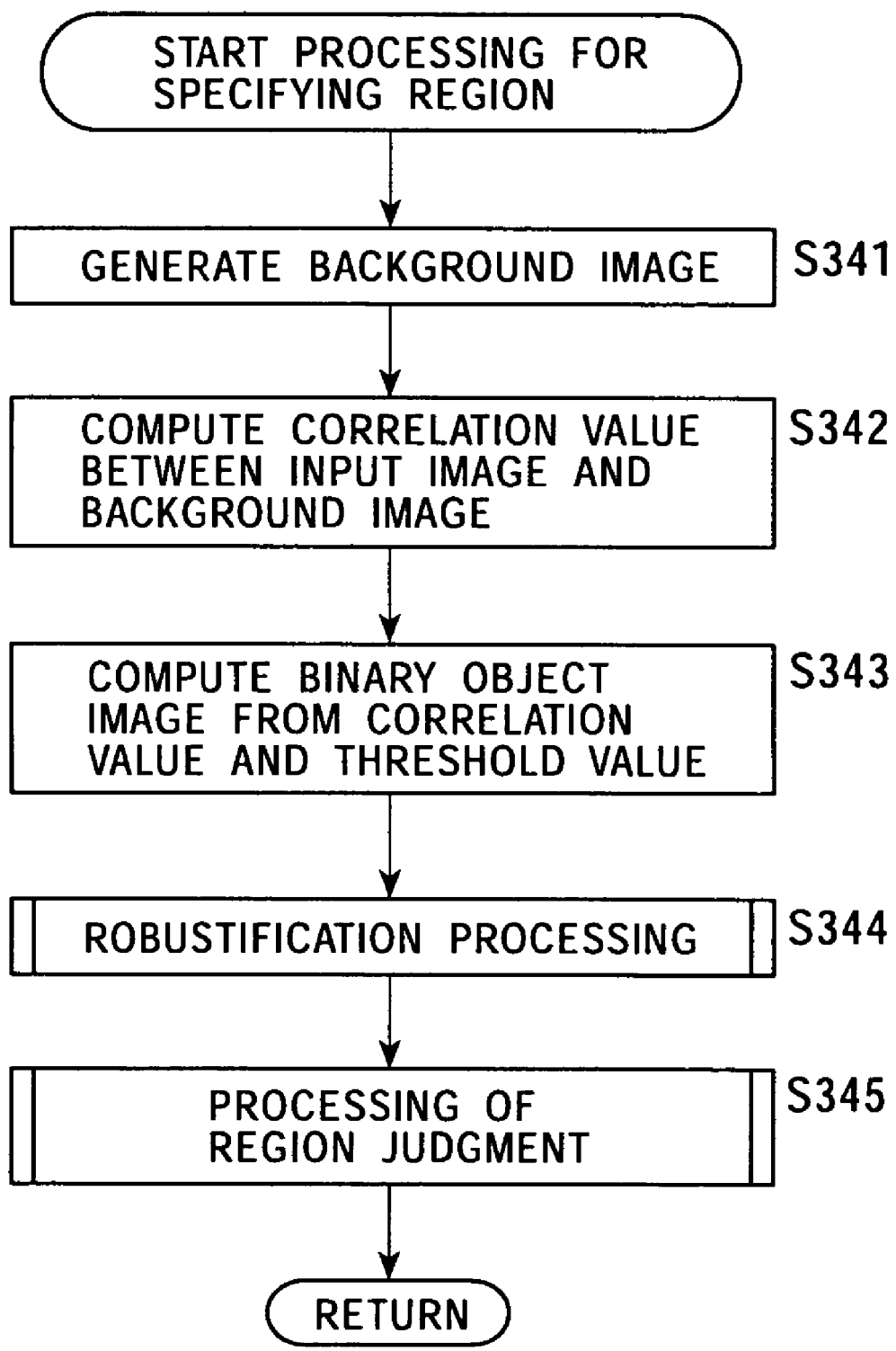
FIG. 45 is a flowchart describing the processing for region specification.

The processing for specifying the region of the region specifying unit 103 of which the structure is shown in FIG. 41 will now be described, referring to the flowchart shown in FIG. 45. The processing in Step S341 through Step S343 is the same as Step S301 through Step S303 described in the flowchart shown in FIG. 39, respectively, and accordingly, description thereof will be omitted.

In Step S344, the robustification unit 361 performs processing for robustification.

In Step S345, the time change detecting unit 303 performs processing for specifying the region, and processing ends. The details of the processing in Step S345 are the same as the processing described with reference to the flowchart shown in FIG. 40, so description thereof will be omitted.

Figure 46:
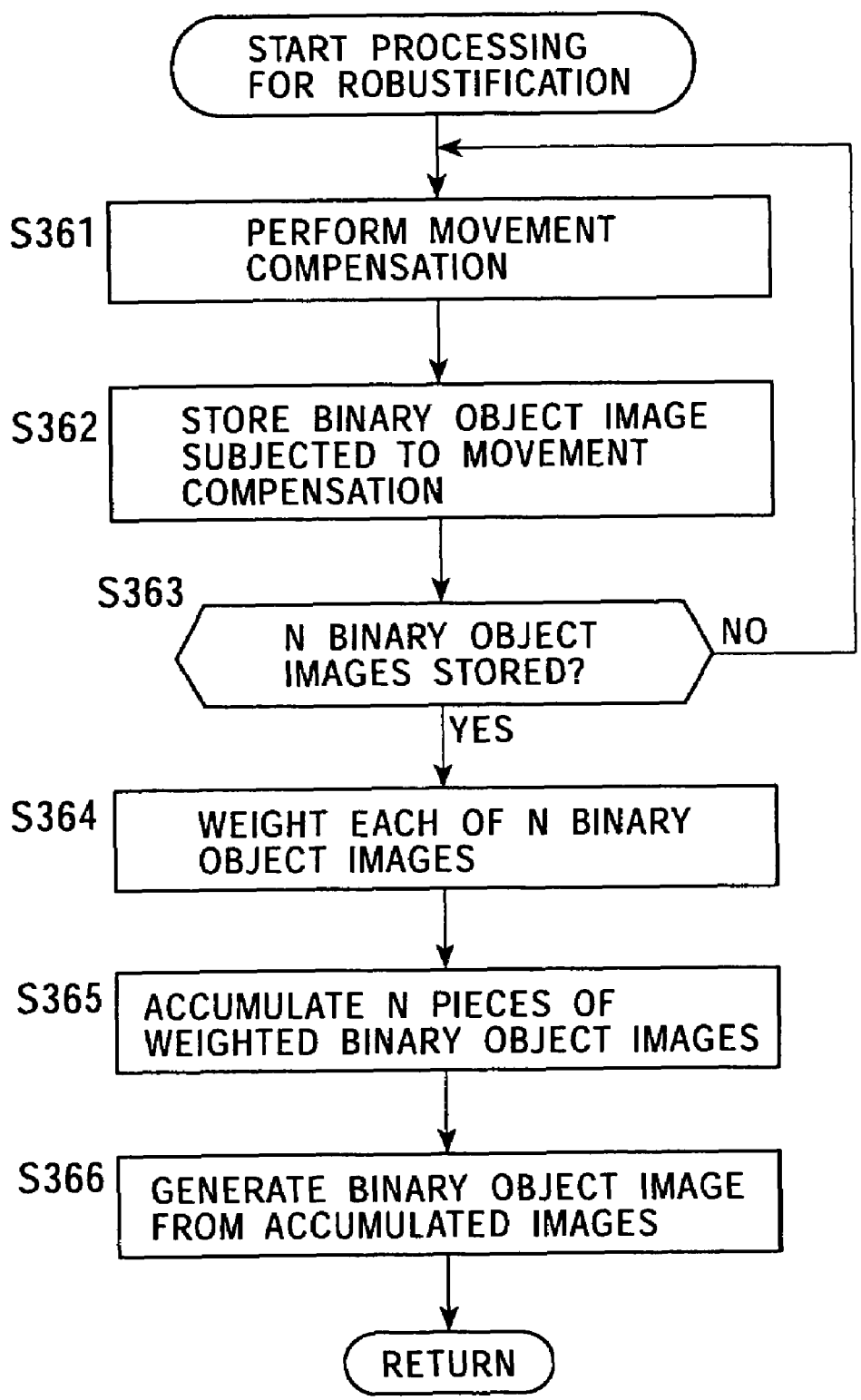
FIG. 46 is a flowchart describing details of processing for robustification.

Referring to the flowchart shown in FIG. 46, processing of robustification corresponding to the processing in Step S344 shown in FIG. 45 will now be described in detail. In Step S361, the movement compensation unit 381 performs movement compensation processing of the input binary object image based upon the movement vector and the position information thereof supplied from the movement detecting unit 102. In Step S362, one of the frame memory 383-1 through the frame memory 383-N stores the binary object image, which has been subjected to movement compensation, supplied via the switch 382.

In Step S363, the robustification unit 361 judges whether or not N binary object images are stored, and in the event that N binary object images are judged not to be stored, the flow returns to Step S361, and the robustification unit 361 repeats processing of compensation for movement of the binary object image, and processing of storing the binary object image.

In Step S363, in the event that N binary object images are judged to be stored, the flow proceeds to Step S364, and each of the weighting addition units 384-1 through 384-N multiplies each of N binary object images, by one of the weights w1 through wN for weighting.

In Step S365, the accumulation unit 385 accumulates the N weighted binary object images.

In Step 366, the accumulation unit 385 generates the binary object image from the accumulated image, for example, by comparing with the predetermined threshold value th1, and the processing ends.

As described above, the region specifying unit 103 of which the structure is shown in FIG. 41 can generate the region information based upon the robustified binary object image.

As described above, the region specifying unit 103 can generate the region information which indicates which of the movement region, the still region, the uncovered background region, or the covered background region, each of pixels included in the frame belongs to.

Figure 47:
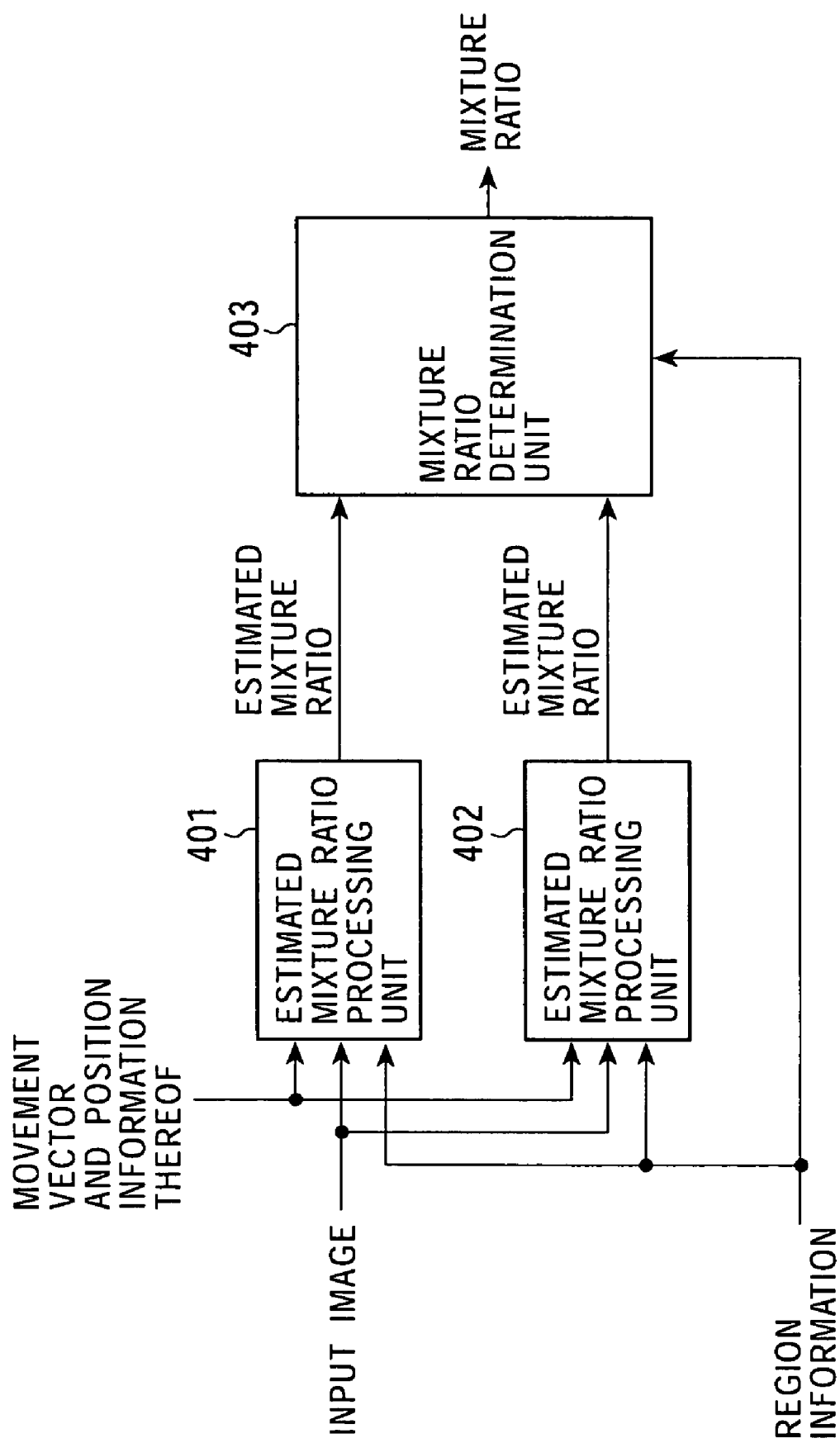
FIG. 47 is a block diagram illustrating the configuration of a mixture ratio calculating unit 104.

FIG. 47 is a block diagram which illustrates the structure of the mixture ratio calculating unit 104. An estimated mixture ratio processing unit 401 calculates estimated mixture ratio corresponding to the mixture ratio α for each pixel, or calculates the estimated mixture ratio for each contour region described later, by computation corresponding to the covered background region based upon the movement vector and the position information thereof supplied from the movement detecting unit 102, the region information supplied from the region specifying unit 103, and the input image, and supplies the calculated estimated mixture ratio to a mixture ratio determination unit 403.

An estimated mixture ratio processing unit 402 calculates estimated mixture ratio corresponding to the mixture ratio α for each pixel, or calculates the estimated mixture ratio for each contour region described later, by computation corresponding to the uncovered background region based upon the movement vector and the position information thereof supplied from the movement detecting unit 102, the region information supplied from the region specifying unit 103, and the input image, and supplies the calculated estimated mixture ratio to a mixture ratio determination unit 403.

The mixture ratio determination unit 403 sets the mixture ratio α based upon the region information which indicates which of the foreground region, the background region, the covered background region, or the uncovered background region, the pixel which is the object of calculation of the mixture ratio α belongs to, which is supplied from the region specifying unit 101. In the event that the pixel which is the object belongs to the foreground region, the mixture ratio determination unit 403 sets the mixture ratio α to 0, in the event that the pixel which is the object belongs to the background region, sets the mixture ratio α to 1, in the event that the pixel which is the object belongs to the covered background region, sets the mixture ratio α to the estimated mixture ratio supplied from the estimated mixture ratio processing unit 401, and in the event that the pixel which is the object belongs to the uncovered background region, sets the mixture ratio α to the estimated mixture ratio supplied from the estimated mixture ratio processing unit 402. The mixture ratio determination unit 403 outputs the mixture ratio α which is set based upon the region information.

Since an assumption may be made that the object corresponding to the foreground moves at a constant velocity within a shutter period, the mixture ratio α of the pixel belonging to the mixed region has the nature described below. That is to say, the mixture ratio α changes linearly, corresponding to the change of the pixel position. In the event that the change of the pixel position is one-dimensional, the change of the mixture ratio α can be represented by a straight line, and in the event that the change of the pixel position is two-dimensional, the change of the mixture ratio α can be represented in a planar manner.

Note that since the period of one frame is short, an assumption may be made that the object corresponding to the foreground is a rigid body, and moves at a constant velocity.

Figure 48:
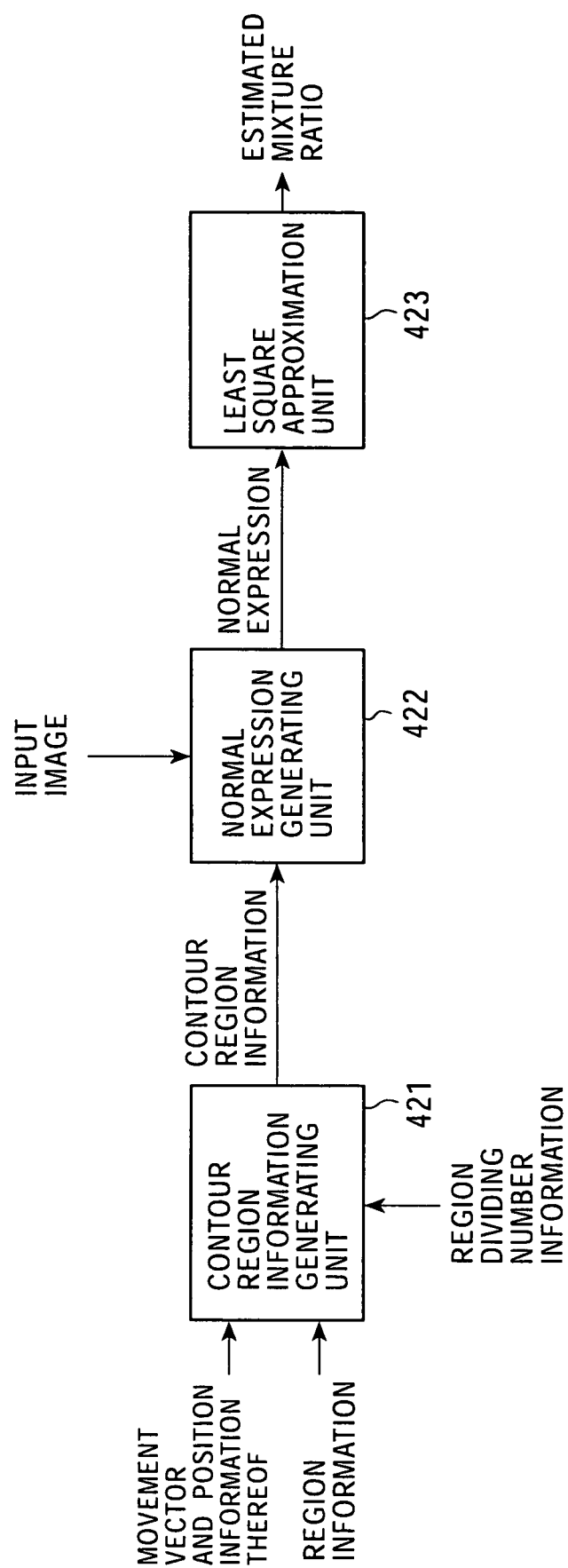
FIG. 48 is a block diagram illustrating the configuration of an estimated mixture ratio processing unit 401.

FIG. 48 is a block diagram illustrating the configuration of an estimated mixture ratio processing unit 401. A contour region information generating unit 421 generates contour region information indicating a contour region which is a region of pixels having approximately the same mixture ratio α, based on the movement vector supplied from the movement detecting unit 102 and the positional information thereof, the region information supplied from the region specifying unit 103, and region dividing number information indicating the number of divisions of the region specified by the user, and supplies the generated contour region information to the normal equation generating unit 422.

Contour regions indicated by contour region information generated by the contour region information generating unit 421 will be described, with reference to FIG. 49 through FIG. 51.

Figure 49:
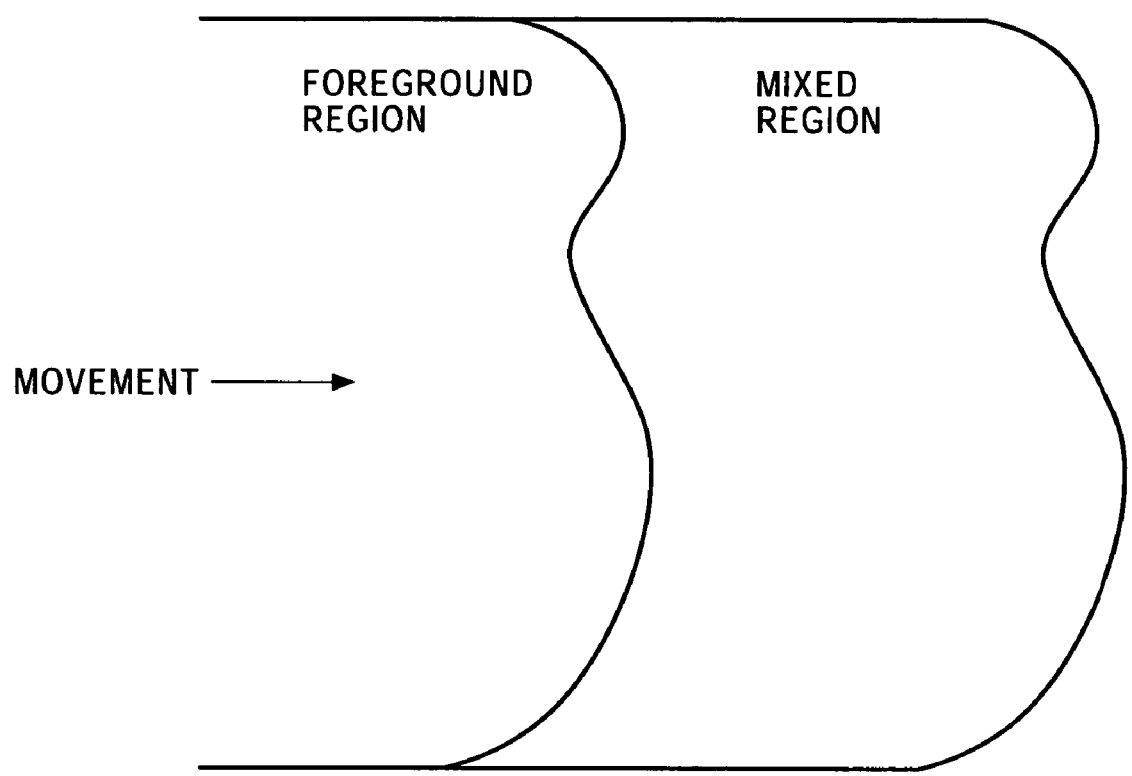
FIG. 49 is a diagram illustrating a mixed region which is a covered background region.

FIG. 49 is a diagram illustrating a mixed region which is a covered background region, positioned ahead in the direction of movement of a foreground object.

As shown in FIG. 49, the length of the covered background region in the same direction as the movement vector corresponding to the movement amount v.

Figure 50:
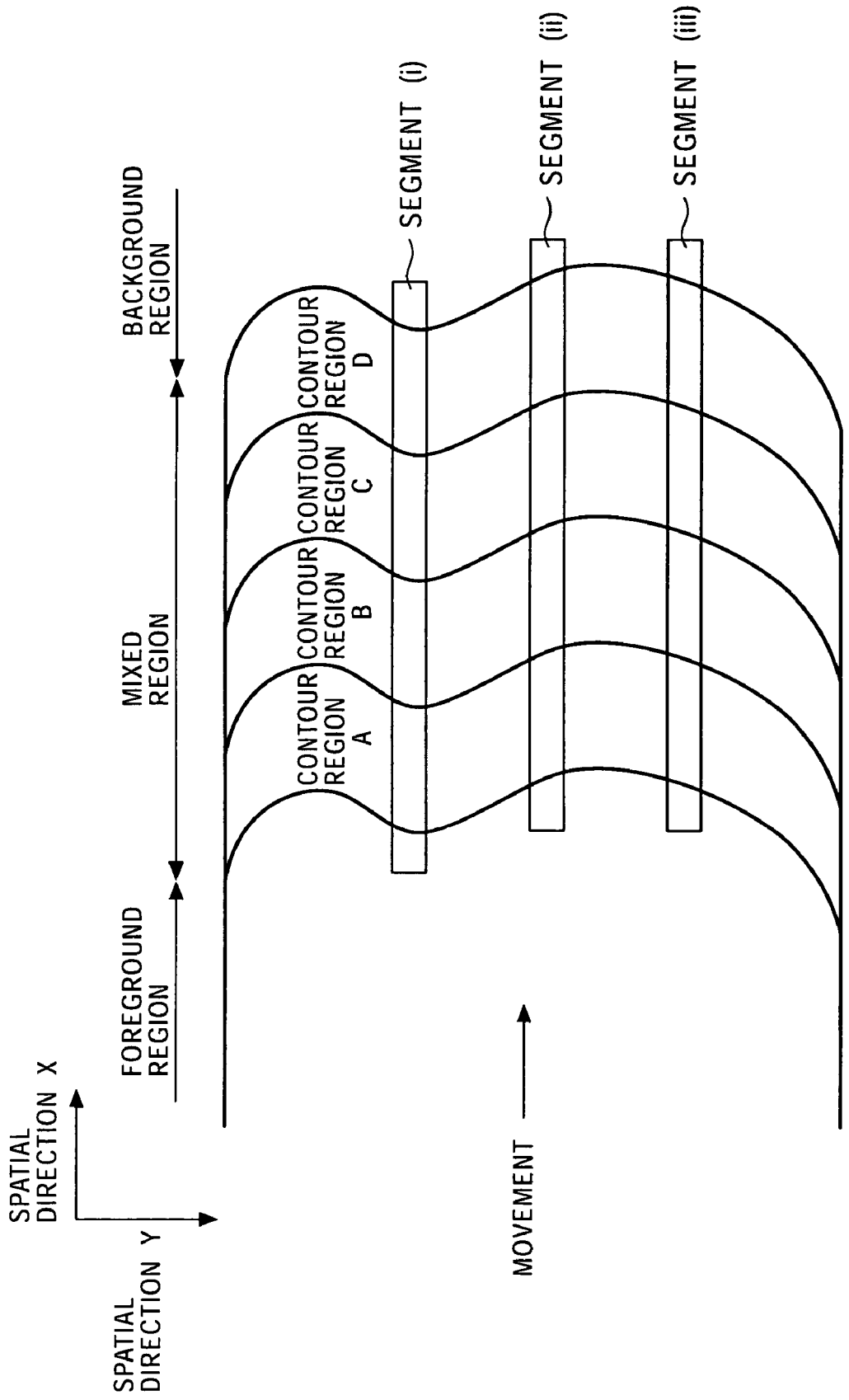
FIG. 50 is a diagram describing a contour region.

As shown in FIG. 50, the contour region information generating unit 421 outputs to a normal equation generating unit 422, contour region information wherein within a range of a predetermined length in the same direction as the direction of the movement vector is taken as a contour region A, with a pixel belonging to the foreground region positioned at the boundary between the foreground region and the covered background region as a reference, based on, for example, the movement vector and positional information thereof, region information, and region dividing number information.

The movement amount v is a value representing change in the position of an image corresponding to a moving object in increments of pixel intervals.

The length determined beforehand in the direction of the movement vector, for determining the contour region A, is a length shorter in comparison to the pixel interval corresponding to the movement amount v, in increments of pixel intervals.

For example, in the event that the movement amount v is 5, the predetermined length in the direction of the movement vector can be made to be a length corresponding to 1 pixel.

The contour region information generating unit 421 outputs to the normal equation generating unit 422, contour region information wherein within a range of a predetermined length in the same direction as the direction of the movement vector is taken as a contour region B, with a pixel which is a pixel belonging to the contour region A and is at a position farthest from the foreground region in the direction of the movement vector as a reference, based on, for example, the movement vector and positional information thereof, region information, and region dividing number information.

The contour region information generating unit 421 outputs to the normal equation generating unit 422, contour region information wherein within a range of a predetermined length in the same direction as the direction of the movement vector is taken as a contour region C, with a pixel which is a pixel belonging to the contour region B and is at a position farthest from the foreground region in the direction of the movement vector as a reference, based on, for example, the movement vector and positional information thereof, region information, and region dividing number information.

In this way, the contour region information generating unit 421 outputs to the normal equation generating unit 422, contour region information wherein within a range of a predetermined length in the same direction as the direction of the movement vector is taken as a contour region D, with a pixel which is a pixel belonging to the contour region C and is at a position farthest from the foreground region in the direction of the movement vector as a reference, based on, for example, the movement vector and positional information thereof, region information, and region dividing number information.

In this way, the contour region information generating unit 421 outputs contour region information which is information for divided the mixed region into multiple contour regions, based on a predetermined length in the direction of the movement vector, to the normal equation generating unit 422.

Next, description will be made regarding the mixture ratio $\alpha$ of pixels belonging to contour regions.

Figure 51:
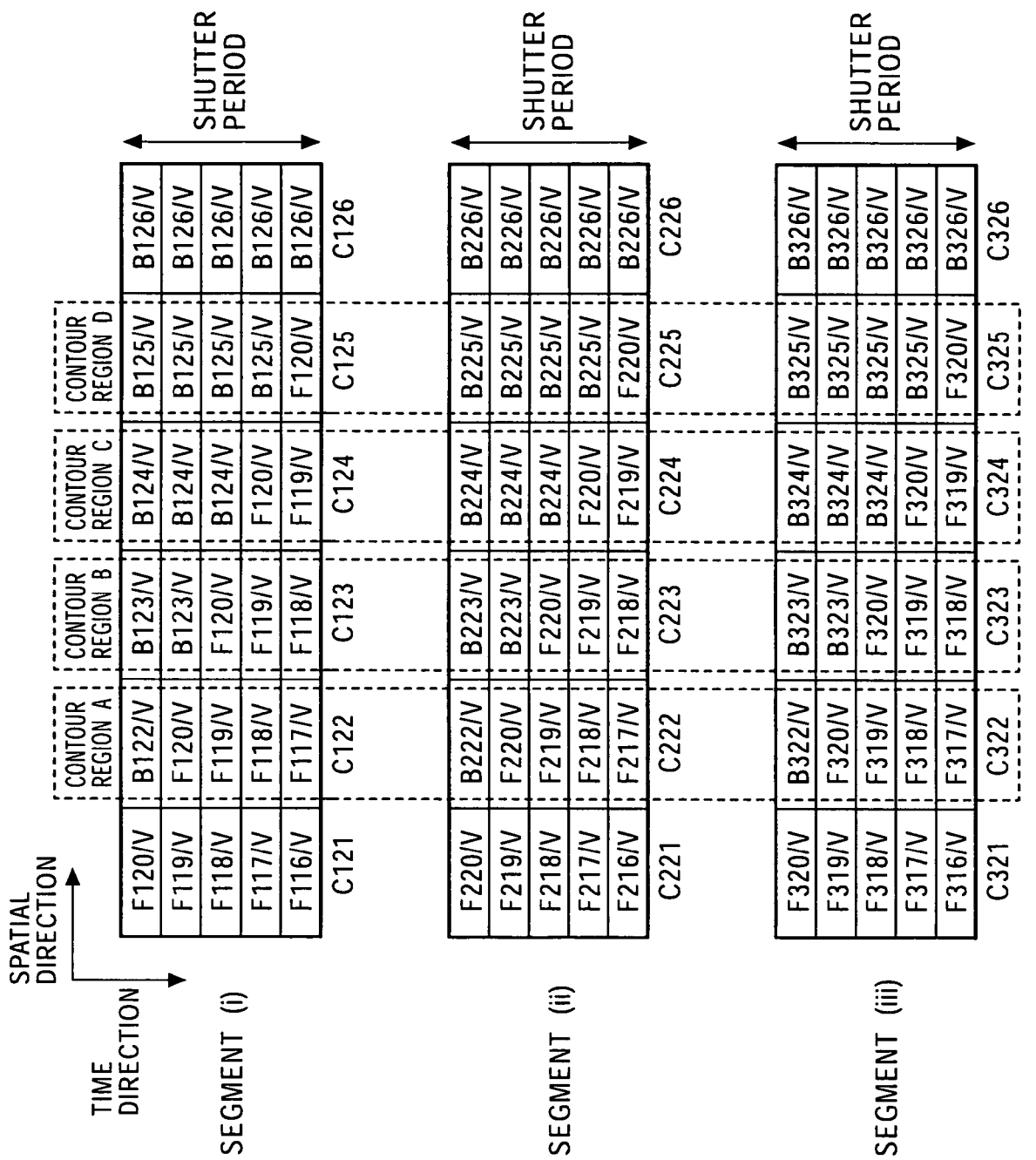
FIG. 51 is a model diagram wherein pixel values of pixels in a contour region are developed over the time direction, and a time period corresponding to shutter time is divided.

FIG. 51 illustrates a model diagram developing over the time direction pixel value of pixels on a line segment (i), line segment (ii), or line segment (iii), shown in FIG. 50, which are line segments in the same direction as the direction of the movement vector and extend from a pixel of the foreground region positioned at the boundary with the mixed region to a pixel of the background region positioned at the boundary with the mixed region.

In the example in FIG. 51, a pixel value C122 of the second pixel from the left on the line segment (i), which is a pixel belonging to the contour region A, contains the background component B122/v, the foreground component F120/v, the foreground component F119/v, the foreground component F118/v, and the foreground component F117/v. The pixel value C122 contains one background component and four foreground components, so the mixture ratio $\alpha$ of the second pixel from the left on the line segment (i) having the pixel value of C122 is 1/5.

In the example in FIG. 51, a pixel value C222 of the second pixel from the left on the line segment (ii), which is a pixel belonging to the contour region A, contains the background component B222/v, the foreground component F220/v, the foreground component F219/v, the foreground component F218/v, and the foreground component F217/v. The pixel value C222 contains one background component and four foreground components, so the mixture ratio $\alpha$ of the second pixel from the left on the line segment (ii) having the pixel value of C222 is 1/5.

In the same way, in the example in FIG. 51, a pixel value C322 of the second pixel from the left on the line segment (iii), which is a pixel belonging to the contour region A, contains the background component B322/v, the foreground component F320/v, the foreground component F319/v, the foreground component F318/v, and the foreground component F317/v. The pixel value C322 contains one background component and four foreground components, so the mixture ratio $\alpha$ of the second pixel from the left on the line segment (iii) having the pixel value of C322 is 1/5.

In the example in FIG. 51, a pixel value C123 of the third pixel from the left on the line segment (i), which is a pixel belonging to the contour region B, contains two background components B123/v, the foreground component F120/v, the foreground component F119/v, and the foreground component F118/v. The pixel value C123 contains two background components and three foreground components, so the mixture ratio $\alpha$ of the third pixel from the left on the line segment (i) having the pixel value of C123 is 2/5.

In the example in FIG. 51, a pixel value C223 of the third pixel from the left on the line segment (ii), which is a pixel belonging to the contour region B, contains two background components B223/v, the foreground component F220/v, the foreground component F219/v, and the foreground component F218/v. The pixel value C223 contains two background components and three foreground components, so the mixture ratio $\alpha$ of the third pixel from the left on the line segment (ii) having the pixel value of C223 is 2/5.

In the same way, in the example in FIG. 51, a pixel value C323 of the third pixel from the left on the line segment (iii), which is a pixel belonging to the contour region B, contains two background components B323/v, the foreground component F320/v, the foreground component F319/v, and the foreground component F318/v. The pixel value C323 contains two background components and three foreground components, so the mixture ratio α of the third pixel from the left on the line segment (iii) having the pixel value of C323 is 2/5.

In the same way, a pixel having a pixel value C124, a pixel having a pixel value C224, and a pixel having a pixel value C324, which are pixels belonging to the contour region C, have a mixture ratio α of 3/5.

A pixel having a pixel value C125, a pixel having a pixel value C225, and a pixel having a pixel value C325, which are a pixels belonging to the contour region D, have a mixture ratio α of 4/5.

In this way, in the event that the width of a contour region corresponding to one pixel, the mixture ratio of the pixels belonging to the same contour region have the same value.

Accordingly, the mixture ratio calculating unit 104 may calculate the mixture ratio corresponding to the contour region, and take the calculated mixture ratio α the mixture ratio of pixels belonging to that contour region.

Next, description will be made regarding the relation between a pixel belonging to a predetermined contour region in a frame of interest, and corresponding a pixel in a frame before or following the frame of interest.

Figure 52:
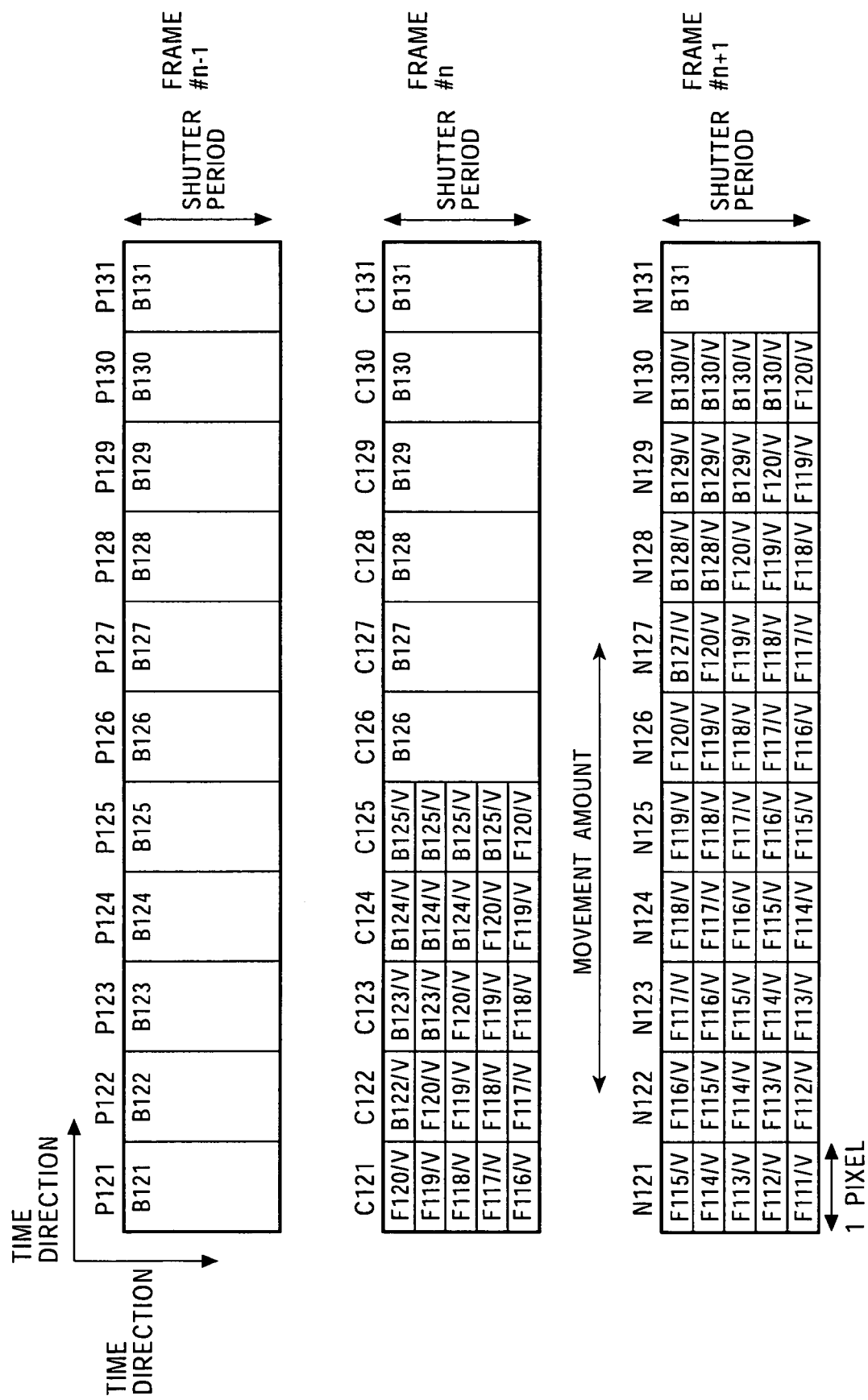
FIG. 52 is a model diagram wherein the pixel values of pixels on a line segment (i) and corresponding pixels are developed over the time direction, and the time period corresponding to shutter time is divided.

FIG. 52 is a diagram illustrating the relationship between a pixel on the line segment (i) in the frame of interest #n, and a corresponding pixel in the frame #n−1 before the frame #n of interest or the frame #n+1 following the frame #n of interest.

In the example in FIG. 52, the pixel value C122 of the pixel second from the left in the frame #n can be expressed as in Expression (8), using the pixel value P122 of the pixel second from the left in the frame #n−1.

$$C122 = B122/v + F120/v + F119/v + F118/v + F117/v \quad (8)$$
$$= P122/v + F120/v + F119/v + F118/v + F117/v$$
$$= 1/v \cdot P122 + \sum_{i=117}^{120} Fi/v$$

In Expression (8), the pixel value C122 is represented as the pixel value M of a pixel in the mixed region, and the pixel value P122 is represented as the pixel value B of a pixel in the background region. That is to say, the pixel value M of the pixel in the mixed region and the pixel value B of the pixel in the background region can be represented as in Expression (9) and Expression (10), respectively.

$$M=C122 \quad (9)$$

$$B=P122 \quad (10)$$

The 1/v in Expression (8) corresponds the mixture ratio α. The movement amount v is 5, so the mixture ratio α of the second pixel from the left in frame #n is 0.2.

The pixel value C of the pixel in frame #n of interest which is a pixel belonging to the covered background region, and the Expression (3) which represents the mixture ratio α, can be rewritten as in Expression (11), by thus reckoning the pixel value P of the frame #n−1 previous to the frame #n to be a pixel value of the background region.

$$C=\alpha \cdot P+f \quad (11)$$

The f in Expression (11) is the sum of the foreground components $\sum_i Fi/v$ included in the pixel of interest. The variables included in Expression (11) are the two variables of the mixture ratio α and the sum of the foreground components f.

On the other hand, as with the representation in the covered background region described above, the pixel value C of the pixel in frame #n of interest which is a pixel belonging to the uncovered background region, and the Expression (3) which represents the mixture ratio α, can be rewritten as in Expression (12), by reckoning the pixel value N of the frame #n+1 following the frame #n to be a pixel value of the background region, in the uncovered background region.

$$C=\alpha \cdot N+f \quad (12)$$

Now, description has been made with the background object still, but Expression (8) through Expression (12) can be applied by using the pixel value of a position corresponding to the background movement amount V in the event that the background object is moving, as well.

For example, in FIG. 52, in a case wherein the movement amount V of the object corresponding to the background is 2, in the event that the object corresponding to the background moves to the right side in the drawing, the pixel value B of the pixel in the background region in Expression (10) is the pixel value P124.

Since Expression (11) and Expression (12) contain two variables each, the mixture ratio α can not be calculated as is.

Accordingly, an expression is created for the set of the pixel belonging to the mixed region, and the pixel belonging to the corresponding background region, matching the foreground object movement amount v for each contour region, thereby obtaining the mixture ratio α.

The movement vector and the positional information thereof supplied from the movement detecting unit 102 is used as the movement amount v.

Description will now be made regarding calculation of an estimated mixture ratio of a pixel belonging to one contour region, using a movement amount v corresponding to the covered background region, with the estimated mixture ratio processing unit 401.

In FIG. 52, illustrating a model of pixels on the line segment (i), Expression (13) holds regarding C122 in frame #n corresponding to the pixel belonging to the contour region A. Expression (14) holds regarding N127 of frame #n+1 specified by the movement vector, with C122 of the frame #n as a reference.

$$C122 = 1/v \cdot B122 + \sum_{i=117}^{120} Fi/v \quad (13)$$

$$N127 = 1/v \cdot B127 + \sum_{i=117}^{120} Fi/v \quad (14)$$

In Expression (13) and Expression (14), the value corresponding to the mixture ratio α is 1/v, and is the same. In Expression (13) and Expression (14), the value corresponding to the sum of foreground components is $$\sum_{i=117}^{120} Fi/v,$$

and is the same.

That is to say, C122 of the frame #n corresponding to a pixel belonging to the contour region A which is a pixel on the line segment (i), and the mixture ratio α of N127 of the frame #n+1 and the foreground component sum, are the same. N127 of the frame #n+1 can be said to correspond to C122 of frame #n due to the movement of the foreground object.

In FIG. 52, Expression (15) holds regarding C123 in frame #n corresponding to a pixel belonging to the contour region B, which is a pixel on the line segment (i). Expression (16) holds regarding N128 of frame #n+1 specified by the movement vector, with C123 of the frame #n as a reference.

$$C123 = 2/v \cdot B123 + \sum_{i=118}^{120} Fi/v \qquad (15)$$

$$N128 = 2/v \cdot B128 + \sum_{i=118}^{120} Fi/v \qquad (16)$$

In Expression (15) and Expression (16), the value corresponding to the mixture ratio $\alpha$ is 2/v, and is the same. In Expression (15) and Expression (16), the value corresponding to the sum of foreground components is $$\sum_{i=118}^{120} Fi/v,$$

and is the same.

The C123 of the frame #n corresponding to a pixel belonging to the contour region B which is a pixel on the line segment (i), and the mixture ratio $\alpha$ of N128 of the frame #n+1 and the foreground component sum, are the same. N128 of the frame #n+1 can be said to correspond to C123 of frame #n due to the movement of the foreground object.

In the same way, C124 of the frame #n corresponding to a pixel belonging to the contour region C which is a pixel on the line segment (i), and the mixture ratio $\alpha$ of N129 of the frame #n+1 and the foreground component sum, are the same, and N129 of the frame #n+1 corresponds to C124 of frame #n due to the movement of the foreground object.

Also, C125 of the frame #n corresponding to a pixel belonging to the contour region D which is a pixel on the line segment (i), and the mixture ratio $\alpha$ of N130 of the frame #n+1 and the foreground component sum, are the same, and N130 of the frame #n+1 corresponds to C125 of frame #n due to the movement of the foreground object.

Figure 53:
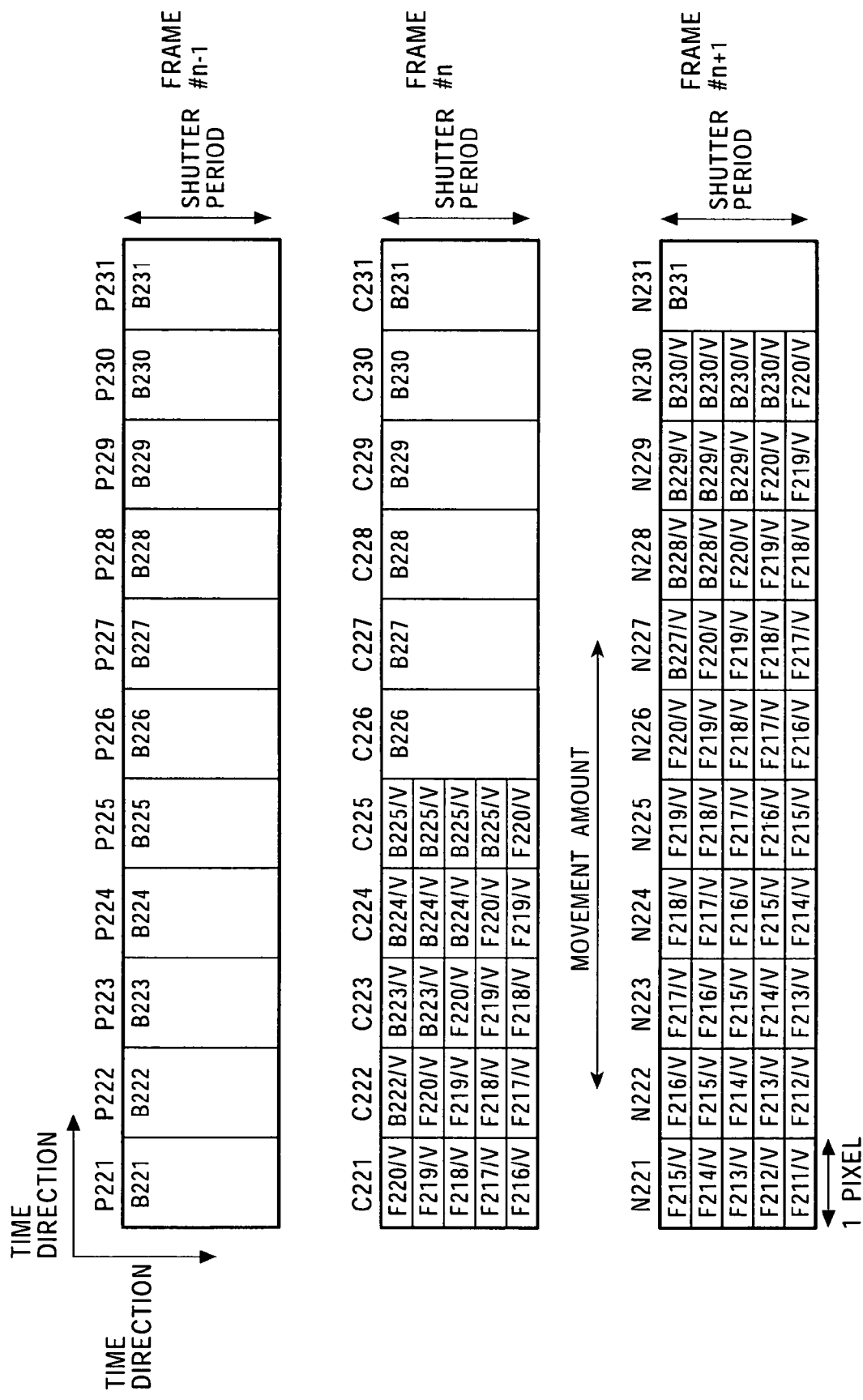
FIG. 53 is a model diagram wherein the pixel values of pixels on a line segment (ii) and corresponding pixels are developed over the time direction, and the time period corresponding to shutter time is divided.

In FIG. 53, illustrating a model of pixels on the line segment (ii), Expression (17) holds regarding C222 in frame #n corresponding to the pixel belonging to the contour region A. Expression (18) holds regarding N227 of frame #n+1 specified by the movement vector, with C122 of the frame #n as a reference.

$$C222 = 1/v \cdot B222 + \sum_{i=217}^{220} Fi/v \qquad (17)$$

$$N227 = 1/v \cdot B227 + \sum_{i=217}^{220} Fi/v \qquad (18)$$

In Expression (17) and Expression (18), the value corresponding to the mixture ratio $\alpha$ is 1/v, and is the same. In Expression (17) and Expression (18), the value corresponding to the sum of foreground components is $$\sum_{i=217}^{220} Fi/v,$$

and is the same.

That is to say, C222 of the frame #n corresponding to a pixel belonging to the contour region A which is a pixel on the line segment (ii), and the mixture ratio $\alpha$ of N227 of the frame #n+1 and the foreground component sum, are the same. N227 of the frame #n+1 can be said to correspond to C222 of frame #n due to the movement of the foreground object.

The C223 of the frame #n corresponding to a pixel belonging to the contour region B which is a pixel on the line segment (ii), and the mixture ratio $\alpha$ of N228 of the frame #n+1 and the foreground component sum, are the same. N228 of the frame #n+1 corresponds to C223 of frame #n due to the movement of the foreground object.

The C224 of the frame #n corresponding to a pixel belonging to the contour region C which is a pixel on the line segment (ii), and the mixture ratio $\alpha$ of N229 of the frame #n+1 and the foreground component sum, are the same. N229 of the frame #n+1 corresponds to C224 of frame #n due to the movement of the foreground object.

Also, C225 of the frame #n corresponding to a pixel belonging to the contour region D which is a pixel on the line segment (ii), and the mixture ratio $\alpha$ of N230 of the frame #n+1 and the foreground component sum, are the same. N230 of the frame #n+1 corresponds to C225 of frame #n due to the movement of the foreground object.

Figure 54:
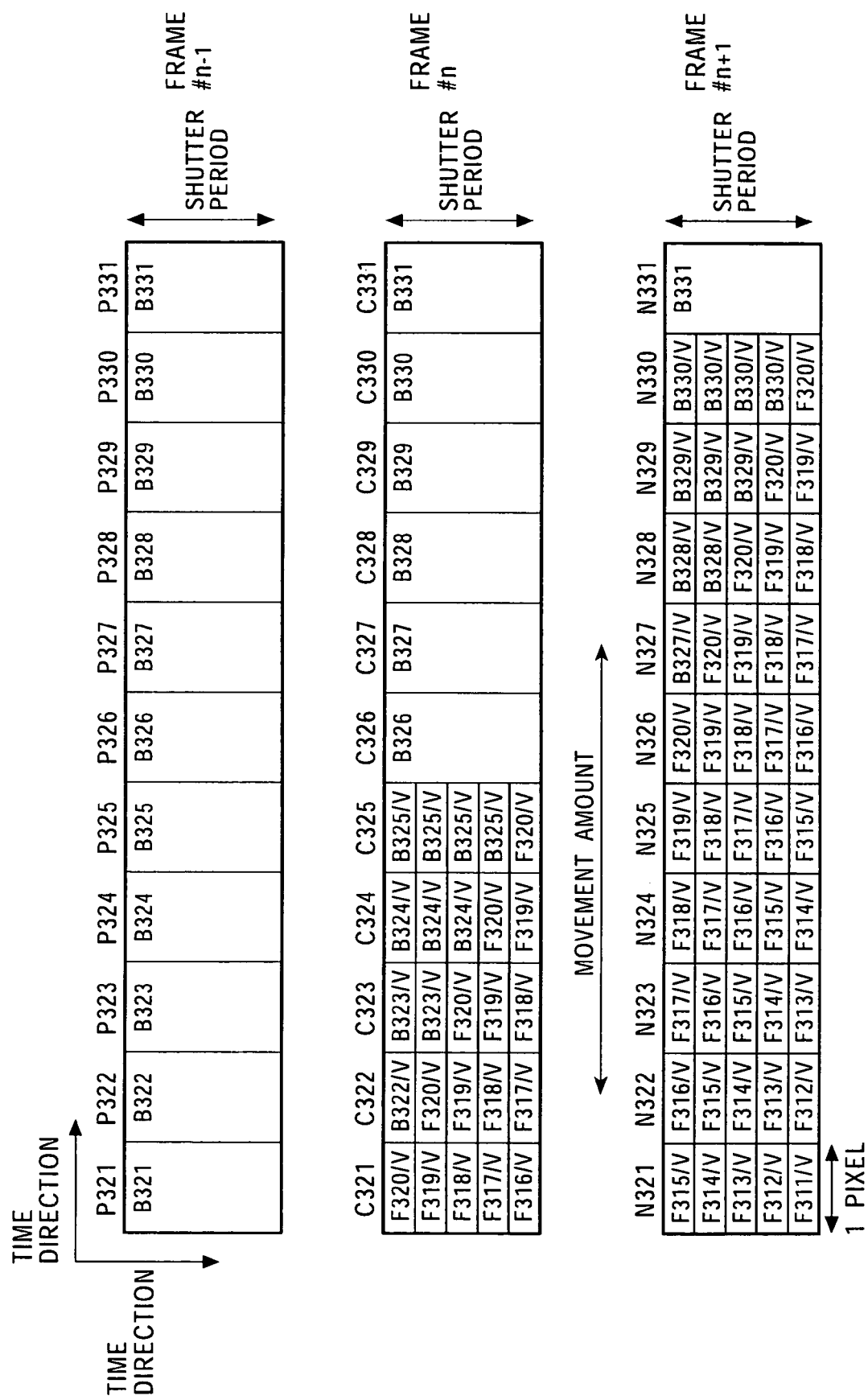
FIG. 54 is a model diagram wherein the pixel values of pixels on a line segment (iii) and corresponding pixels are developed over the time direction, and the time period corresponding to shutter time is divided.

In the same way, FIG. 54 is a diagram illustrating a model of pixels on the line segment (iii).

As shown in FIG. 54, C322 of the frame #n corresponding to a pixel belonging to the contour region A which is a pixel on the line segment (iii), and the mixture ratio $\alpha$ of N327 of the frame #n+1 and the foreground component sum, are the same. N327 of the frame #n+1 corresponds to C322 of frame #n due to the movement of the foreground object.

The C323 of the frame #n corresponding to a pixel belonging to the contour region B which is a pixel on the line segment (iii), and the mixture ratio $\alpha$ of N328 of the frame #n+1 and the foreground component sum, are the same. N328 of the frame #n+1 corresponds to C323 of frame #n due to the movement of the foreground object.

The C324 of the frame #n corresponding to a pixel belonging to the contour region C which is a pixel on the line segment (iii), and the mixture ratio $\alpha$ of N329 of the frame #n+1 and the foreground component sum, are the same. N328 of the frame #n+1 corresponds to C324 of frame #n due to the movement of the foreground object.

Also, C325 of the frame #n corresponding to a pixel belonging to the contour region D which is a pixel on the line segment (iii), and the mixture ratio $\alpha$ of N330 of the frame #n+1 and the foreground component sum, are the same. N330 of the frame #n+1 corresponds to C325 of frame #n due to the movement of the foreground object.

Thus, with regard to pixels of contour regions with the same mixture ratio $\alpha$, by introducing the assumption that an object corresponding to the foreground moves at a constant speed over multiple frames, and the assumption that the foreground component is constant, selection can be made of multiple sets of pixels belonging to a mixed region wherein the sum of the foreground component is the same and pixels belonging to the corresponding background region, corresponding to the movement amount v of the foreground object.

Figure 55:
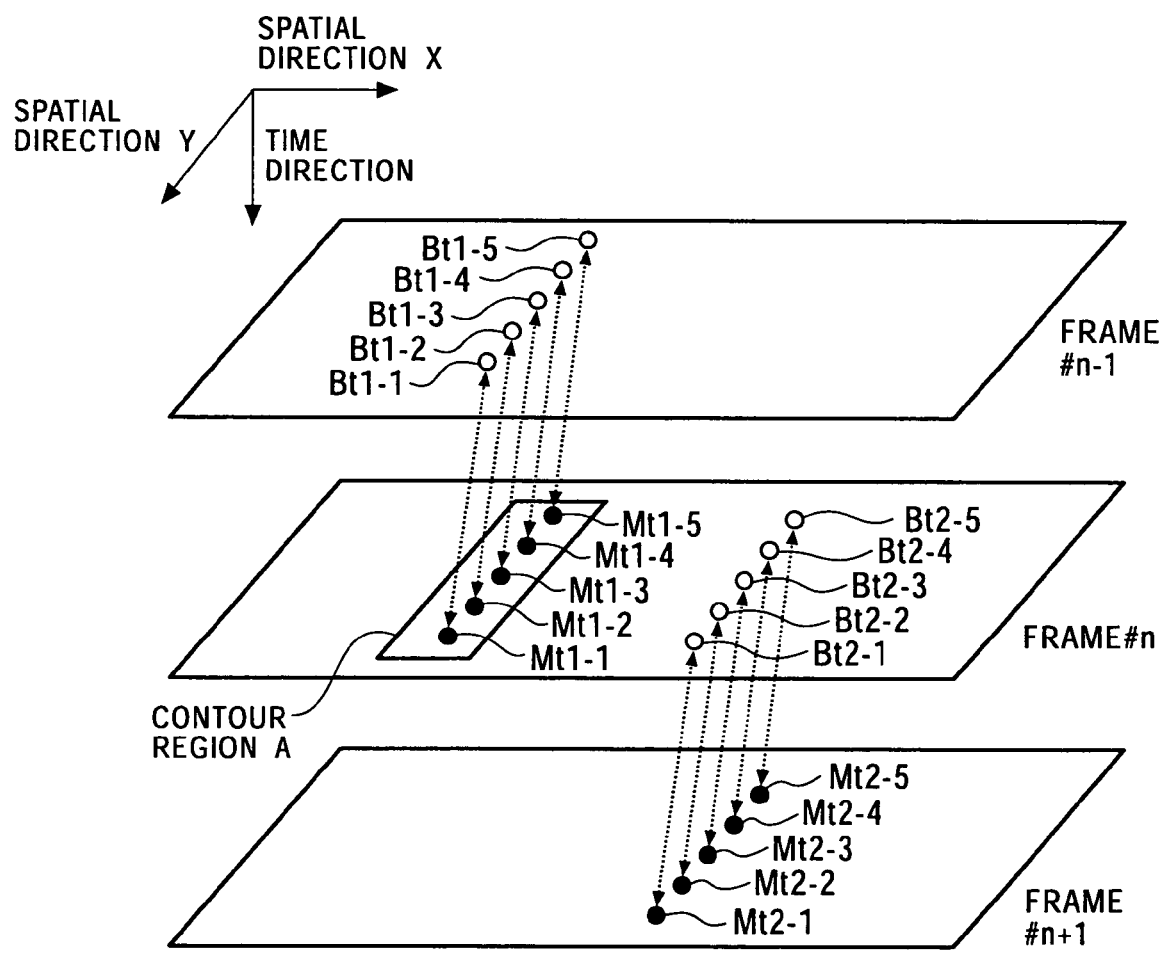
FIG. 55 is a diagram describing pixels belonging to a contour region A, pixels corresponding to the movement amount v of a foreground object, and pixels belonging to the corresponding background region.

For example, as shown in FIG. 55, pixels Mt1-1 through Mt1-5 belonging to the contour region A can be selected from the frame #n, and pixels Bt1-1 through Bt1-5 belonging to the corresponding background region can be selected from the frame #n−1. In FIG. 55, the solid dots indicate pixels belonging to the mixed region. In FIG. 55, the white dots indicate pixels to be reckoned to be background.

The mixture ratio α of the pixels belonging to the contour region A is the same, so Expression (19) through Expression (23) hold with regard to the pixels Mt1-1 through Mt1-5 and pixels Bt1-1 through Bt1-5.

$$Mt1\text{-}1 = \alpha \cdot Bt1\text{-}1 + f1 \tag{19}$$

$$Mt1\text{-}2 = \alpha \cdot Bt1\text{-}2 + f2 \tag{20}$$

$$Mt1\text{-}3 = \alpha \cdot Bt1\text{-}3 + f3 \tag{21}$$

$$Mt1\text{-}4 = \alpha \cdot Bt1\text{-}4 + f4 \tag{22}$$

$$Mt1\text{-}5 = \alpha \cdot Bt1\text{-}5 + f5 \tag{23}$$

The f1 through f5 in Expression (19) through (23) are each the sum of foreground components.

Also, pixels Mt2-1 through Mt2-5 corresponding respectively to the pixels Mt1-1 through Mt1-5 belonging to the contour region A can be selected from the frame #n+1, based on the movement amount v of the foreground object, and pixels Bt2-1 through Bt2-5 belonging to the background region corresponding to pixels Mt2-1 through Mt2-5 can be selected from the frame #n.

The mixture ratio α of the pixels Mt2-1 through Mt2-5 is the same as the mixture ratio α of the pixels Mt1-1 through Mt1-5, i.e., the same as the mixture ratio α of the pixels belonging to the contour region A, so Expression (24) through Expression (28) hold with regard to the pixels Mt2-1 through Mt2-5 and pixels Bt2-1 through Bt2-5.

$$Mt2\text{-}1 = \alpha \cdot Bt2\text{-}1 + f1 \tag{24}$$

$$Mt2\text{-}2 = \alpha \cdot Bt2\text{-}2 + f2 \tag{25}$$

$$Mt2\text{-}3 = \alpha \cdot Bt2\text{-}3 + f3 \tag{26}$$

$$Mt2\text{-}4 = \alpha \cdot Bt2\text{-}4 + f4 \tag{27}$$

$$Mt2\text{-}5 = \alpha \cdot Bt2\text{-}5 + f5 \tag{28}$$

The f1 through f5 in Expression (24) through (28) are each the sum of foreground components., and are the same as f1 through f5 in Expression (19) through (23).

The ten expressions of Expression (19) through Expression (28) contain the mixture ratio α which is a common variable, and the foreground component sums f1 through f5, so the mixture ratio α and the foreground component sums f1 through f5 can be obtained by applying the least-square method to Expression (19) through Expression (28).

For example, an estimated mixture ratio is calculated based on a normal equation corresponding to Expression (19) through Expression (28).

The normal equation indicated as an example in Expression (29) is obtained, based on Expression (19) through Expression (28).

$$\begin{bmatrix} Mt2-1 \\ Mt2-2 \\ \vdots \\ Mt2-5 \end{bmatrix} = \begin{bmatrix} Bt2-1 & 100 & \cdots & 0 \\ Bt2-2 & 010 & \cdots & 0 \\ \vdots & & & \\ Bt2-5 & 000 & \cdots & 0 \end{bmatrix} \begin{bmatrix} \alpha \\ f1 \\ \vdots \\ f5 \end{bmatrix} \tag{29}$$

The estimated mixture ration can be calculated by solving the normal equation of Expression (29).

Figure 56:
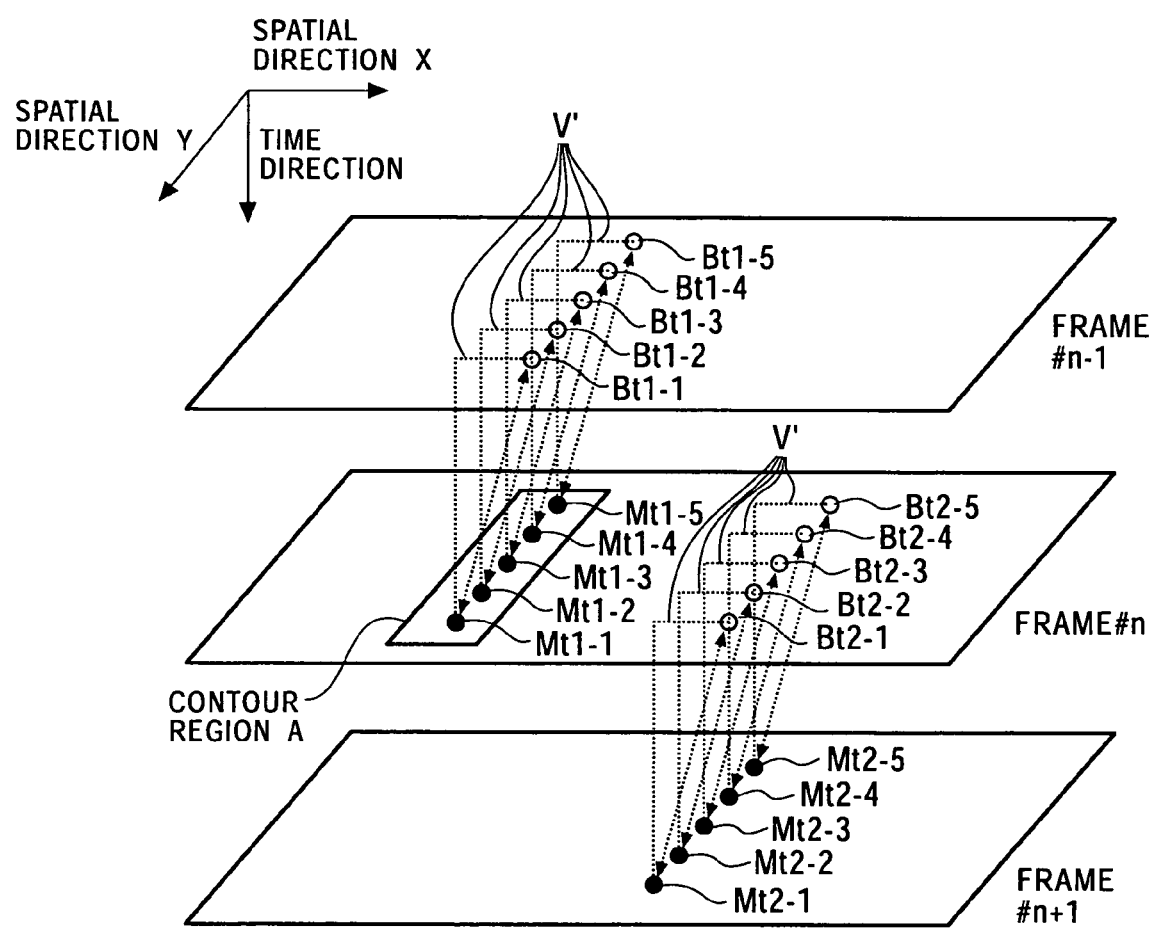
FIG. 56 is a diagram describing pixels belonging to a contour region A, pixels corresponding to the movement amount v of a foreground object, and pixels belonging to the corresponding background region.

Note that as shown in FIG. 56, in the event that the background is moving, the estimated mixture ratio processing unit 401 sets in the normal equation the pixel value belonging to the mixed region and the pixel value belonging to the corresponding background region, corresponding to the direction of movement of the background and the movement amount v' of the background, and calculates the mixture ratio α by the matrix solving method. In FIG. 56, the solid dots indicate pixels belonging to the mixed region. In FIG. 56, the white dots indicate pixels to be reckoned to be background.

Returning to FIG. 48, the normal equation generating unit 422 of the estimated mixture ratio processing unit 401 stores beforehand normal equations for calculating the mixture ratio α, and selects the normal equation stored therein based on contour region information supplied from the contour region information generating unit 421.

The normal equation generating unit 422 sets to the selected normal equation the pixel values belonging to the mixed region and the pixel values belonging to the corresponding background region, based on the input image. The normal equation generating unit 422 supplies the normal equation with the pixel values set, to the least square approximation unit 423.

The least square approximation unit 423 solves the normal equation with the pixel values set by a matrix solving method such as the Cholesky method or sweeping method (Gauss-Jordan elimination) or the like, calculates an estimated mixture ratio corresponding to the mixture ratio α, and outputs the calculated estimated mixture ratio.

In this way, the estimated mixture ratio processing unit 401 stores beforehand normal equations for calculating the mixture ratio α and the foreground component sums f1 through f5 corresponding to the covered background region and the movement amount v, sets to the stored normal equation the pixel values belonging to the mixed region and the pixel values belonging to the corresponding background region, based on the input image., and calculates estimated mixture ratios by matrix solving for each pixel, or for each contour region.

In the same way, the estimated mixture ratio processing unit 402, with regard to the uncovered background region, calculates estimated mixture ratios for each pixel, or for each contour region, using the movement amount v. In the processing corresponding to the uncovered background region, pixels belonging to the corresponding background region are selected from the frame following the frame of the pixel of interest.

The estimated mixture ratio processing unit 402 has the same configuration as the estimated mixture ratio processing unit 401, so description thereof will be omitted.

In this way, the mixture ratio calculating unit 104 can calculate the mixture ratio α for each pixel contained in an image, and output the calculated mixture ratio α.

The processing of the mixture ratio calculating unit 104 calculating the mixture ratio α will be described with reference to the flowchart in FIG. 57. In Step S401, the mixture ratio calculating unit 104 obtains region information supplied from the region specifying unit 101 and movement vector and the positional information thereof supplied from the movement detecting unit 102. In Step S402, the estimated mixture ratio processing unit 401 executes processing for estimating mixture ratio corresponding to the covered background region, based on the movement vector and the positional information thereof supplied from the movement detecting unit 102, and supplies the estimation mixture ratio to the mixture ratio determination unit 403. The details of the processing for estimating mixture ratio will be described later with reference to the flowchart in FIG. 58.

In Step S403, the estimated mixture ratio processing unit 402 executes processing for estimating mixture ratio corresponding to the uncovered background region, based on the movement vector and the positional information thereof supplied from the movement detecting unit 102, and supplies the estimation mixture ratio to the mixture ratio determination unit 403.

In Step S404, the mixture ratio calculating unit 104 judges whether or not the mixture ratio has been estimated for the entire frame, and in the event that judgment is made that the mixture ratio has not been estimated for the entire frame, the flow returns to Step S402, and the processing for estimating the mixture ratio for the next pixel is executed.

In Step S404, in the event that judgment is made that the mixture ratio has been estimated for the entire frame, the flow proceeds to Step S405, where the mixture ratio determination unit 403 sets the mixture ratio α based on region information supplied from the region specifying unit 101 indicating whether the pixel for which the mixture ratio α is calculated belongs to the foreground region, background region, covered background region, or uncovered background region. The mixture ratio determination unit 403 sets 0 to the mixture ratio α in the event that the pixel which is the object belongs to the foreground region, sets 1 to the mixture ratio α in the event that the pixel which is the object belongs to the background region, sets the estimated mixture ratio supplied from the estimated mixture ratio processing unit 401 to the mixture ratio α in the event that the pixel which is the object belongs to the covered background region, and sets the estimated mixture ratio supplied from the estimated mixture ratio processing unit 402 to the mixture ratio α in the event that the pixel which is the object belongs to the uncovered background region, and the processing ends.

In this way, the mixture ratio calculating unit 104 can calculate the mixture ratio α which is the amount of features corresponding to each pixel, based on the movement vector and the positional information thereof supplied from the movement detecting unit 102, region information supplied from the region specifying unit 101, and the input image.

Using the mixture ratio α allows the foreground component and background component contained in a pixel value to be separated, leaving the movement blurring information contained in the image corresponding to a moving object.

Next, the processing for calculating mixture ratio estimation with a model corresponding to a covered background region which is executed by the estimated mixture ratio processing unit 401, corresponding to Step S402 in FIG. 57, will be described with reference to the flowchart in FIG. 58.

In Step S421, the contour region information generating unit 421 generates contour region information for specifying contour regions, based on the region information supplied from the region specifying unit 101, the movement vector and the positional information thereof supplied from the movement detecting unit 102, and region dividing number information indicating the number of divisions of the region specified by the user, and supplies the generated contour region information to the normal equation generating unit 442.

In Step S422, the normal equation generating unit 442 generates a normal equation for calculating an estimated mixture ratio corresponding to the covered background region and contour region information, based on the contour region information. The normal equation generating unit 442 may store beforehand normal equations for calculating estimated mixture ratio, and select a normal equation based on contour region information or the like.

In Step S423, based on the input image, the normal equation generating unit 442 sets in the generated normal equation the pixel values belonging to the mixed region, and pixel values belonging to the corresponding background region, and supplies the normal equation to which the pixel values have been set, to the least square approximation unit 423.

In Step S424, the least square approximation unit 423 solves the normal equation with the pixel values set by the Cholesky method or sweeping method or the like, calculates an estimated mixture ratio, and the processing ends.

In this way, the estimated mixture ratio processing unit 401 can calculate the estimated mixture ratio.

Figure 57:
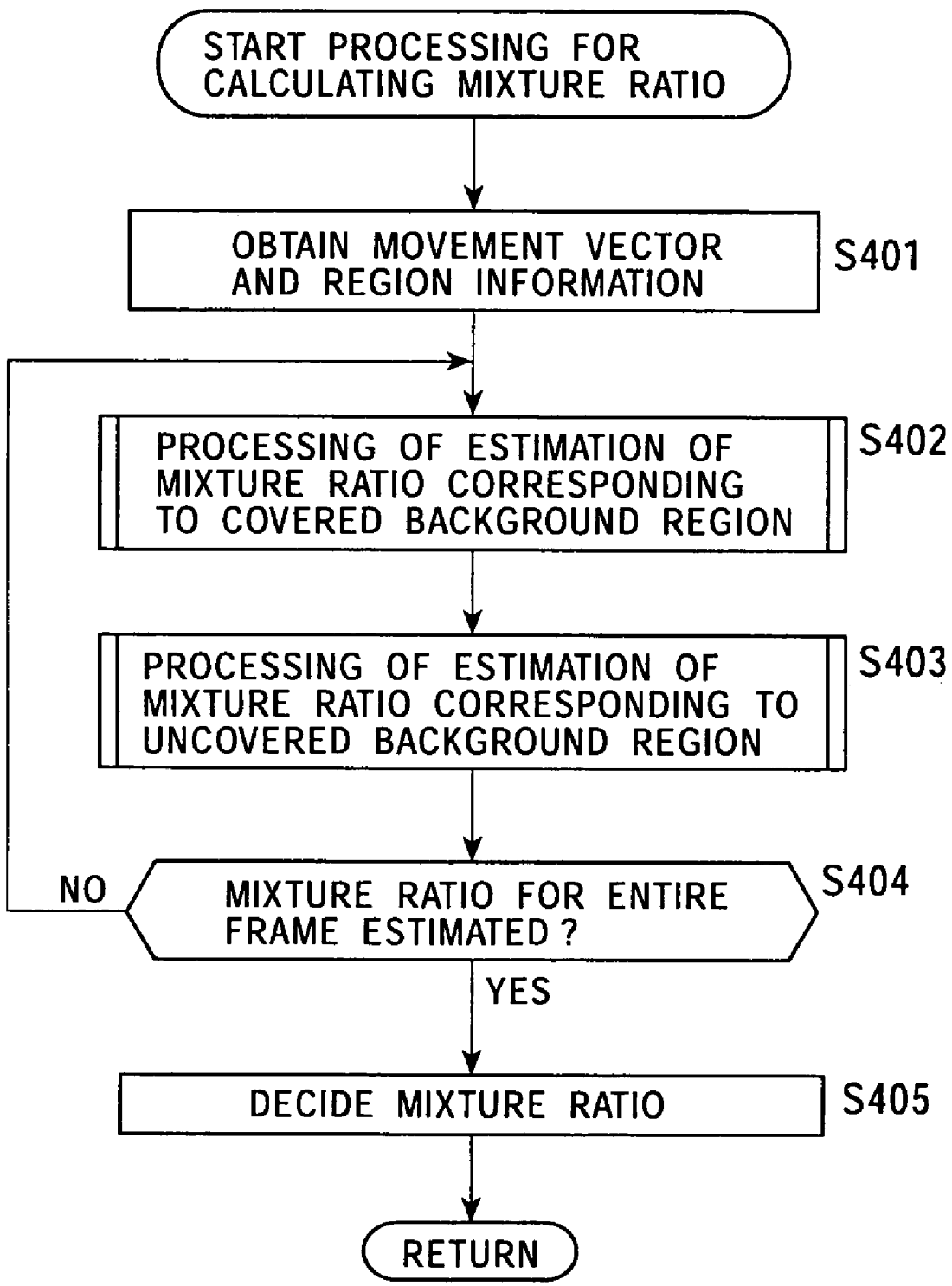
FIG. 57 is a flowchart describing processing for calculating the mixture ratio $\alpha$.
Figure 58:
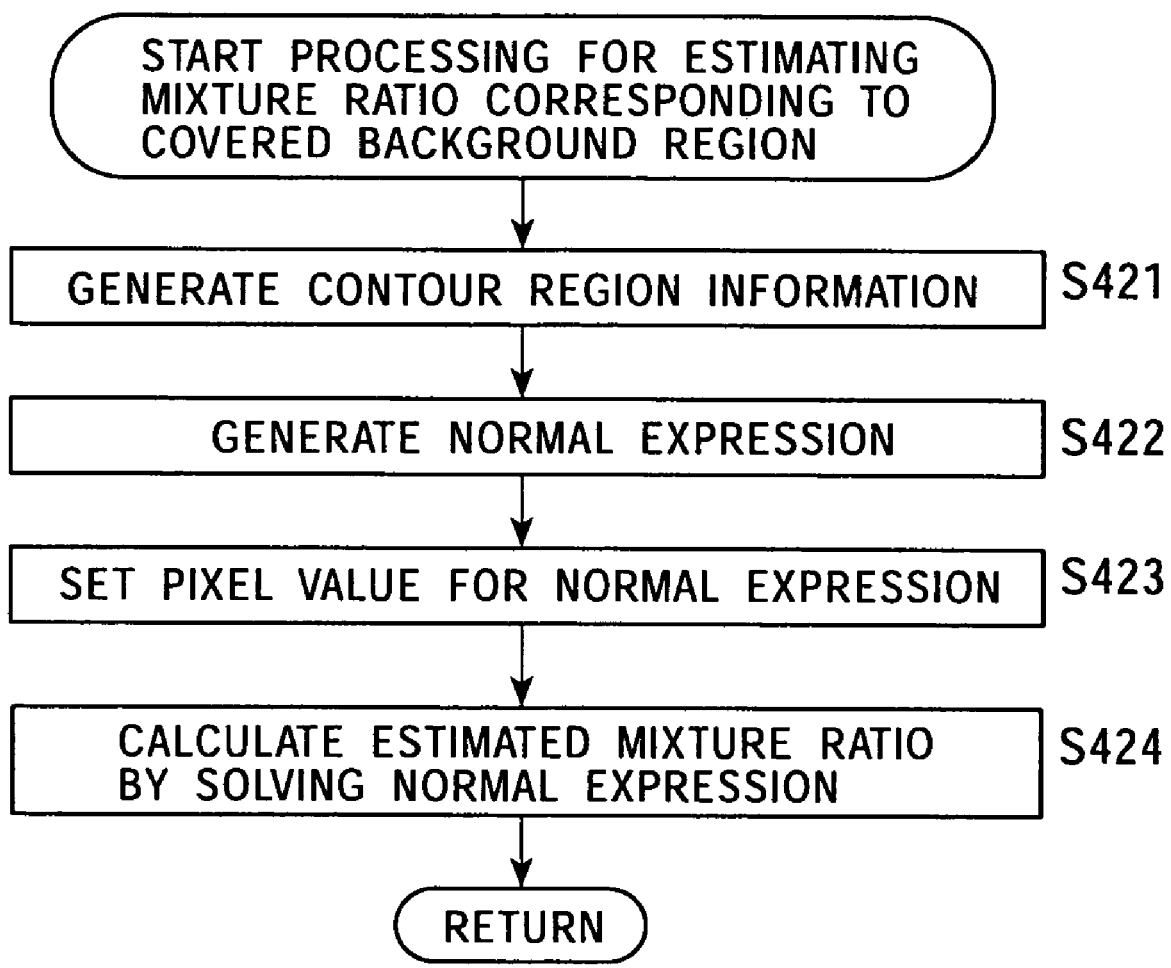
FIG. 58 is a flowchart describing processing for mixture ratio estimation corresponding to a covered background region.

The processing for estimating mixture ratio corresponding to the uncovered background region executed by the estimated mixture ratio processing unit 402 in Step S403 in FIG. 57 is the same as the processing shown in the flowchart in FIG. 58, which uses a normal equation corresponding to the uncovered background region, so description thereof will be omitted.

Figure 59:
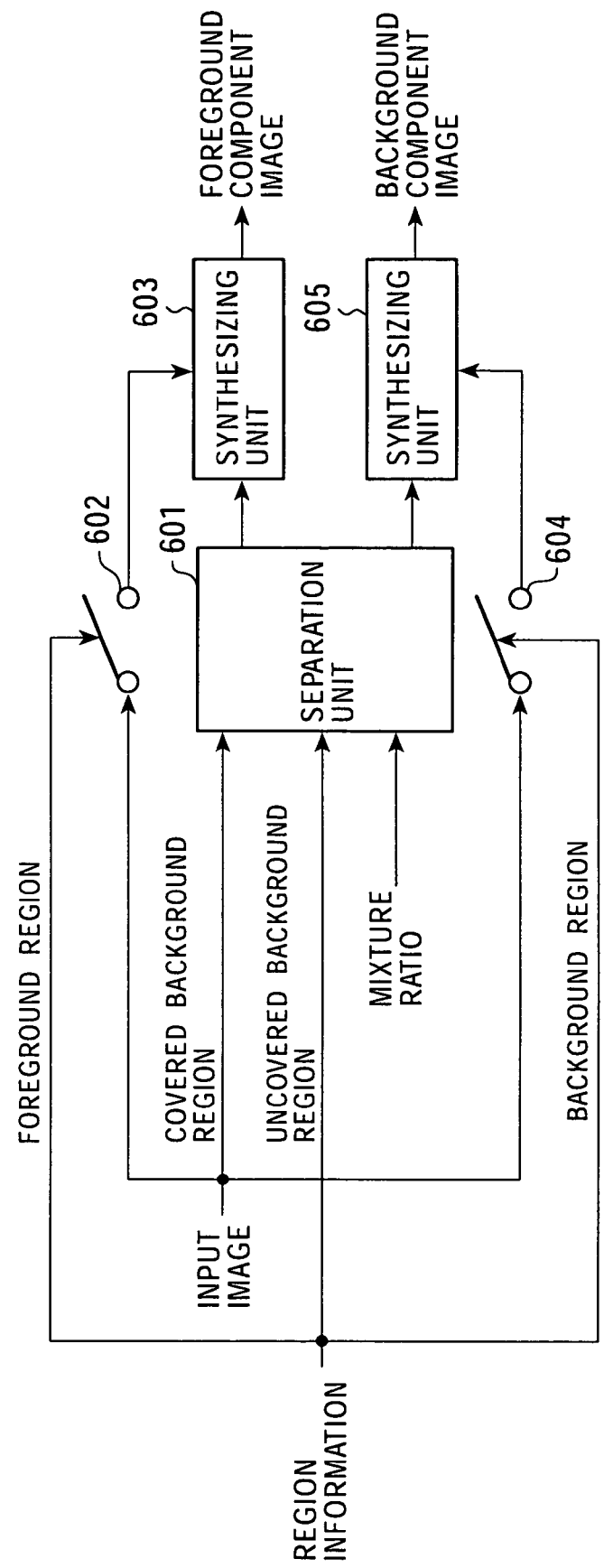
FIG. 59 is a block diagram illustrating an example of the configuration of a foreground/background separation unit 105.

The foreground/background separation unit 105 will now be described. FIG. 59 is a block diagram which illustrates one example of the structure of the foreground/background separation unit 105. The input image supplied to the foreground/background separation unit 105 is supplied to a separation unit 601, a switch 602, and a switch 604. The information indicating the covered background region, and the information indicating the uncovered background region, which is supplied from the region specifying unit 103 is supplied to the separation unit 601. The information indicating the foreground region is supplied to the switch 602. The region information indicating the background region is supplied to the switch 604.

The mixture ratio α supplied from the mixture ratio calculating unit 104 is supplied to the separation unit 601.

The separation unit 601 separates the foreground components from the input image based upon the region information indicating the covered background region, the region information indicating the uncovered background region, and the mixture ratio α, and supplies the separated foreground components to a synthesizing unit 603, as well as separating the background components from the input image, and supplying the separated background components to the synthesizing unit 605.

In the event that the pixel corresponding to the foreground is input, the switch 602 is closed based upon the region information indicating the foreground region, and supplies only the pixels corresponding to the foreground included in the input image to the synthesizing unit 603.

In the event that the pixel corresponding to the background is input, the switch 604 is closed based upon the region information indicating the background region, and supplies only the pixels corresponding to the background included in the input image to the synthesizing unit 605.

The synthesizing unit 603 synthesize the foreground component image based upon the components corresponding to the foreground supplied from the separation unit 601, and the pixel corresponding to the foreground supplied from the switch 602, and outputs the synthesized foreground component image. Since the foreground region and the mixed region are not overlapped, the synthesizing unit 603 synthesizes the foreground component image, for example, by applying the logical sum computation to the components corresponding to the foreground, and the pixel corresponding to the foreground.

In the initialization processing which is performed in the first stage of the foreground component image synthesizing processing, the synthesizing unit 603 stores the image wherein all the pixel values are 0 in built-in frame memory, and in the foreground component image synthesizing processing, the synthesizing unit 603 stores (or overwrites) the foreground component image. Accordingly, the pixel corresponding to the background region, which is the foreground component image output from the synthesizing unit 603, stores 0 as a pixel value.

The synthesizing unit 605 synthesizes the background component image based upon the components corresponding to the background supplied from the separation unit 601, and the pixels corresponding to the background supplied from the switch 604, and outputs the synthesized background component image. Since the background region and the mixed region are not overlapped, the synthesizing unit 605 synthesizes the background component image, for example, by applying the logical sum computation to the components corresponding to the background, and the pixel corresponding to the background.

In the initialization processing which is performed in the first stage of the background component image synthesizing processing, the synthesizing unit 605 stores the image wherein all the pixel values are 0 in built-in frame memory, and in the background component image synthesizing processing, the synthesizing unit 605 stores (or overwrites) the background component image. Accordingly, the pixel corresponding to the foreground region, which is the background component image output from the synthesizing unit 605, stores 0 as a pixel value.

Figure 60B:
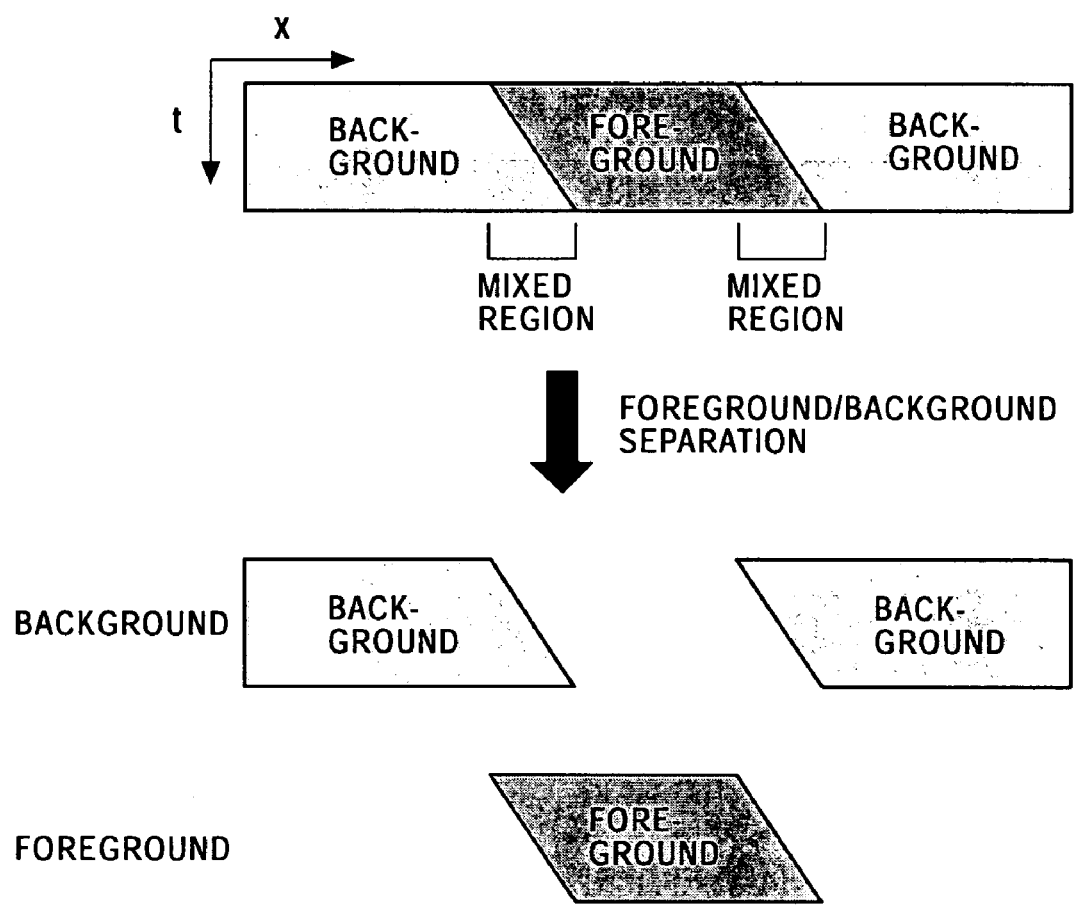
FIG. 60B is a diagram illustrating a mode corresponding to an input image, foreground component image, and background component image.

FIG. 60A is a diagram which illustrates the input image input to the foreground/background separation unit 105, and the foreground component image and the background component image output from the foreground/background separation unit 105. FIG. 60B is a diagram which illustrates a model corresponding to the input image input to the foreground/background separation unit 105, and the foreground component image and background component image output from the foreground/background separation unit 105.

FIG. 60A is a schematic diagram of the displayed image, and FIG. 60B is a model diagram wherein pixels on one line including pixels belonging to the foreground, pixels belonging to the background region, and the pixels belonging to the mixed region, corresponding to FIG. 60A, develop over the time direction.

As shown in FIG. 60A and FIG. 60B, the background component image output from the foreground/background separation unit 105 is made up of the pixels belonging to the background region, and the background components included in the pixels in the mixed region.

As shown in FIG. 60A and FIG. 60B, the foreground component image output from the foreground/background separation unit 105 is made up of the pixels belonging to the foreground region, and the foreground components included in the pixels in the-mixed region.

The pixel value of the pixel in the mixed region is separated into the background components and the foreground components by the foreground/background separation unit 105. The separated background components make up the background component image along with the pixels belonging to the background region. The separated foreground components make up the foreground component image with the pixels belonging to the foreground region.

As described above, in the foreground component image, the pixel values of the pixels corresponding to the background region are set to 0, and the pixels corresponding to the foreground region and the pixels corresponding to the mixed region are set to valid pixel values. Similarly, in the background component image, the pixel values of the pixels corresponding to the foreground region are set to 0, and the pixels corresponding to the background region and the pixels corresponding to the mixed region are set to valid pixel values.

A description will now be made regarding the separation processing of the foreground components and the background components from the pixel belonging to the mixed region performed by the separation unit 601.

FIG. 61 is a model of an image which indicates two frames of the foreground components and the background components, including the foreground corresponding to the object which moves from the left to the right in the drawing. In the model of the image shown in FIG. 61, the movement amount v of the foreground is 4, and the virtual dividing number is 4.

In the frame #n, the left-most pixel and the fourteenth through eighteenth pixels from the left are made up of only the background components, and belong to the background region. In the frame #n, the second through fourth pixels from the left are made up of the background components and the foreground components, and belong to the uncovered background region. In the frame #n, the eleventh through thirteenth pixels from the left are made up of the background components and the foreground components, and belong to the covered background region. In the frame #n, the fifth through tenth pixels from the left are made up of only the foreground components, and belong to the foreground region.

In the frame #n+1, the first through fifth pixels and the eighteenth pixel from the left are made up of only the background components, and belong to the background region. In the frame #n+1, the sixth through eighth pixels from the left are made up of the background components and foreground components, and belong to the uncovered background region. In the frame #n+1, the fifteenth through seventeenth pixels are made up of the background components and foreground components, and belong to the covered background region. In the frame #n+1, the ninth through fourteenth pixels are made up of only the foreground components, and belong to the foreground region.

Figure 62:
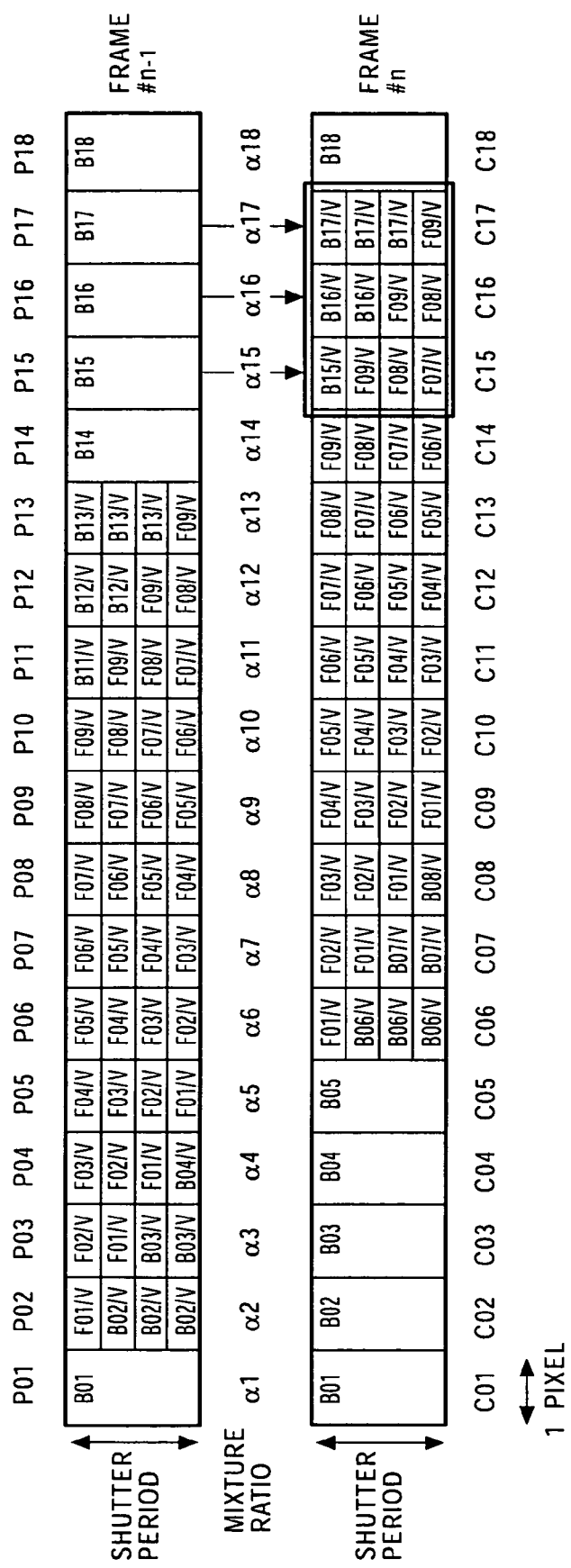
FIG. 62 is a model diagram wherein the pixel values are developed over the time direction, and periods corresponding to shutter time are divided.

FIG. 62 is a diagram which describes the processing for separating the foreground components from the pixel belonging to the covered background region. In FIG. 62, $\alpha 1$ through $\alpha 18$ represent mixture ratios corresponding to the pixels in the frame #n, respectively. In FIG. 62, the fifteenth through seventeenth pixels from the left belong to the covered background region.

The pixel value C15 of the fifteenth pixel from the left in the frame #n is represented in Expression (30).

$$C15 = B15/v + F09/v + F08/v + F07/v \quad (30)$$
$$= \alpha 15 \cdot B15 + F09/v + F08/v + F07/v$$
$$= \alpha 15 \cdot P15 + F09/v + F08/v + F07/v$$

Here, $\alpha 15$ denotes the mixture ratio of the fifteenth pixel from the left in the frame #n. P15 denotes the pixel value of the fifteenth pixel from the left in the frame #n−1.

The sum f15 of the foreground components of the fifteenth pixel from the left in the frame #n is represented in Expression (31) based upon Expression (30).

$$f15 = F09/v + F08/v + F07/v \quad (31)$$
$$= C15 - \alpha 15 \cdot P15$$

Similarly, the sum f16 of the foreground components of the sixteenth pixel from the left in the frame #n is represented in Expression (32), and the sum f17 of the foreground components of the seventeenth pixel from the left in the frame #n is represented in Expression (33).

$$f16 = C16 - \alpha 16 \cdot P16 \quad (32)$$

$$f17 = C17 - \alpha 17 \cdot P17 \quad (33)$$

As described above, the foreground component fc included in the pixel value C of the pixel belonging to the covered background region is calculated by Expression (34).

$$fc = C - \alpha \cdot P \quad (34)$$

P denotes the pixel value of the corresponding pixel in the previous frame.

Figure 63:
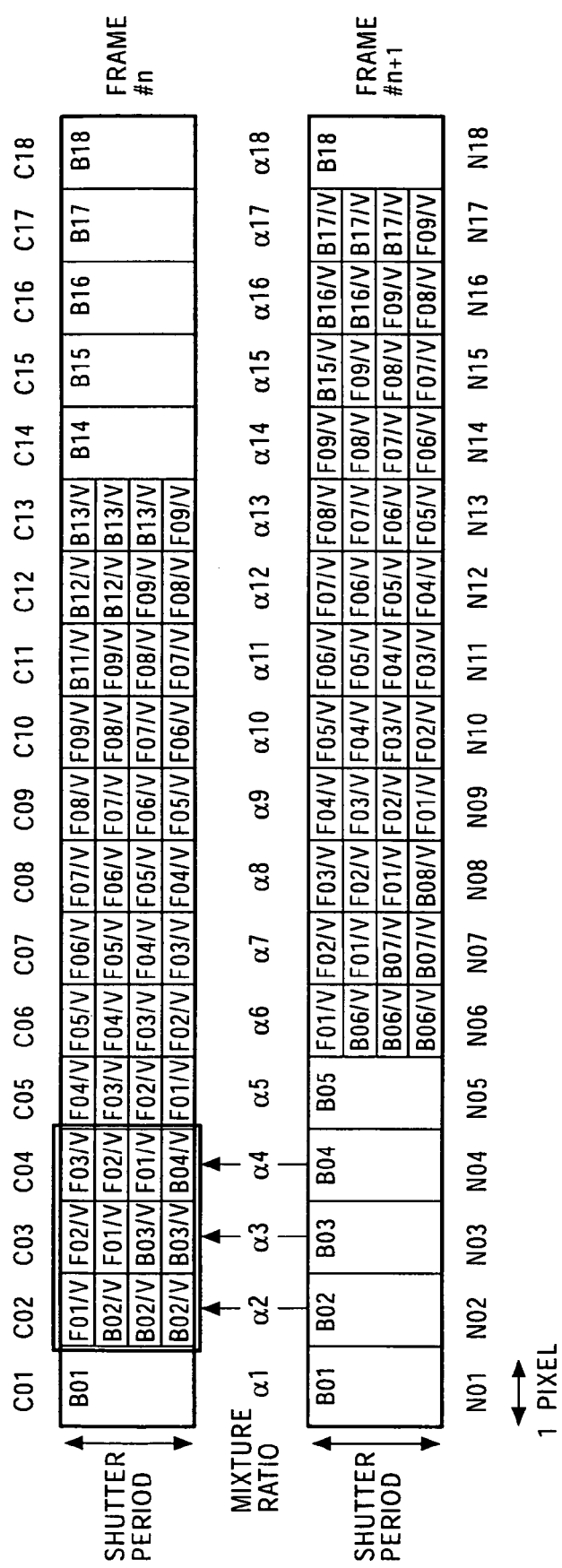
FIG. 63 is a model diagram wherein the pixel values are developed over the time direction, and periods corresponding to shutter time are divided.

FIG. 63 is a diagram which describes the processing for separating the foreground components from the pixel belonging to the uncovered background region. In FIG. 63, $\alpha 1$ through $\alpha 18$ denote the mixture ratio corresponding to the pixels in the frame #n, respectively. In FIG. 63, the second through fourth pixels from the left belong to the uncovered background region.

The pixel value C02 of the second pixel from the left in the frame #n is represented in Expression (35).

$$C02 = B02/v + B02/v + B02/v + F01/v \quad (35)$$
$$= \alpha 2 \cdot B02 + F01/v$$
$$= \alpha 2 \cdot N02 + F01/v$$

Here, $\alpha 2$ denotes the mixture ratio of the second pixel from the left in the frame #n. N02 denotes the pixel value of the second pixel from the left in the frame #n+1.

The foreground component sum of the second pixel from the left in the frame #n, fo2, is represented in Expression (36) based upon Expression (35).

$$f02 = F01/v \quad (36)$$
$$= C02 - \alpha 2 \cdot N02$$

Similarly, the foreground component sum of the third pixel from the left in the frame #n, f03 is represented in Expression (37), and the foreground component sum of the fourth pixel from the left in the frame #n, f04 is represented in Expression (38).

$$f03 = C03 - \alpha 3 \cdot N03 \quad (37)$$

$$f04 = C04 - \alpha 4 \cdot N04 \quad (38)$$

As described above, the foreground component fu included in the pixel value C of the pixel belonging to the uncovered background region is calculated by Expression (39).

$$fu = C - \alpha \cdot N \quad (39)$$

N denotes the pixel value of the corresponding pixel in the following frame.

As described above, the separation unit 601 can separate the foreground components and the background components from the pixel belonging to the mixed region based upon the region information including the information which indicates the covered background region, the information which indicates the uncovered background region, and the mixture ratio $\alpha$ for each pixel.

Figure 64:
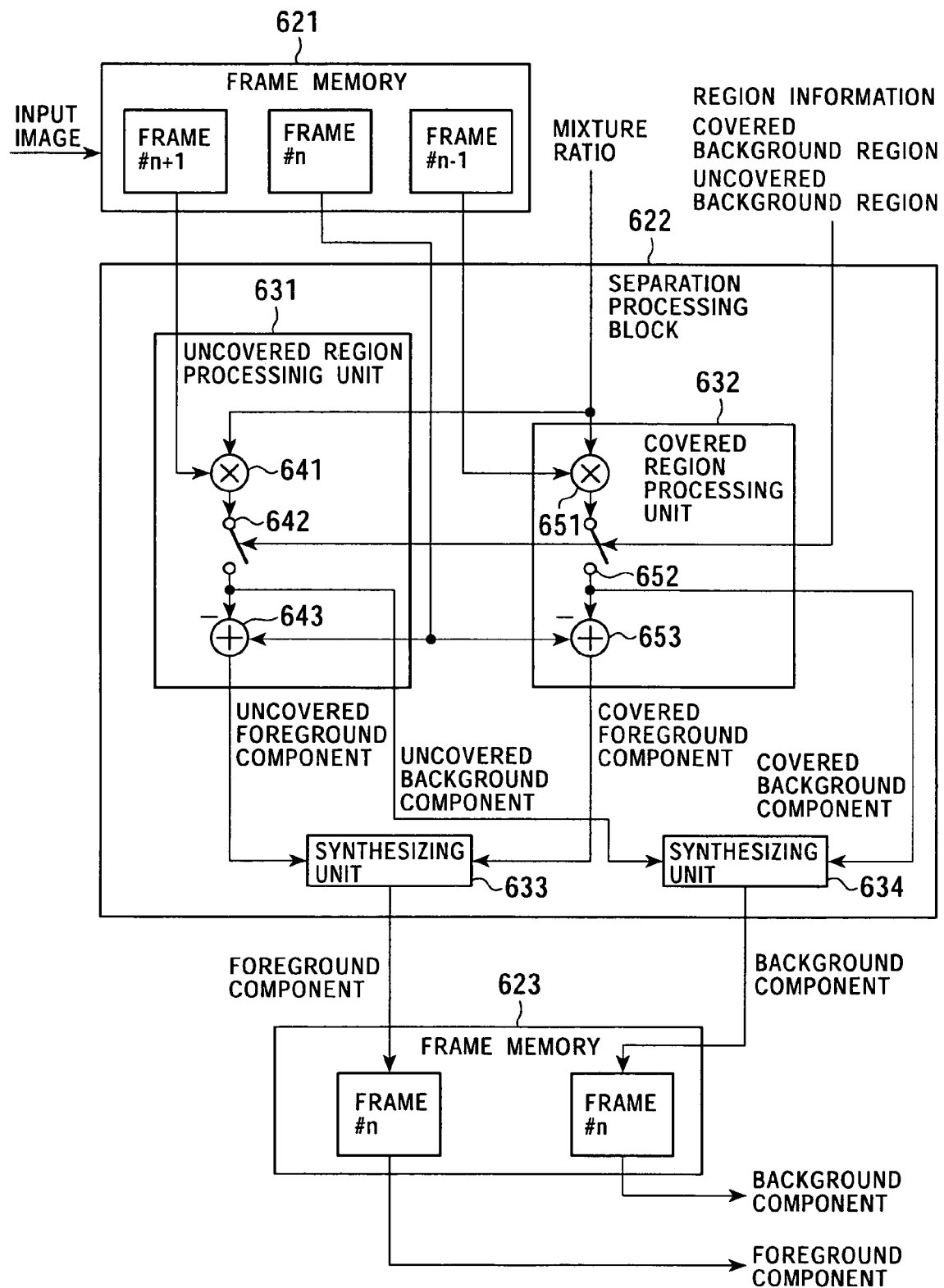
FIG. 64 is a block diagram illustrating an example of the configuration of the separating unit 601.

FIG. 64 is a block diagram which illustrates an example of the structure of the separation unit 601 for performing the processing described above. The image input to the separation unit 601 is supplied to frame memory 621, and the region information indicating the covered background region and the uncovered background region supplied from the mixture ratio calculating unit 104, and the mixture ratio $\alpha$ is input to a separation processing block 622.

The frame memory 621 stores the input image in increments of frames. In the event that the object of processing is the frame #n, the frame memory 621 stores the frame #n−1 which is the frame previous from the frame #n, frame #n, and the frame #n+1 which is the frame following the frame #n.

The frame memory 621 supplies the corresponding pixels in the frame #n−1, the frame #n, and the frame #n+1 to the separation processing block 622.

The separation processing block 622 separates the foreground components and the background components from the pixel belonging to the mixed region in the frame #n by applying the computation described with reference to FIG. 62 and FIG. 63 to the pixel values of corresponding pixels in the frame #n−1, the frame #n, and the frame #n+1, supplied from the frame memory 621, based upon the region information indicating the covered background region and the uncovered background region, and the mixture ratio $\alpha$, and supplies to frame memory 623.

The separation processing block 622 comprises an uncovered region processing unit 631, a covered region processing unit 632, a synthesizing unit 633, and a synthesizing unit 634.

A multiplication device 641 of the uncovered region processing unit 631 multiplies the pixel value of the pixel of the frame #n+1 supplied from the frame memory 621 by the mixture ratio $\alpha$, and outputs to a switch 642. In the event that the pixel in the frame #n supplied from the frame memory 621 (which is corresponding to the pixel of the frame #n+1) belongs to the uncovered background region, the switch 642 is closed, the pixel value which is multiplied by the mixture ratio $\alpha$ supplied from the multiplication device 641 is supplied to a computing device 643 and the synthesizing unit 634. The value wherein the pixel value of the pixel of the frame #n+1 output from the switch 642 is multiplied by the mixture ratio $\alpha$ is the same as the background component of the pixel value of the corresponding pixel in the frame #n.

The computing device 643 calculates the foreground components by subtracting the background components supplied from the switch 642 from the pixel value of the pixel of the frame #n supplied from the frame memory 621. The computing device 643 supplies the foreground components of the pixel in the frame #n belonging to the uncovered background region, to the synthesizing unit 633.

A multiplication device 651 of the covered region processing unit 632 multiplies the pixel value of the pixel of the frame #n−1 supplied from the frame memory 621 by the mixture ratio $\alpha$, and outputs to a switch 652. In the event that the pixel in the frame #n supplied from the frame memory 621 (corresponding to the pixel of the frame #n−1) belongs to the covered background region, the switch 652 is closed, and the pixel value which is multiplied by the mixture ratio $\alpha$ supplied from the multiplication device 651 is supplied to a computing device 653 and the synthesizing unit 634. The value wherein the pixel value of the pixel of the frame #n−1 output from the switch 652 is multiplied by the mixture ratio α, is the same as the background component of the pixel value of the corresponding pixel in the frame #n.

The computing device 653 calculates the foreground components by subtracting the background components supplied from the switch 652 from the pixel value of the pixel of the frame #n supplied from the frame memory 621. The computing device 653 supplies the foreground components of the pixel in the frame #n belonging to the covered background region, to the synthesizing unit 633.

The synthesizing unit 633 synthesizes the foreground components of the pixel belonging to the uncovered background region in the frame #n supplied from the computing device 643, and the foreground components of the pixel belonging to the covered background region supplied from the computing device 653, and supplies to the frame memory 623.

The synthesizing unit 634 synthesizes the background components of the pixel belonging to the uncovered background region in the frame #n supplied from the switch 642, and the background components of the pixel belonging to the covered background region supplied from the switch 652, and supplies to the frame memory 623.

The frame memory 623 stores the foreground components and the background components of the pixels in the mixed region in the frame #n, supplied from the separation processing block 622, respectively.

The frame memory 623 outputs the foreground components of the pixels in the mixed region in the frame #n stored therein, and the background components of the pixels in the mixed region in the frame #n stored therein.

Using the mixture ratio α which is the feature amount enables complete separation of the foreground components and the background components, included in the pixel value.

The synthesizing unit 603 generates the foreground component image by synthesizing the foreground components of the pixel in the mixed region in the frame #n output from the separation unit 601, and the pixels belonging to the foreground region. The synthesizing unit 605 generates the background component image by synthesizing the background components of the pixels in the mixed region in the frame #n output from the separation unit 601, and pixels belonging to the background region.

FIG. 65A is a diagram which illustrates an example of the foreground component image corresponding to the frame #n in FIG. 61. FIG. 65B is a diagram which illustrates an example of the background component image corresponding to the frame #n in FIG. 61.

FIG. 65A illustrates an example of the foreground component image corresponding to the frame #n shown in FIG. 61. Since the left-most pixel and the fourteenth pixel from the left are made up of only the background components before separation of the foreground and the background, the pixel values are 0.

The second through fourth pixels from the left belong to the uncovered background region prior to the foreground and the background being separated, the background components being 0, and the foreground components being left as they were. The eleventh through thirteenth pixels belonged to the covered background region before separation of the foreground and the background, and the background components are 0, and the foreground components are left as they are. Since the fifth through tenth pixels from the left are made up of only the foreground components, those are left as they are.

FIG. 65B illustrates an example of the background component image corresponding to the frame #n shown in FIG. 61. The left-most pixel and the fourteenth pixel from the left are made up of the background components prior to the foreground and the background being separated, and accordingly those being left as they were.

The second through fourth pixels from the left belong to the uncovered background region prior to the foreground and the background being separated, with the foreground components being 0, and the background components being left as they were. The eleventh through the thirteenth pixels belong to the covered background region prior to the foreground and the background being separated, the foreground components being 0, and the background components being left as they were. The fifth through tenth pixels from the left are made up of only the foreground components prior to the foreground and the background being separated, and accordingly the pixel values are 0.

Figure 66:
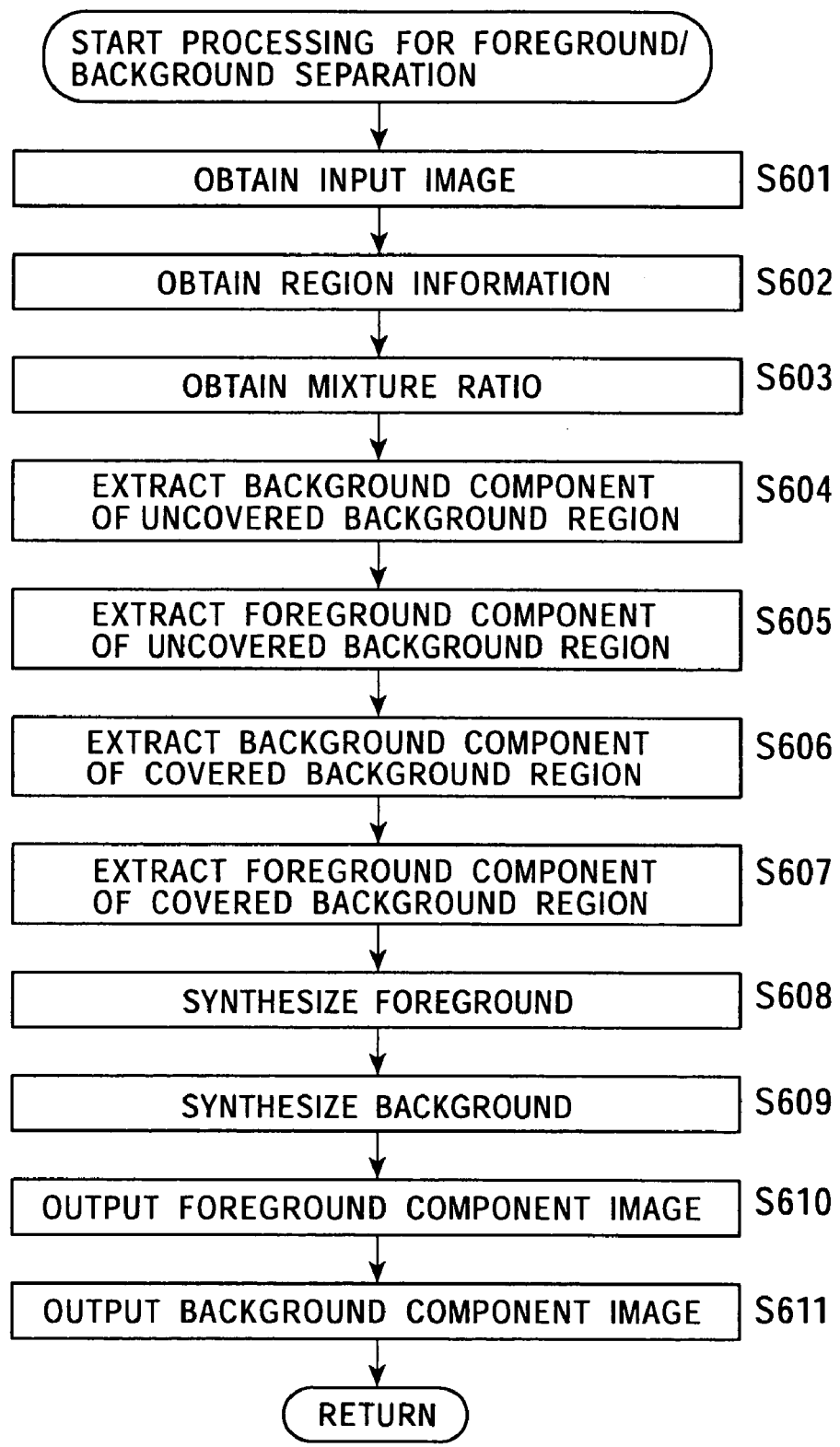
FIG. 66 is a flowchart describing the processing for separating the foreground and the background.

The separation processing of the foreground and the background by the foreground/background separation unit 105 will now be described, with reference to the flowchart shown in FIG. 66. In Step S601, the frame memory of the separation unit 601 obtains the input image, and stores the frame #n which is the object of the separation of the foreground and the background, as well as the previous frame #n−1 and the following frame #n+1.

In Step S602, the separation processing block 622 of the separation unit 601 obtains the region information supplied from the mixture ratio calculating unit 104. In Step S603, the separation processing block 622 of the separation unit 601 obtains the mixture ratio α supplied from the mixture ratio calculating unit 104.

In Step S604, the uncovered region processing unit 631 extracts the background components from the pixel value of the pixel belonging to the uncovered background region supplied from the frame memory 621 based upon the region information and the mixture ratio α.

In Step S605, the uncovered region processing unit 631 extracts the foreground components from the pixel value of the pixel belonging to the uncovered background region supplied from the frame memory 621 based upon the region information and the mixture ratio α.

In Step S606, the covered region processing unit 632 extracts the background components from the pixel value of the pixel belonging to the covered background region supplied from the frame memory 621 based upon the region information and the mixture ratio α.

In Step S607, the covered region processing unit 632 extracts the foreground components from the pixel value of the pixel belonging to the covered background region supplied from the frame memory 621 based upon the region information and the mixture ratio α.

In Step S608, the synthesizing unit 633 synthesizes the foreground components of the pixel belonging to the uncovered background region extracted in the processing in Step S605, and the foreground components of the pixel belonging to the covered background region extracted in the processing in Step S607. The synthesized foreground components are supplied to the synthesizing unit 603. Moreover, the synthesizing unit 603 synthesizes the pixels belonging to the foreground region supplied via the switch 602, and the foreground components supplied from the separation unit 601, and generates the foreground component image.

In Step S609, the synthesizing unit 634 synthesizes the background components of the pixel belonging to the uncovered background region extracted in the processing in Step S604, and the background components of the pixel belonging to the covered background region extracted in the processing in Step S606. The synthesized background components are supplied to the synthesizing unit 605. Moreover, the synthesizing unit 605 synthesizes the pixels belonging to the background region supplied via the switch 604, and the background components supplied from the separation unit 601, and generates the background component image.

In Step S610, the synthesizing unit 603 outputs the foreground component image. In Step S611, the synthesizing unit 605 outputs the background component image, and the processing ends.

As described above, the foreground/background separation unit 105 can separate the foreground components and the background components from the input image based upon the region information and the mixture ratio α, and output the foreground component image which is made up of only the foreground components, and the background component image which is made up of only the background components.

The processing of adjustment of the movement blurring amount from the foreground component image will now be described.

Figure 67:
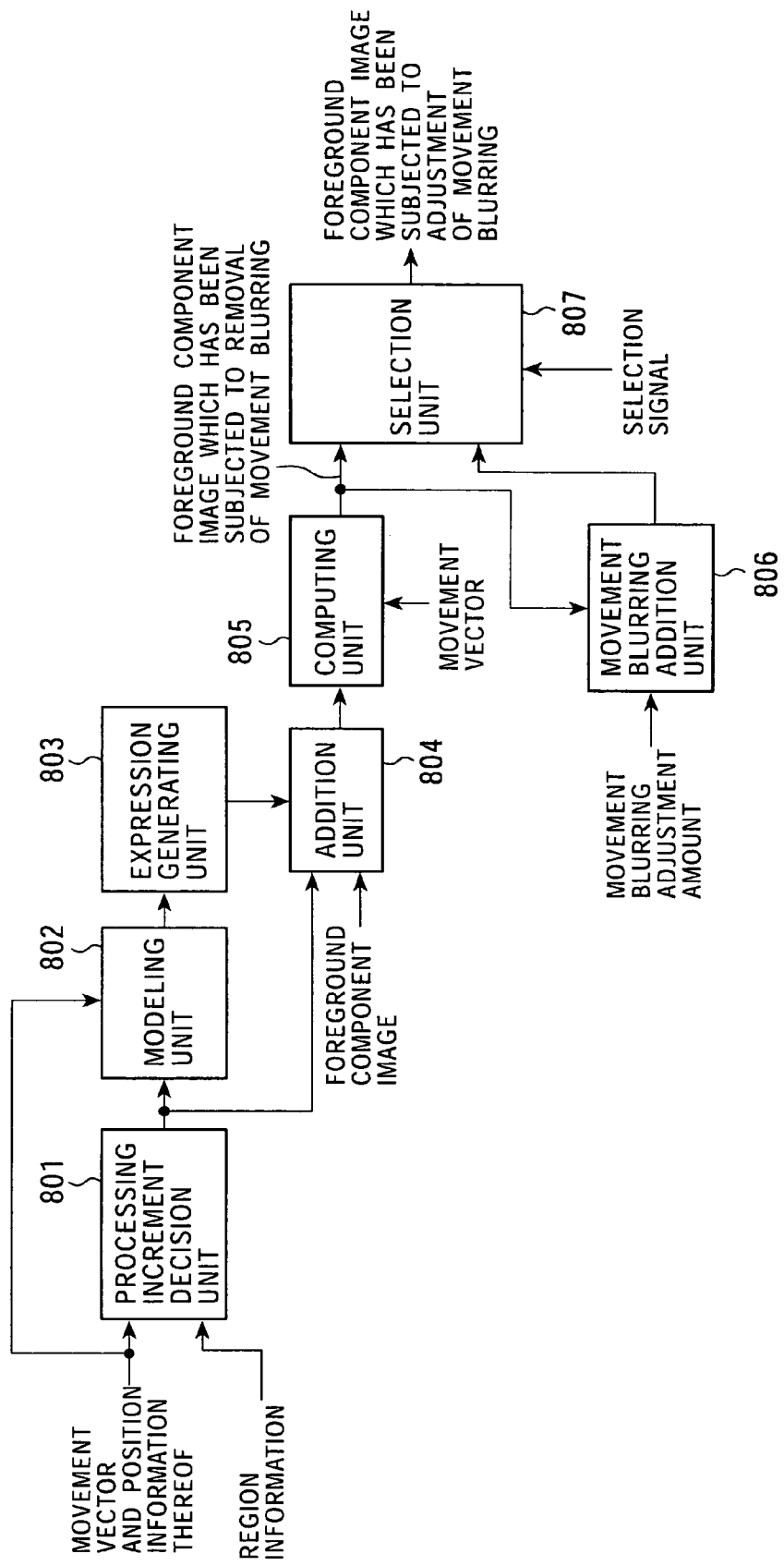
FIG. 67 is a block diagram illustrating an example of the configuration of a movement blurring adjustment unit 106.

FIG. 67 is a block diagram which illustrates an example of the structure of the movement blurring adjustment unit 106. The movement vector and the position information thereof supplied from the movement detecting unit 102, and the region information supplied from the region specifying unit 103 are supplied to a processing increment decision unit 801 and the modeling unit 802. The foreground component image supplied from the foreground/background separation unit 105 is supplied to the addition unit 804.

The processing increment decision unit 801 supplies the processing increment generated based upon the movement vector, the position information thereof, and the region information, as well as the movement vector, to the modeling unit 802. The processing increment decision unit 801 supplies the generated processing increment to the addition unit 804.

Figure 68:
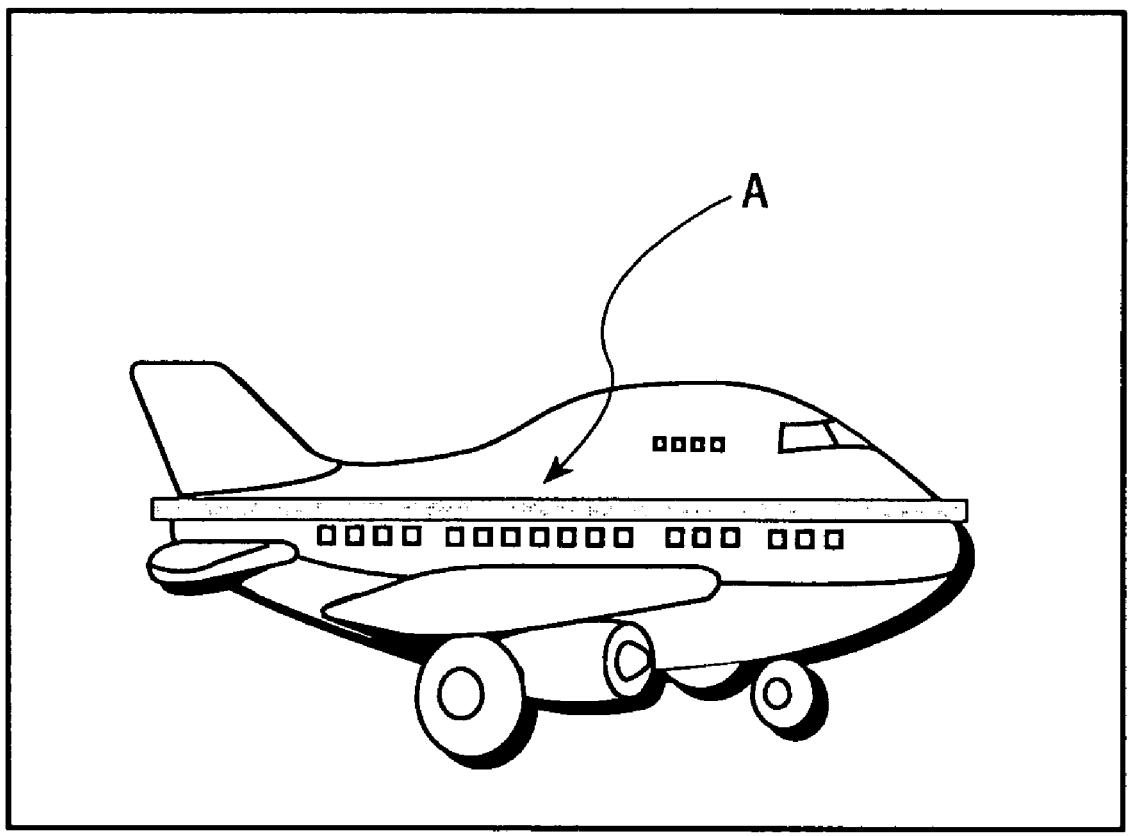
FIG. 68 is a diagram describing increments of processing.

The processing increment generated by the processing increment decision unit 801 denoted by A in FIG. 68, for example, indicates the pixels arrayed sequentially in a movement direction beginning at the pixel corresponding to the covered background region of the foreground component image up to the pixel corresponding to the uncovered background region, or the pixels arrayed sequentially in a movement direction beginning at the pixel corresponding to the uncovered background region up to the pixel corresponding to the covered background region. The processing increment is made up of, for example, two pieces of data of the upper-left point (the left-most or the top-most position of the pixel, which is the pixel designated by the processing increment) and the bottom-right point.

Figure 69:
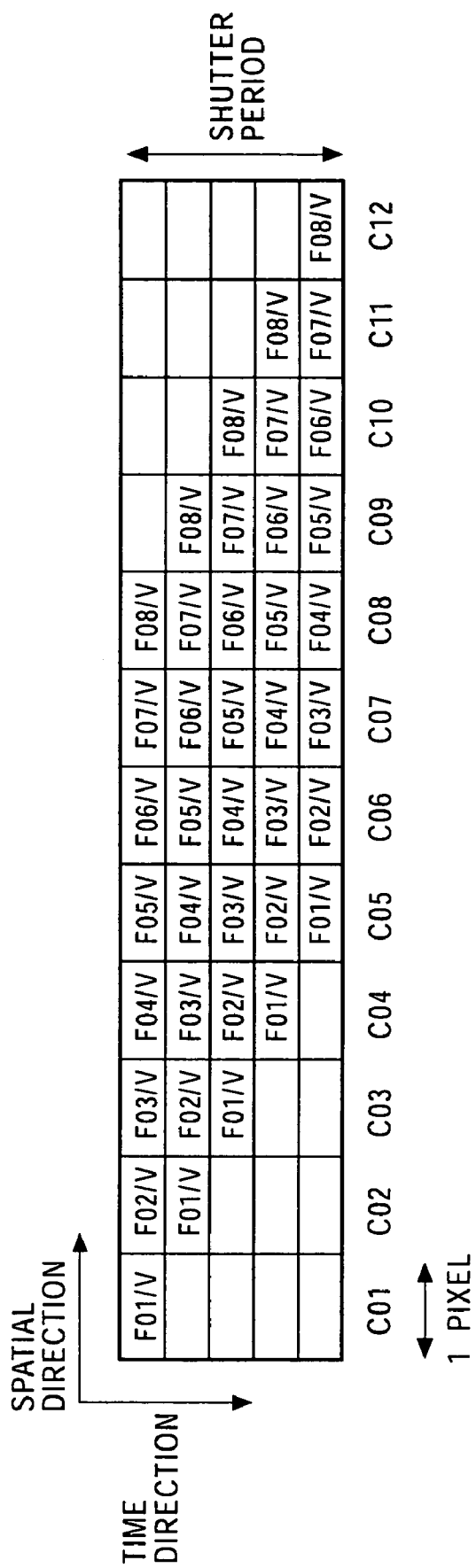
FIG. 69 is a model diagram wherein the pixel values of a foreground component image are developed over the time direction, and periods corresponding to shutter time are divided.

The modeling unit 802 performs modeling based upon the movement vector and the input processing increment. More specifically, for example, an arrangement may be made wherein the modeling unit 802 stores the number of pixels included in the processing increment, the virtual dividing number of the pixel value in the time direction, and multiple models corresponding to the number of the foreground components for each pixel beforehand, and selects a model which designates the correspondence of the pixel value to the foreground components as shown in FIG. 69, based upon the processing increment and the virtual dividing number of the pixel value in the time direction.

For example, in the event that the pixel number corresponding to the processing increment is 12, and the movement amount v in the shutter period is 5, the modeling unit 802 sets the virtual dividing number to 5, and selects a model made up of eight foreground components overall, wherein the left-most positioned pixel includes one foreground component, the second pixel from the left includes two foreground components, the third pixel from the left includes three foreground components, the fourth pixel from the left includes four foreground components, the fifth pixel from the left includes five foreground components, the sixth pixel from the left includes five foreground components, the seventh pixel from the left includes five foreground components, the eighth pixel from the left includes five foreground components, the ninth pixel from the left includes four foreground components, the tenth pixel from the left includes three foreground components, the eleventh pixel from the left includes two foreground components, and the twelfth pixel from the left includes one foreground component.

Note that an arrangement may be made wherein the modeling unit 802 does not select a model from the models stored beforehand, but rather generates a model based upon the movement vector and the processing increment in the event that the movement vector and the processing increment is supplied.

The modeling unit 802 supplies the selected model to an expression generating unit 803.

The expression generating unit 803 generates a expression based upon the model supplied from the modeling unit 802. The expression generated by the expression generating unit 803 will be described in a case wherein the number of the foreground components is 8, the pixel number corresponding to the processing increment is 12, the movement amount v is 5, and the virtual dividing number is 5, with reference to the model for foreground component image shown in FIG. 69.

In the event that the foreground component corresponding to the shutter period/v included in the foreground component image are $F01/v$ through $F08/v$, the relationships between $F01/v$ through $F08/v$ and the pixel values $C01$ through $C12$ are represented in Expression (40) through expression (51).

$$C01 = F1/v \tag{40}$$

$$C02 = F02/v + F01/v \tag{41}$$

$$C03 = F03/v + F02/v + F01/v \tag{42}$$

$$C04 = F04/v + F03/v + F02/v + F01/v \tag{43}$$

$$C05 = F05/v + F04/v + F03/v + F02/v + F01/v \tag{44}$$

$$C06 = F06/v + F05/v + F04/v + F03/v + F02/v \tag{45}$$

$$C07 = F07/v + F06/v + F05/v + F04/v + F03/v \tag{46}$$

$$C08 = F08/v + F07/v + F06/v + F05/v + F04 \tag{47}$$

$$C09 = F08/v + F07/v + F06/v + F05/v \tag{48}$$

$$C10 = F08/v + F07/v + F06/v \tag{49}$$

$$C11 = F08/v + F07/v \tag{50}$$

$$C12 = F08/v \tag{51}$$

The expression generating unit 803 generates expression by transforming the generated expression. The expressions generated by the expression generating unit 803 are represented in Expression (52) through Expression (63).

$$C01 = 1 \cdot F01/v + 0 \cdot F02/v + 0 \cdot F03/v + 0 \cdot F04/v + 0 \cdot F05/v + 0 \cdot F06/v + 0 \cdot F07/v + 0 \cdot F08/v \tag{52}$$

$$C02 = 1 \cdot F01/v + 1 \cdot F02/v + 0 \cdot F03/v + 0 \cdot F04/v + 0 \cdot F05/v + 0 \cdot F06/v + 0 \cdot F07/v + 0 \cdot F08/v \tag{53}$$

$$C03=1 \cdot F01/v+1 \cdot F02/v+1 \cdot F03/v+0 \cdot F04/v+0 \cdot F05/v+ 0 \cdot F06/v+0 \cdot F07/v+0 \cdot F08/v \qquad (54)$$

$$C04=1 \cdot F01/v+1 \cdot F02/v+1 \cdot F03/v+1 \cdot F04/v+0 \cdot F05/v+ 0 \cdot F06/v+0 \cdot F07/v+0 \cdot F08/v \qquad (55)$$

$$C05=1 \cdot F01/v+1 \cdot F02/v+1 \cdot F03/v+1 \cdot F04/v+1 \cdot F05/v+ 0 \cdot F06/v+0 \cdot F07/v+0 \cdot F08/v \qquad (56)$$

$$C06=0 \cdot F01/v+1 \cdot F02/v+1 \cdot F03/v+1 \cdot F04/v+1 \cdot F05/v+ 1 \cdot F06/v+0 \cdot F07/v+0 \cdot F08/v \qquad (57)$$

$$C07=0 \cdot F01/v+0 \cdot F02/v+1 \cdot F03/v+1 \cdot F04/v+1 \cdot F05/v+ 1 \cdot F06/v+1 \cdot F07/v+0 \cdot F08/v \qquad (58)$$

$$C08=0 \cdot F01/v+0 \cdot F02/v+0 \cdot F03/v+1 \cdot F04/v+1 \cdot F05/v+ 1 \cdot F06/v+1 \cdot F07/v+1 \cdot F08/v \qquad (59)$$

$$C09=0 \cdot F01/v+0 \cdot F02/v+0 \cdot F03/v+0 \cdot F04/v+1 \cdot F05/v+ 1 \cdot F06/v+1 \cdot F07/v+1 \cdot F08/v \qquad (60)$$

$$C10=F01/v+0 \cdot F02/v+0 \cdot F03/v+0 \cdot F04/v+0 \cdot F05/v+ 1 \cdot F06/v+1 \cdot F07/v+1 \cdot F08/v \qquad (61)$$

$$C11=0 \cdot F01/v+0 \cdot F02/v+0 \cdot F03/v+0 \cdot F04/v+0 \cdot F05/v+ 0 \cdot F06/v+1 \cdot F07/v+1 \cdot F08/v \qquad (62)$$

$$C12=0 \cdot F01/v+0 \cdot F02/v+0 \cdot F03/v+0 \cdot F04/v+0 \cdot F05/v+ 0 \cdot F06/v+0 \cdot F07/v+1 \cdot F08/v \qquad (63)$$

Expression (52) through Expression (63) may be represented as with Expression (64).

$$Cj = \sum_{i=01}^{08} aij \cdot Fi/v \qquad (64)$$

In Expression (64), j denotes the pixel position. In this example, j has one of the values between 1 and 12. Also, i denotes the position of the foreground value. In this example, i has one value between 1 and 8. Corresponding to the values of i and j, aij has one of the values of 0 or 1.

Taking margin of error into consideration, Expression (64) may be represented as with Expression (65).

$$Cj = \sum_{i=01}^{08} aij \cdot Fi/v + ej \qquad (65)$$

In Expression (65), ej denotes the margin of error included in the pixel of interest, Cj.

Expression (65) can be rewritten into Expression (66).

$$ej = Cj - \sum_{i=01}^{08} aij \cdot Fi/v \qquad (66)$$

Note that in order to use the least square method, the squared-sum E of the margin of error is defined as represented in Expression (67).

$$E = \sum_{j=01}^{12} ej^2 \qquad (67)$$

To minimize margin of error, the value of the partial derivative from the variable Fk as to the squared-sum of the margin of error E should become 0. Fk is obtained so as to satisfy Expression (68).

$$\frac{\partial E}{\partial Fk} = 2 \cdot \sum_{j=01}^{12} ej \cdot \frac{\partial ej}{\partial Fk} \qquad (68)$$

$$= 2 \cdot \sum_{j=01}^{12} \left\{ \left( Cj - \sum_{i=01}^{08} aij \cdot Fi/v \right) \cdot (-akj/v) \right\} = 0$$

In Expression (68), the movement value v is a fixed value, so Expression (69) can be derived.

$$\sum_{j=01}^{12} akj \cdot \left( Cj - \sum_{i=01}^{08} aij \cdot Fi/v \right) = 0 \qquad (69)$$

Developing Expression (69) and transposing arguments, Expression (70) is obtained.

$$\sum_{j=01}^{12} \left( akj \cdot \sum_{i=01}^{08} aij \cdot Fi \right) = v \cdot \sum_{j=01}^{12} akj = Cj \qquad (70)$$

Expression (70) is developed into eight expressions, each of which is obtained by substituting one of the integers between 1 and 8 for k in Expression (70). The obtained eight expressions may be represented in one expression by a matrix. The expression is called a normal equation.

An example of the normal expression generated by the expression generating unit 803 based upon such a least square method is represented in Expression (71).

$$\begin{bmatrix} 54321000 \\ 45432100 \\ 34543210 \\ 23454321 \\ 12345432 \\ 01234543 \\ 00123454 \\ 00012345 \end{bmatrix} \begin{bmatrix} F01 \\ F02 \\ F03 \\ F04 \\ F05 \\ F06 \\ F07 \\ F08 \end{bmatrix} = v \cdot \begin{bmatrix} \sum_{i=08}^{12} Ci \\ \sum_{i=07}^{11} Ci \\ \sum_{i=06}^{10} Ci \\ \sum_{i=05}^{09} Ci \\ \sum_{i=04}^{08} Ci \\ \sum_{i=03}^{07} Ci \\ \sum_{i=02}^{06} Ci \\ \sum_{i=01}^{05} Ci \end{bmatrix} \qquad (71)$$

In the event that Expression (71) is represented by A·F=v·C, then C, A, and v are known, and F is unknown. Also, while A and v are known at the point of modeling, C becomes known by inputting the pixel value in addition operation.

The margin of error included in the pixel C is dispersed by calculating the foreground components by the normal expression based upon the least square method.

The expression generating unit 803 supplies the normal expression generated as described above, to the addition unit 804.

The addition unit 804 sets the pixel value C included in the foreground component image for the expression of the matrix supplied from the expression generating unit 803 based upon the processing increment supplied from the processing increment decision unit 801. The addition unit 804 supplies the matrix which is set to the pixel value C, to the computing unit 805.

Figure 70:
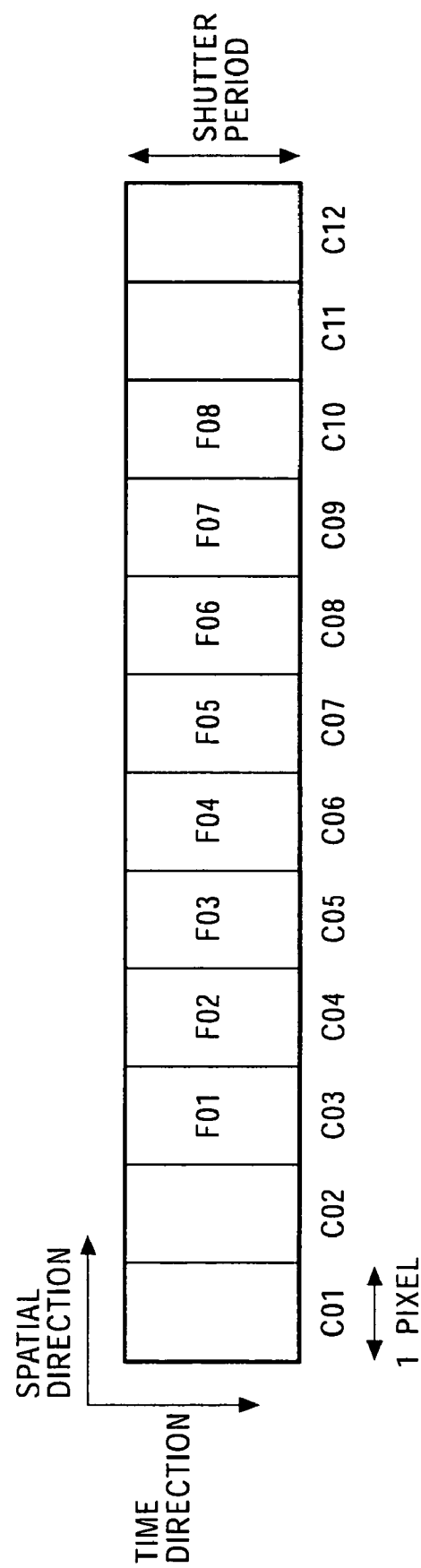
FIG. 70 is a model diagram wherein the pixel values of foreground component image are developed over the time direction, and periods corresponding to shutter time are divided.

The computing unit 805 calculates the foreground component Fi/v which has been subjected to removal of the movement blurring by the processing based upon the method such as the sweeping method (Gauss-Jordan elimination), calculates Fi corresponding to one of the integers i between 0 and 8, which is the pixel value of the foreground which has been subjected to removal of the movement blurring, and outputs the foreground component image which has been subjected to removal of the movement blurring, which is made up of Fi which is the pixel value which has been subjected to the removal of the movement blurring as shown by way of a example in FIG. 70, to a movement blurring addition unit 806 and a selection unit 807.

Note that in the foreground component image which has been subjected to removal of the movement blurring shown in FIG. 70, each of C03 through C10 is set to each of F01 through F08 so as not to change the position of the foreground component image with regard to the screen, which can correspond to an arbitrary position.

Figure 71:
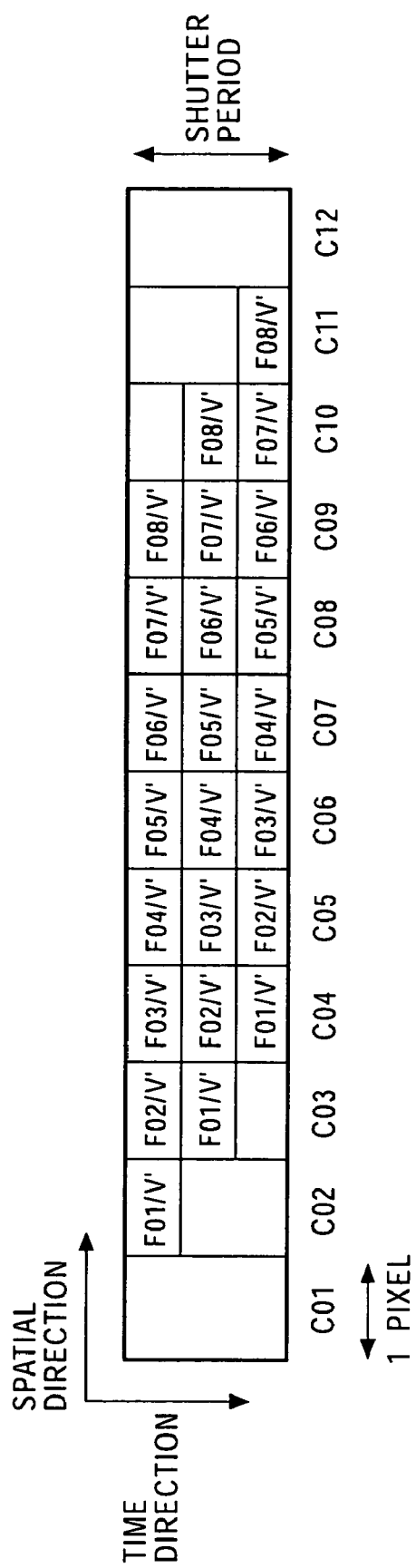
FIG. 71 is a model diagram wherein the pixel values of foreground component image are developed over the time direction, and periods corresponding to shutter time are divided.

The movement blurring addition unit 806 can adjust the movement blurring amount by providing a movement blurring adjustment amount v' different from the movement amount v, e.g., the movement blurring adjustment amount v' wherein the value thereof is the half of the movement amount v, or the movement blurring amount v' having no relationship with the movement amount v. For example, as shown in FIG. 71, the movement blurring addition unit 806 calculates the foreground component Fi/v' by dividing the pixel value of the foreground which has been subjected to removal of the movement blurring, Fi, by the movement blurring adjustment amount v', calculates the sum of the foreground components Fi/v', and generates the pixel values which are subjected to adjustment of the movement blurring. For example, in the event that the movement blurring adjustment amount v' is 3, the pixel value C02 is (F01)/v', the pixel value C03 is (F01+F02)/v', the pixel value C04 is (F01+F02+F03)/v', and the pixel value C05 is (F02+F03+F04)/v'.

The movement blurring addition unit 806 supplies the foreground component image which has been subjected to the adjustment of the movement blurring amount, to the selection unit 807.

The selection unit 807 selects either of the foreground component image which has been subjected to removal of the movement blurring supplied from the computing unit 805, or the foreground component image which has been subjected to adjustment of the movement blurring amount supplied from the movement blurring addition unit 806, and outputs the selected foreground component image.

As described above, the movement blurring adjustment unit 106 can adjust the movement blurring amount based upon the selection signal and the movement blurring adjustment amount v'.

Figure 72:
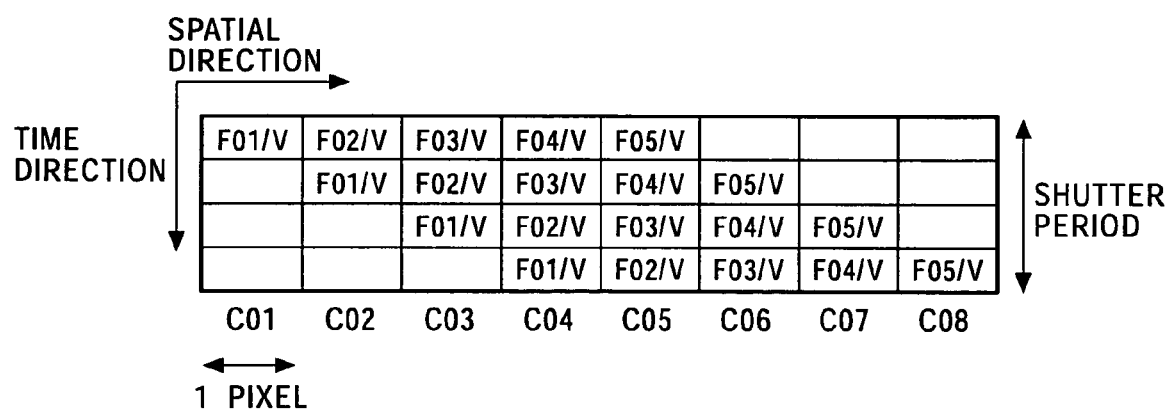
FIG. 72 is a model diagram wherein the pixel values of foreground component image are developed over the time direction, and periods corresponding to shutter time are divided.

Also, for example, as shown in FIG. 72, in the event that the pixel number corresponding to the processing increment is 8, and the movement amount v is 4, the movement blurring adjustment unit 106 generates the expression of the matrix represented in Expression (72).

$$\begin{bmatrix} 43210 \\ 34321 \\ 23432 \\ 12343 \\ 01234 \end{bmatrix} \begin{bmatrix} F01 \\ F02 \\ F03 \\ F04 \\ F05 \end{bmatrix} = v \cdot \begin{bmatrix} \sum_{i=05}^{08} Ci \\ \sum_{i=04}^{07} Ci \\ \sum_{i=03}^{06} Ci \\ \sum_{i=02}^{05} Ci \\ \sum_{i=01}^{05} Ci \end{bmatrix} \qquad (72)$$

The movement blurring adjustment unit 106 sets up the expressions wherein the number thereof corresponds to the length of the processing increment, and calculates the pixel value which is subjected to adjustment of movement blurring, Fi. Similarly, in th event that there are one hundred pixels included in the processing increment, for example, expressions corresponding to the one hundred pixels are generated, and Fi is calculated.

Figure 73:
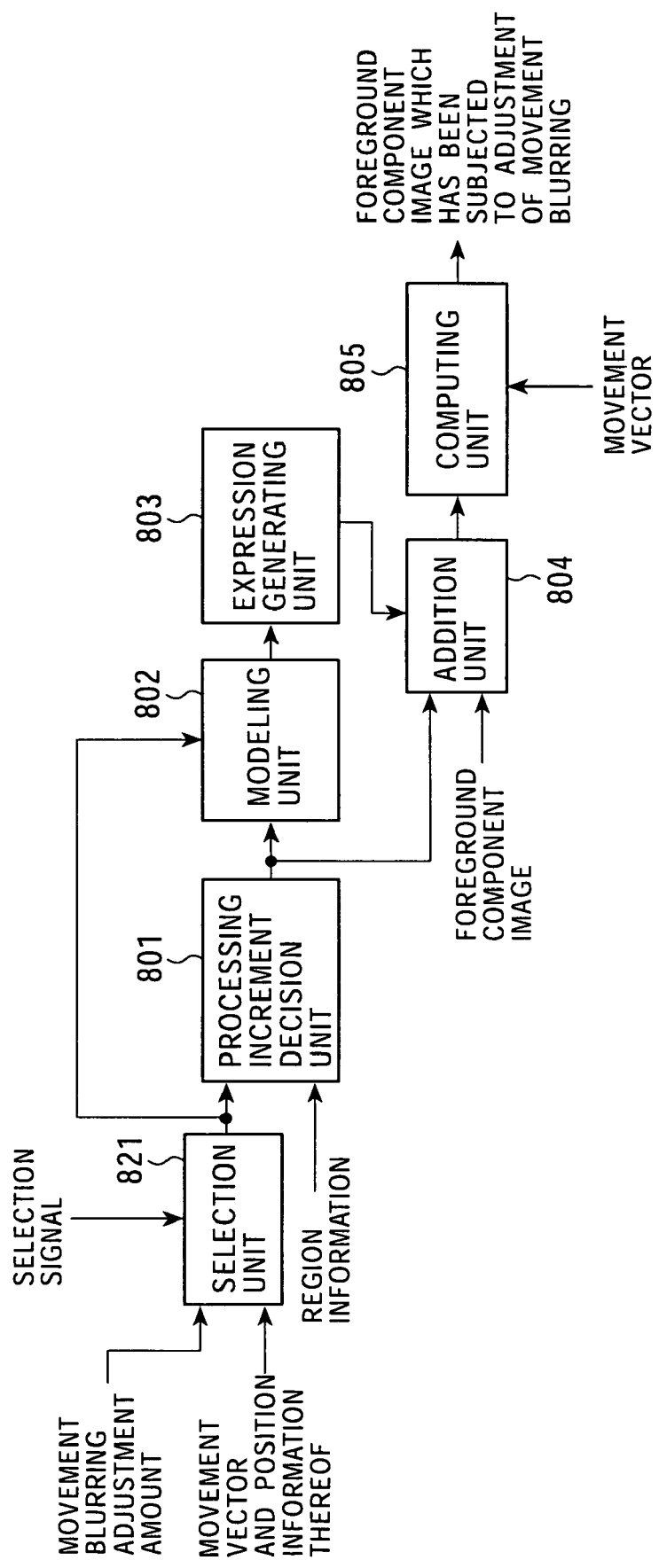
FIG. 73 is a diagram illustrating an example of another configuration of the movement blurring adjustment unit 106.

FIG. 73 is a diagram which illustrates an example of a different structure of the movement blurring adjustment unit 106. The same portions as with the case shown in FIG. 67 are denoted by the same reference numbers, and description thereof will be omitted.

The selection unit 821 supplies the input movement vector and the position signal thereof to the processing increment decision unit 801 and the modeling unit 802 as they were, or replaces the size of movement vector with the movement blurring adjustment amount v', and supplies the movement vector wherein the amount thereof is replaced with the movement blurring adjustment amount v' and the position signal to the processing increment decision unit 801 and the modeling unit 802, based upon the selection signal.

Thus, the processing increment decision unit 801 through the computing unit 805 of the movement blurring adjustment unit 106 shown in FIG. 73 can adjust the movement blurring amount corresponding to the values of the movement amount v and the movement blurring adjustment amount v'. For example, in the event that the movement amount v is 5 and the movement blurring adjustment amount v' is 3, the processing increment decision unit 801 through the computing unit 805 of the movement blurring adjustment unit 106 shown in FIG. 73, performs computation for the foreground component image wherein the movement amount v is 5 as shown in FIG. 69, based upon the model corresponding to the movement blurring adjustment amount v' of 3 as shown in FIG. 71, and outputs the image containing the movement blurring corresponding to the movement amount v of (movement amount v)/(movement blurring adjustment amount v')=5/3, i.e., approximately 1.7. In this case, since the calculated image does not contain the movement blurring corresponding to the movement amount v of 3, it should be noted that the meaning of the relationship between the movement amount v and the movement blurring adjustment amount v' is not the same as the results of the movement blurring addition unit 806.

As described above, the movement blurring adjustment unit 106 generates the expression corresponding to the movement amount v and the processing increment, sets the pixel values of the foreground component image for the generated expression, and calculates the foreground component image which is subjected to adjustment of the movement blurring.

Figure 74:
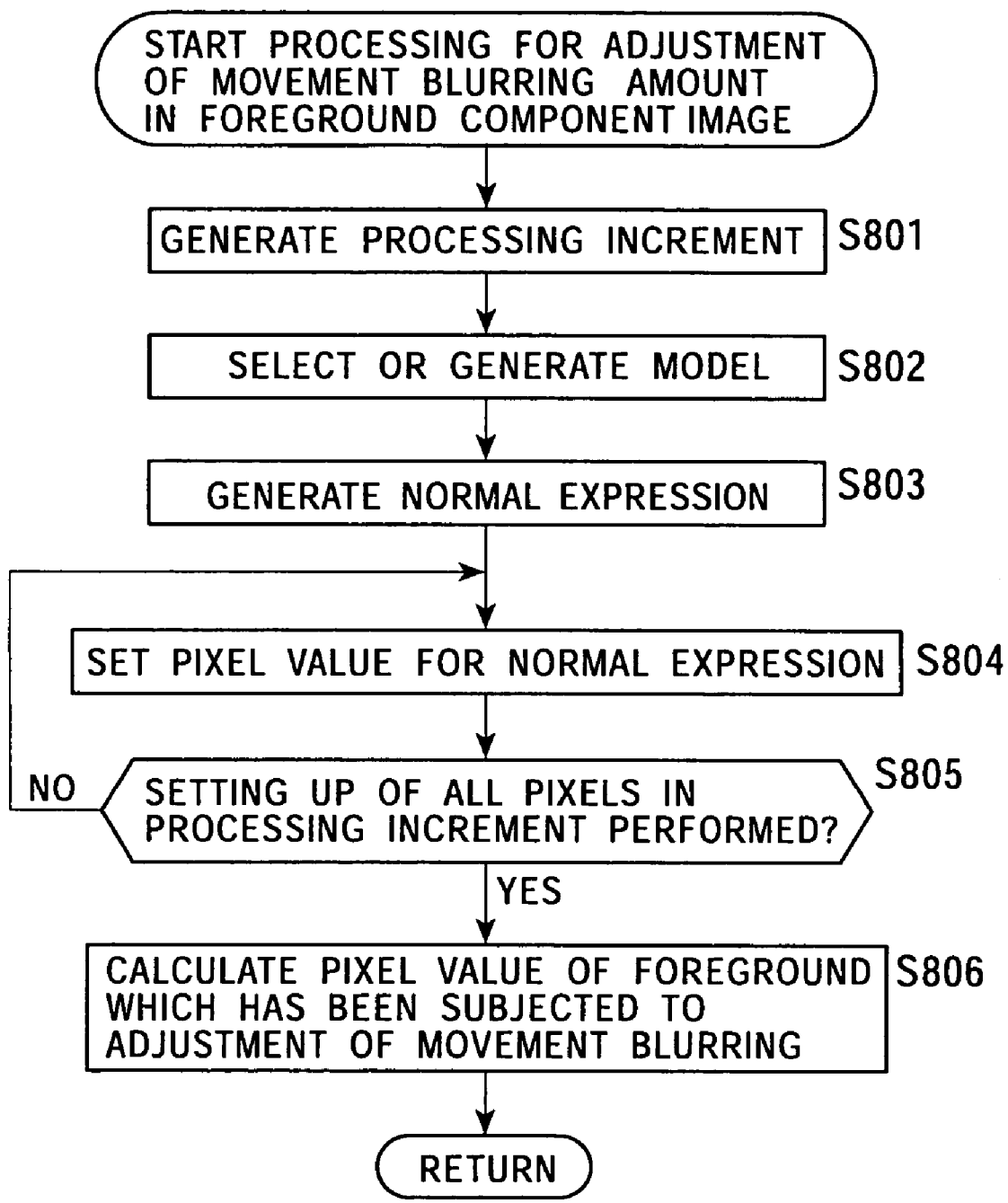
FIG. 74 is a flowchart describing the processing for adjusting the amount of movement blurring contained in the foreground component image by the movement blurring adjustment unit 106.

The processing of adjustment of the movement blurring amount included in the foreground component image by the movement blurring adjustment unit 106 will now be described, with reference to the flowchart shown in FIG. 74.

In Step S801, the processing increment decision unit 801 of the movement blurring adjustment unit 106 generates the processing increment based upon the movement vector and the region information, and supplies the generated processing increment to the modeling unit 802.

In Step S802, the modeling unit 802 of the movement blurring adjustment unit 106 performs selecting or generating of the model corresponding to the movement amount v and the processing increment. In Step S803, the expression generating unit 803 creates the normal expression based upon the selected model.

In Step S804, the addition unit 804 sets the pixel values of the foreground component image for the created normal expression. In Step S805, the addition unit 804 judges whether or not the pixel values of all the pixel corresponding to the processing increment are set, and in the event that judgment is made that not all the pixel values of the pixels corresponding to the processing increment have been set, the flow returns to Step S804 and repeats the processing of setting the pixel values for the normal expression.

In the event that judgment is made that all the pixel values of the pixel of the processing increment have been set in Step S805, the flow proceeds to Step S806, the computing unit 805 calculates the pixel values of the foreground which has been subjected to adjustment of the movement blurring amount based upon the normal expression wherein the pixel values supplied from the addition unit 804 are set, and the processing ends.

As described above, the movement blurring adjustment unit 106 can adjust the movement blurring amount in the foreground image containing the movement blurring based upon the movement vector and the region information.

That is to say, the movement blurring amount included in the pixel values which are the sampled data, can be adjusted.

As described above, the signal processing device of which the structure is shown in FIG. 2 can adjust the movement blurring amount included in the input image. The signal processing device wherein the structure is shown in FIG. 2 can calculate the mixture ratio α which is buried information, and output the calculated mixture ratio α.

Figure 75:
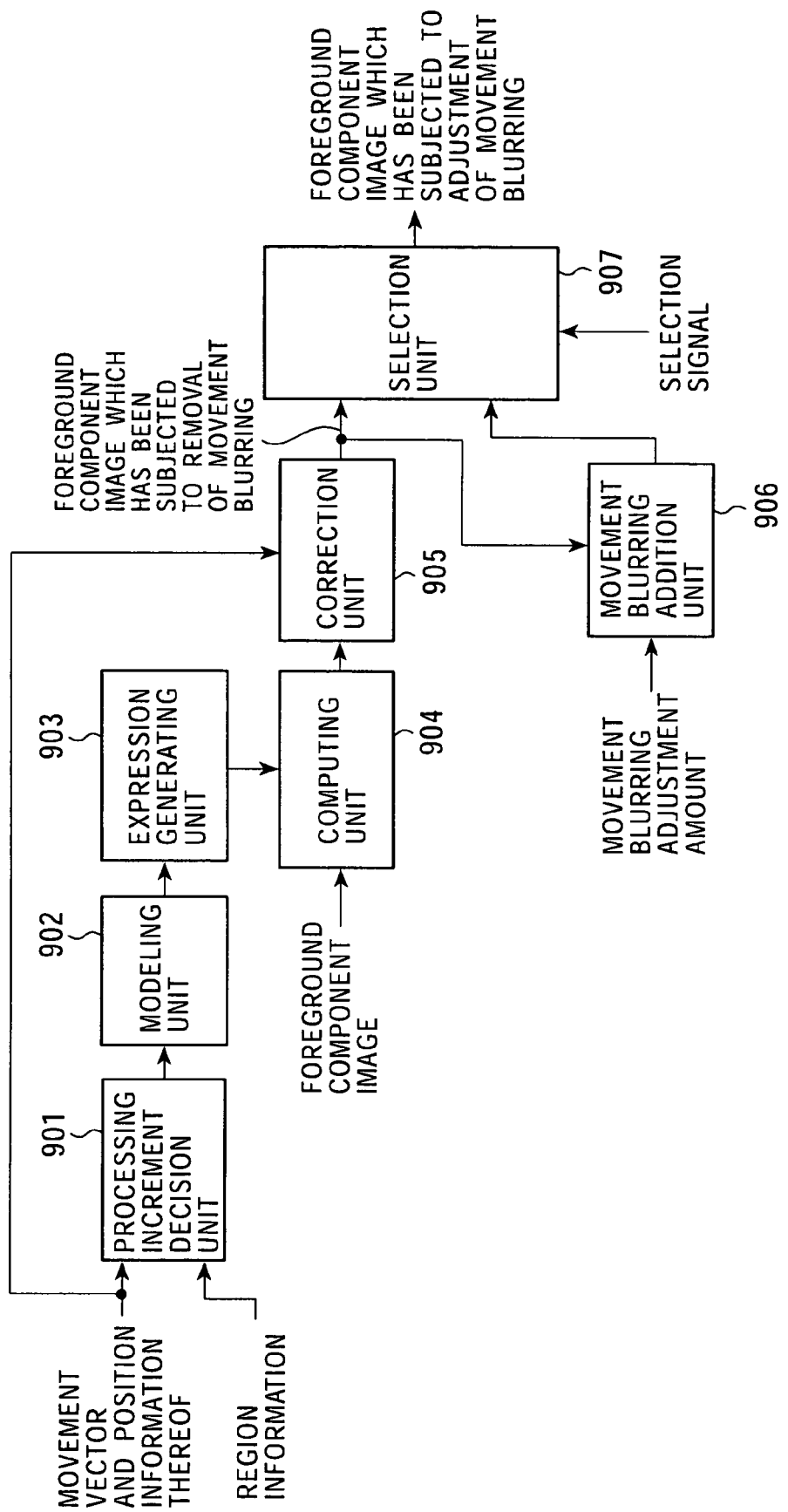
FIG. 75 is a block diagram illustrating an example of another configuration of the movement blurring adjustment unit 106.

FIG. 75 is a block diagram which illustrates a different example of the structure of the movement blurring adjustment unit 106. The movement vector and the position information thereof supplied from the movement detecting unit 102 are supplied to a processing increment decision unit 901 and the correction unit 905, and the region information supplied from the region specifying unit 103 is supplied to the processing increment decision unit 901. The foreground component image supplied from the foreground/background separation unit 105 is supplied to a computation unit 904.

The processing increment decision unit 901 supplies the generated processing increment along with the movement vector based upon the movement vector, the position information thereof, and the region information.

The modeling unit 902 performs modeling based upon the movement vector and the input processing increment.

The expression generating unit 903 generates the expression based upon the model supplied from the modeling unit 902.

Figure 76:
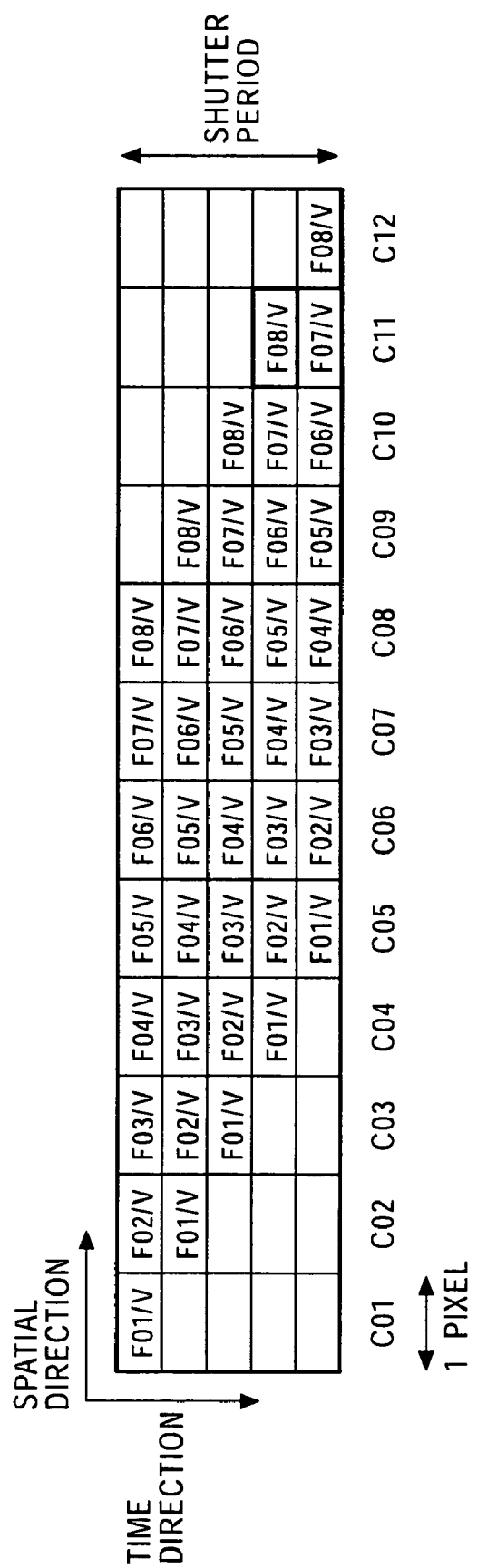
FIG. 76 is a diagram illustrating a model specifying an example of the how the pixel value and foreground component correspond.
Figure 77:
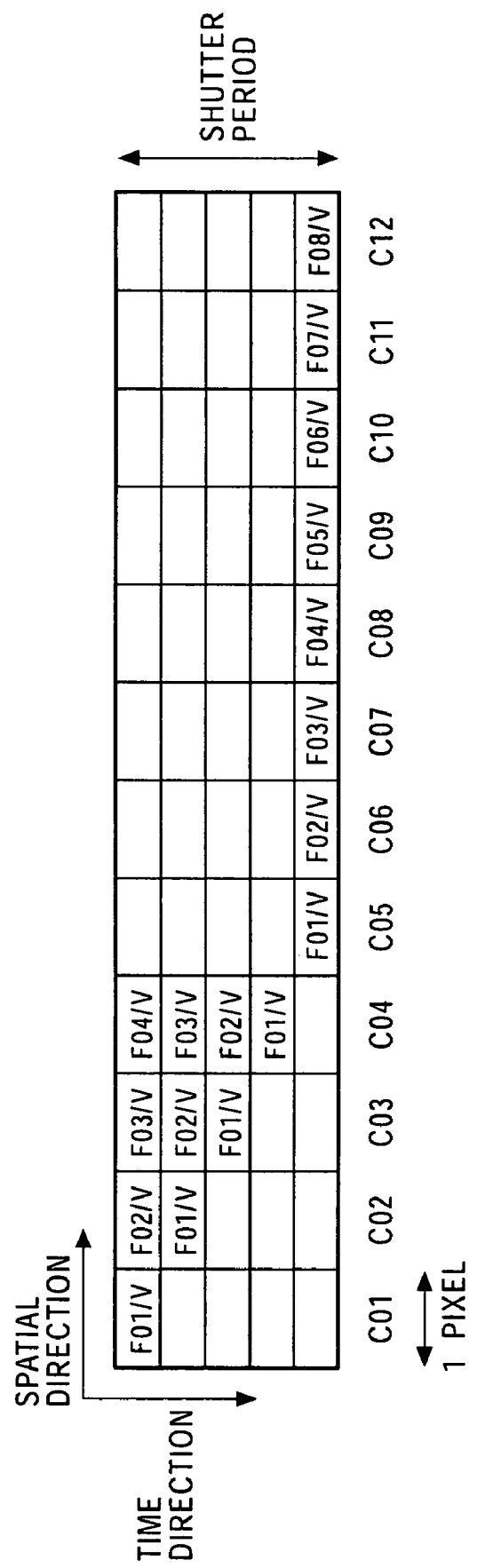
FIG. 77 is a diagram describing calculating the foreground component.
Figure 78:
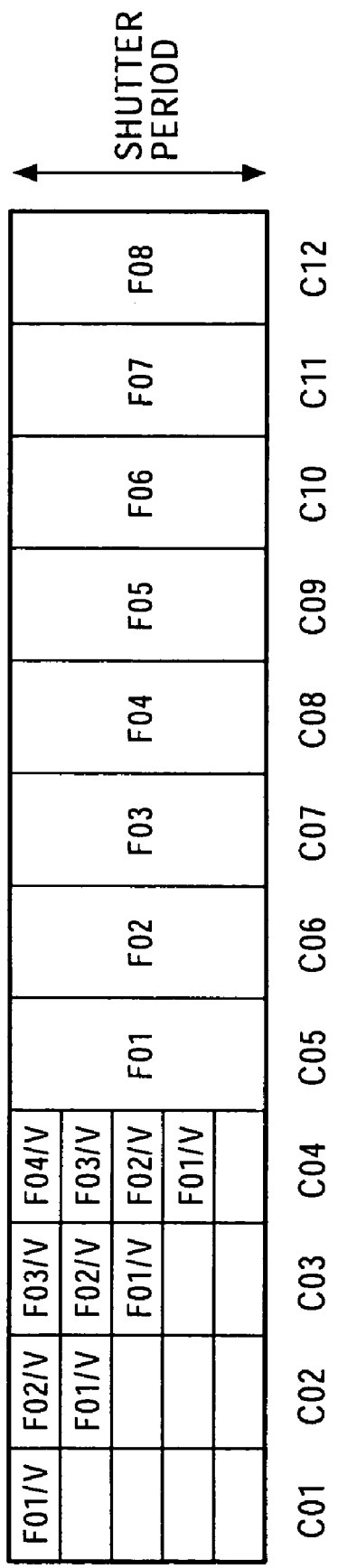
FIG. 78 is a diagram describing calculating the foreground component.

Referring to the model of the foreground component image as shown in FIG. 76 through FIG. 78, a description will be made with regard to an example of the expression generated by the expression generating unit 903 in the event that the number of the foreground components is 8, the pixel number corresponding to the processing increment is 12, and the movement amount v is 5.

In the event that the foreground components corresponding to the shutter period/v included in the foreground component image are F01/v through F08/v, the relationships between F01/v through F08/v and the pixel values C01 through C12 are represented in Expression (40) through Expression (51), as described above.

Giving attention to the pixel values C12 and C11, the pixel value C12 includes only the foreground component F08/v as represented in Expression (73), the pixel value C11 consists of the sum of products of the foreground component F08/v and the foreground component F07/v. Accordingly, the foreground component F07/v is calculated by Expression (74).

$$F08/v = C12 \quad (73)$$

$$F07/v = C11 - C12 \quad (74)$$

Similarly, taking the foreground components included in the pixel values C10 through C01 into consideration, the foreground components F06/v through F01/v are calculated by Expression (75) through Expression (80).

$$F06/v = C10 - C11 \quad (75)$$

$$F05/v = C09 - C10 \quad (76)$$

$$F04/v = C08 - C09 \quad (77)$$

$$F03/v = C07 - C08 + C12 \quad (78)$$

$$F02/v = C06 - C07 + C11 - C12 \quad (79)$$

$$F01/v = C05 - C06 + C10 - C11 \quad (80)$$

The expression generating unit 903 generates the expression for calculating the foreground components by the differences of the pixel values as represented by way of examples in Expression (73) through Expression (80).

The computation unit 904 sets the pixel values of the foreground component image for the expression supplied from the expression generating unit 903, and calculates the foreground components based upon the expression wherein the pixel values are set. For example, in the event that Expression (73) through Expression (80) are supplied from the expression generating unit 903, the computation unit 904 sets the pixel values C05 through C12 for Expression (73) through Expression (80).

The computation unit 904 calculates the foreground components based upon the expression wherein the pixel values are set. For example, the computation unit 904 calculates the foreground components F01/v through F08/v by the computation based upon Expression (73) through Expression (80) for which the pixel values C05 through C12, as shown in FIG. 77. The computation unit 904 supplies the foreground components F01/v through F08/v to the correction unit 905.

The correction unit 905 calculates the foreground pixel value which is subjected to removal of the movement blurring by multiplying the foreground component supplied from the computation unit 904 by the movement amount v included in the movement vector supplied from the processing increment decision unit 901. For example, in the event that the foreground components F01/v through F08/v supplied from the computation unit 904 are supplied, the correction unit 905 calculates the foreground pixel values F01 through F08 which are subjected to removal of the movement blurring as shown in FIG. 78, by multiplying each of the foreground components F01/v through F08/v by the movement amount v of 5.

The correction unit 905 supplies the foreground component image made up of the foreground pixel values which are subjected to removal of the movement blurring by calculating as described above, to a movement blurring addition unit 906 and a selection unit 907.

The movement addition unit 906 can adjust the movement blurring by a movement blurring adjustment value v' with a value different from the movement amount v, for example, a movement blurring adjustment amount v' of which value is the half value of the movement amount v, or a movement blurring adjustment amount v' which has no relationship with the movement amount v. For example, as shown in FIG. 71, the movement blurring addition unit 906 calculates the foreground component Fi/v' by dividing the foreground pixel value Fi which has been subjected to removal of the movement blurring by the movement blurring adjustment amount v', calculates the sum of the foreground components Fi/v, and generates the pixel values which have been subjected to adjustment of the movement blurring. For example, in the event that the movement blurring adjustment amount v' is 3, the pixel value C02 is (F01)/v', pixel value C03 is (F01+F02)/v', the pixel value C04 is (F01+F02+F03)/v', and the pixel value C05 is (F02+F03+F04)/v'.

The movement blurring addition unit 906 supplies the foreground component image which has been subjected to adjustment of the movement blurring, to the selection unit 907.

The selection unit 907 selects either of the foreground component image which has been subjected to removal of the movement blurring supplied from the correction unit 905, or the foreground component image which has been subjected to adjustment of the movement blurring supplied from the movement blurring addition unit 906, based upon the selection signal corresponding to user's selection, and outputs the selected foreground component image.

As described above, the movement blurring adjustment unit 106 can adjust the movement blurring amount based upon the selection signal and the movement blurring adjustment amount v'.

Figure 79:
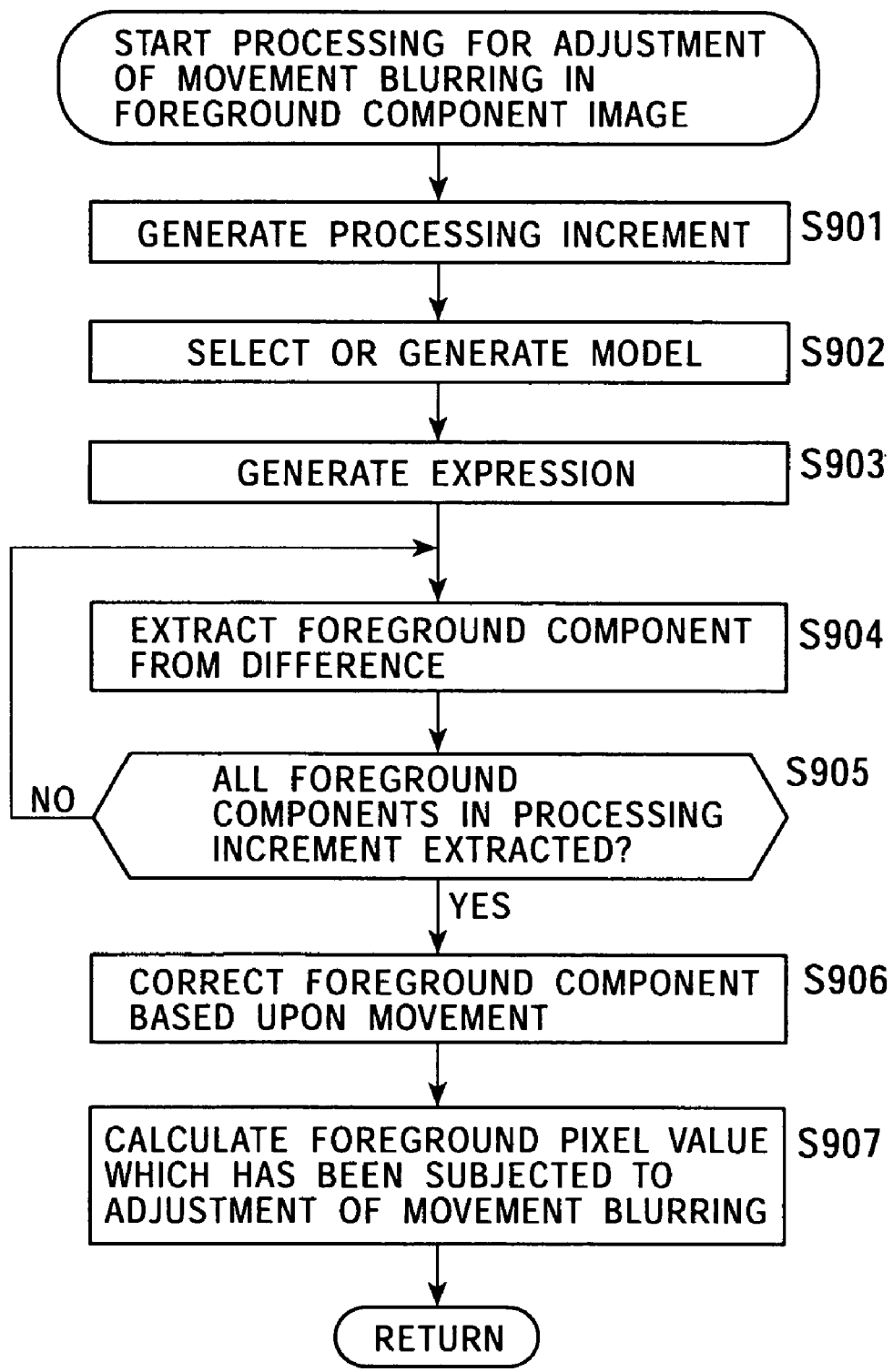
FIG. 79 is a flowchart describing processing for adjusting foreground movement blurring amount.

Referring to the flowchart shown in FIG. 79, a description will now be made regarding the processing of the adjustment of the movement blurring amount of the foreground by the movement blurring adjustment unit 106 of which structure is illustrated in FIG. 75.

In Step S901, the processing increment decision unit 901 of the movement blurring adjustment unit 106 generates the processing increment based upon the movement vector and the region information, and supplies the generated processing increment to the modeling unit 902 and the correction unit 905.

In Step S902, the modeling unit 902 of the movement blurring adjustment unit 106 performs selecting or generating of the model corresponding to the movement amount v and the processing increment. In Step S903, the expression generating unit 903 generates the expression for calculating the foreground components by the difference of the pixel values of the foreground component image base upon the model which is selected or generated.

In Step S904, the computation unit 904 sets the pixel values of the foreground component image for the created expression, and extracts the foreground components from the difference of the pixel values based upon the expression wherein the pixel values are set. In Step S905, the computation unit 904 judges whether or not all the foreground components corresponding to the processing increment have been extracted, and in the event that judgement is made that not all the foreground components corresponding to the processing increment have been extracted, the flow returns to Step S904, and repeats the processing of extracting the foreground components.

In Step S905, in the event that judgment is made that all the foreground components corresponding to the processing increment have been extracted, the flow proceeds to Step S906, the correction unit 905 corrects each of the foreground components F01/v through F08/v supplied from the computation unit 904 based upon the movement amount v, and calculates the pixel values of the foreground components F01 through F08, which are subjected to removal of the movement blurring.

In Step S907, the movement blurring addition unit 906 calculates the pixel values of the foreground which is subjected to adjustment of the movement blurring, and the selection unit 907 selects either of the image which is subjected to removal of the movement blurring, or the image which is subjected to adjustment of the movement blurring, outputs the selected image, and the processing ends.

As described above, the movement blurring adjustment unit 106 of which the structure is shown in FIG. 75 can adjust the movement blurring in the foreground image containing the movement blurring more speedily by simpler computation.

While effects are observed in ideal conditions with conventional techniques which partially remove the movement blurring such as the Winner filter or the like, sufficient effects are not observed for actual images which has been quantized and contains noise, while with the movement blurring adjustment unit 106 wherein the structure is shown in FIG. 75, sufficient effects are observed for actual images which has been quantized and contains noise, and accurate removal of the movement blurring is realized.

Figure 80:
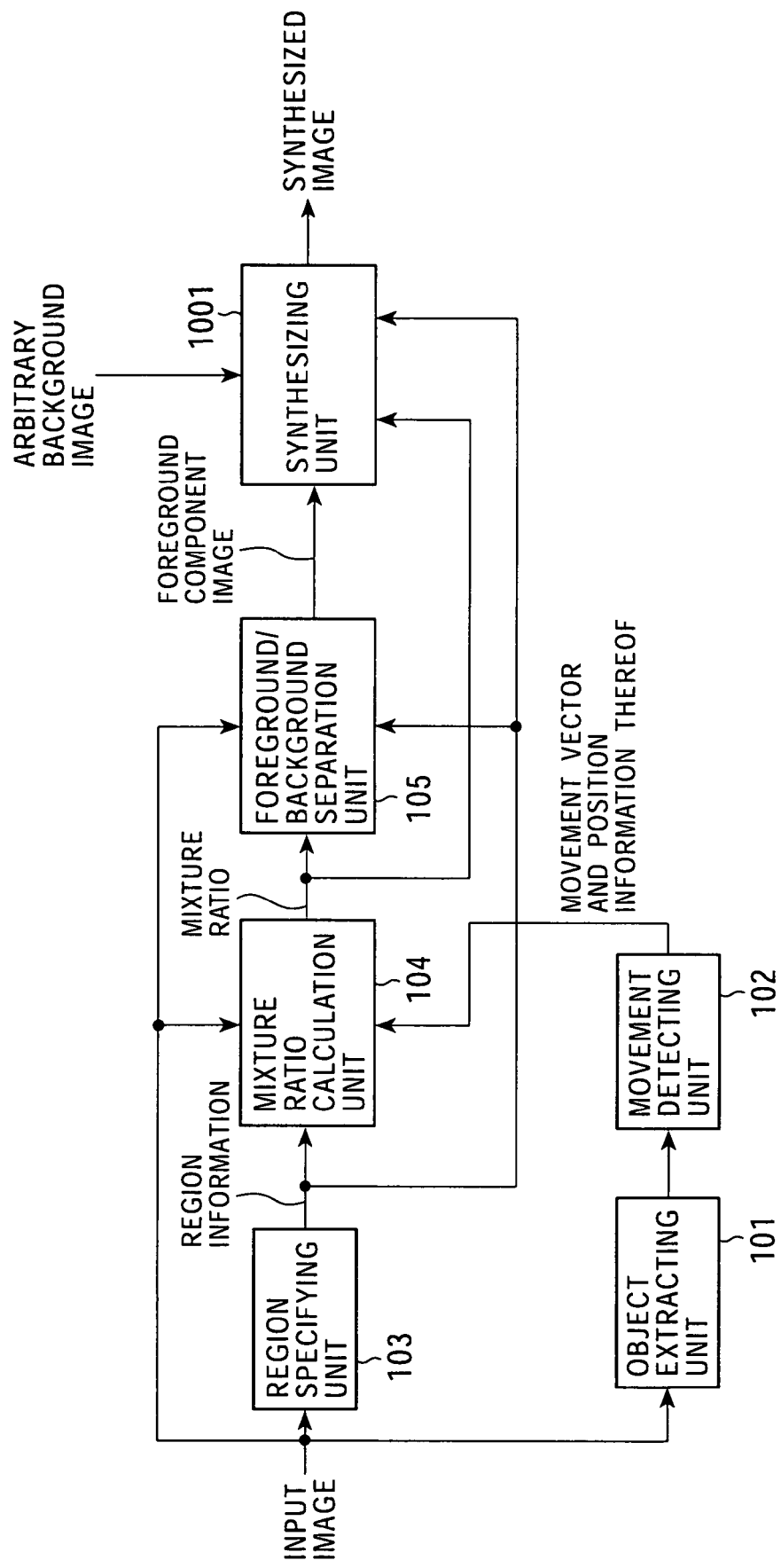
FIG. 80 is a block diagram illustrating another configuration of functions of the signal processing device.

FIG. 80 is a block diagram which illustrates a different structure of the signal processing device.

The same portions as shown in FIG. 2 are denoted by the same reference numerals, and description thereof will be omitted when appropriate.

The object extracting unit 101 roughly extracts the image objects corresponding to the foreground object contained in the input image, and supplies the extracted image object to the movement detecting unit 102. The movement detecting unit 102 calculates the movement vectors corresponding to the roughly extracted foreground objects, and supplies the calculate movement vector and position information of the movement vector to the mixture ratio calculating unit 104.

The region specifying unit 103 supplies the region information to the mixture ratio calculating unit 104 and a synthesizing unit 1001.

The mixture ratio calculating unit 104 supplies the mixture ratio α to the foreground/background separation unit 105 and the synthesizing unit 1001.

The foreground/background separation unit 105 supplies the foreground component image to the synthesizing unit 1001.

The synthesizing unit 1001 synthesizes an arbitrary background image, and the foreground component image supplied from the foreground/background separation unit 105, based on the mixture ratio α supplied from the mixture ratio calculating unit 104 and the region information supplied from the region specifying unit 103, and outputs a synthesized image wherein the arbitrary background image and the foreground component image have been synthesized.

Figure 81:
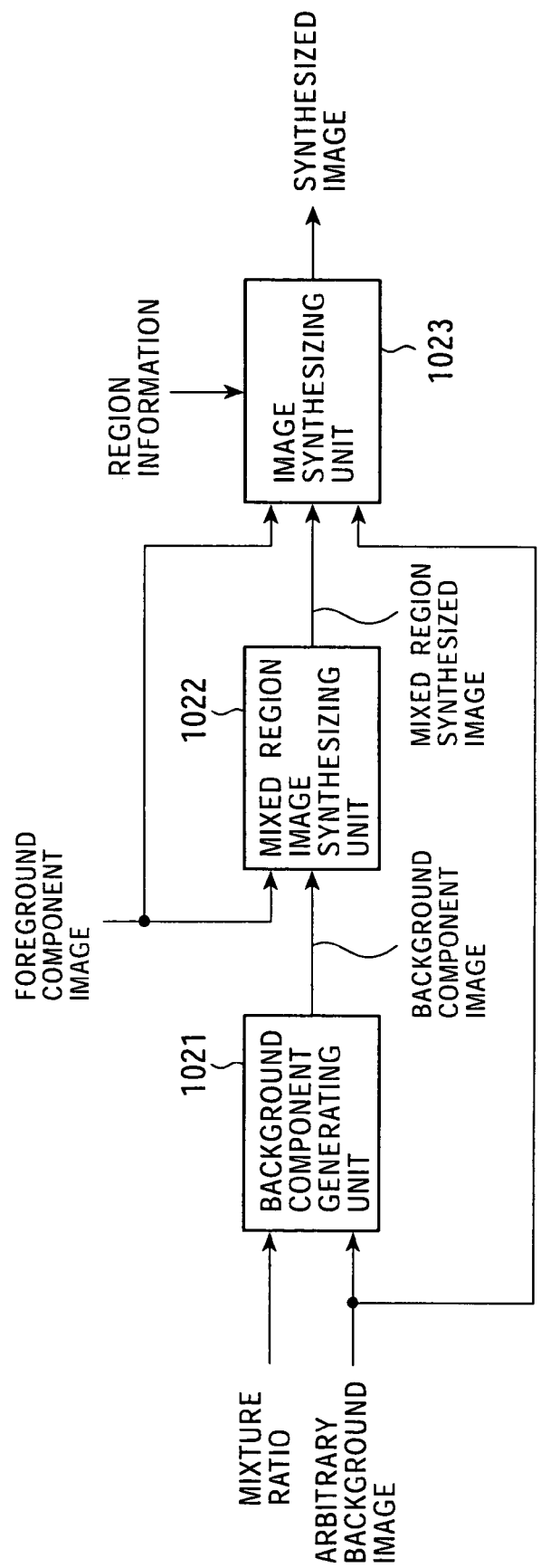
FIG. 81 is a diagram illustrating the configuration of the synthesizing unit 1001.

FIG. 81 is a diagram illustrating the configuration of the synthesizing unit 1001. A background component creating unit 1021 generates a background component image based on the mixture ratio α and the arbitrary background image, and supplies this to a mixed region image synthesizing unit 1022.

The mixed region image synthesizing unit 1022 synthesizes the background component image supplied from the background component creating unit 1021 with the foreground component image to generated a mixed region synthesized image, and supplies the generated mixed region synthesized image to an image synthesizing unit 1023.

The image synthesizing unit 1023 synthesizes the foreground component image, mixed region synthesized image supplied from the mixed region image synthesizing unit 1022, and the arbitrary background image, to generate and output a synthesized image.

Thus, the synthesizing unit 1001 can synthesize a foreground component image with an arbitrary background image.

The image obtained by synthesizing the foreground component image with the arbitrary background image based on the mixture ratio α, which is a features value, is more natural that an image wherein pixels are simply synthesized.

Note that while the mixture ratio α has been described as a proportion of the background component contained in the pixel value, this may be the proportion of the foreground component contained in the pixel value.

Also, the movement of the object which is the foreground has been described as being from the left to the right, but it is needless to say that this is not restricted to that direction.

In the above, an example has been given of a case of projecting images in real space having three-dimensional space and time-axis information onto time-space having two-dimensional space and time-axis information, using a video camera, but the present invention is not restricted to this example, and may be applied to cases for, in the event of projecting a greater amount of first information of a first dimension onto less second information of a second dimension, correcting distortion which occurs due to the projection, extracting significant information, or synthesizing an image in a more natural way.

Note that the sensor is not restricted to a CCD, and may be a sensor which is a solid-state image-taking device, e.g., a CMOS (Complementary Metal Oxide Semiconductor (complementary metal oxide film semiconductor)), BBD (Bucket Brigade Device), CID (Charge Injection Device), or CPD (Charge Priming Device) or the like, and is not restricted to a sensor wherein detecting elements are arrayed in a matrix fashion, but may rather be a sensor wherein the detecting elements are arrayed in a row.

The recording medium storing the program for executing the signal processing of the present invention is not only configured removable media such as a magnetic disk 51 (including floppy (Registered Trademark) disks), optical disk 52 (including CD-ROMs (Compact Disc-Read Only Memory), DVDs (Digital Versatile Disc)), magneto-optical disk 53 (including MDs (Mini-Disc) (Registered Trademark)), or semiconductor memory 54 or the like, storing the program, to be distributed separately from the computer as shown in FIG. 1 for providing the program to users, but is configured of ROM 22 or a hard disk included in the storage unit 28 or the like storing the program, provided to the user in the state of being assembled into the computer beforehand.

Also, an arrangement may be made wherein the program for executing image processing is supplied to the computer via a cable or wireless transmission channel.

Also, in the present Specification, the steps describing the program recorded in the recording medium includes processing which is executed in the time-sequence following the described order, of course, and also processing which is executed in parallel or individually, even if not processed in time-sequence.

INDUSTRIAL APPLICABILITY

According to the first invention, a mixture ratio indicating the state of mixing of multiple objects can be detected.

According to the second invention, a mixture ratio indicating the state of mixing of multiple objects can be detected.

We claim:

1. An image processing device for image processing of image data including a predetermined number of pieces of pixel data obtained by an image-obtaining device having time-integration effects, and calculating a mixture ratio indicating a mixed state in said pixel data of objects-which are multiple in the real world, said image processing device comprising:

an equation generator that, with regard to said image data, within a mixed region,
  extracts, from said image data, contour region pixel data within a frame of interest positioned at a contour region with approximately a same mixture ratio,
  extracts corresponding pixel data corresponding to said contour region pixel data from a frame that has been acquired at a different time from said frame of interest,
  extracts background pixel data which includes a background object component corresponding to said contour region pixel data or said corresponding pixel data, and
  generates an equation wherein said mixture ratio is an unknown number, using said contour region pixel data, said corresponding pixel data, and said background pixel data, based on region specifying information specifying a non-mixed region made up of a foreground region including a foreground object component configuring a foreground object and a background region made up of only a background object component configuring a background object and a mixed region wherein said foreground object component and said background object component are mixed, and movement of said foreground object component; and a mixture ratio detector that detects said mixture ratio in said frame of interest by solving said equation.

2. An image processing device according to claim 1, wherein said equation generator extracts said corresponding pixel data corresponding to the movement amount of said foreground object in said frame.

3. An image processing device according to claim 1, wherein said equation generator extracts said background pixel data corresponding to the movement amount of said background object in said frame.

4. An image processing device according to claim 1, wherein said equation generator generates an equation corresponding to the relationship between said contour region pixel data, said corresponding pixel data, and said background pixel data, for calculating said mixture ratio by the least-square method.

5. An image processing device according to claim 1, comprising a movement detector that detects movement of at least one of said foreground object and said background object.

6. An image processing device according to claim 1, comprising a region specification generator that specifies said foreground region, said background region, and said mixed region.

7. An image processing device according to claim 1, comprising a separating unit that separates at least said foreground object component from said pixel data of said mixed region, based on said mixture ratio.

8. An image processing device according to claim 7, comprising a movement bluffing adjustment unit that adjusts the amount of movement bluffing of said separated foreground object component.

9. An image processing device according to claim 7, comprising an object synthesizer that synthesizes a desired object and said separated foreground object component, based on said mixture ratio.

10. An image processing method for image processing of image data including a predetermined number of pieces of pixel data obtained by an image-obtaining device having time-integration effects, and calculating a mixture ratio indicating a mixed state in said pixel data of objects which are multiple in the real world, said method comprising:

extracting, from said image data, contour region pixel data within a frame of interest positioned at a contour region with approximately a same mixture ratio;

extracting corresponding pixel data corresponding to said contour region pixel data from a frame that has been acquired at a different time from said frame of interest;

extracting background pixel data which is said pixel data including a background object component corresponding to said contour region pixel data or said corresponding pixel data;

generating an equation wherein said mixture ratio is an unknown number, using said contour region pixel data, said corresponding pixel data, and said background pixel data, based on region specifying information specifying a non-mixed region made up of a foreground region including a foreground object component configuring a foreground object and a background region including a background object component configuring a background object and a mixed region wherein said foreground object component and said background object component are mixed, and movement of said foreground object component; and detecting said mixture ratio in said frame of interest by solving said equation.

11. An image processing method according to claim 10, comprising extracting said corresponding pixel data corresponding to the movement amount of said foreground object in said frame.

12. An image processing method according to claim 10, comprising extracting said background pixel data corresponding to the movement amount of said background object in said frame.

13. An image processing method according to claim 10, comprising generating an equation corresponding to the relationship between said contour region pixel data, said corresponding pixel data, and said background pixel data, for calculating said mixture ratio by the least-square method.

14. An image processing method according to claim 10, comprising detecting movement of at least one of said foreground object and said background object.

15. An image processing method according to claim 10, comprising specifying said foreground region, said background region, and said mixed region.

16. An image processing method according to claim 10, comprising separating at least said foreground object component from said pixel data of said mixed region, based on said mixture ratio.

17. An image processing method according to claim 16, comprising adjusting the amount of movement blurring of said separated foreground object component.

18. An image processing method according to claim 16, comprising synthesizing a desired object and said separated foreground object component, based on said mixture ratio.

19. A computer-readable-medium storing instructions that, when executed on a computer processor, cause a computer to carry out a method for image processing of image data including a predetermined number of pieces of pixel data obtained by an image-obtaining device having time-integration effects, and calculating a mixture ratio indicating a mixed state in said pixel data of objects which are multiple in the real world, the method comprising:

extracting, from said image data, contour region pixel data within a frame of interest positioned at a contour region with approximately a same mixture ratio;

extracting corresponding pixel data corresponding to said contour region pixel data from a frame that has been acquired at a different time from said frame of interest;

extracting background pixel data which is said pixel data includes a background object component corresponding to said contour region pixel data or said corresponding pixel data;

generating an equation wherein said mixture ratio is an unknown number, using said contour region pixel data, said corresponding pixel data, and said background pixel data, based on region specifying information specifying a non-mixed region including a foreground region including a foreground object component configuring a foreground object and a background region including a background object component configuring a background object and a mixed region wherein said foreground object component and said background object component are mixed, and movement of said foreground object component; and detecting said mixture ratio in said frame of interest by solving said equation.

20. A computer-readable medium according to claim 19, wherein the method comprises extracting said corresponding pixel data corresponding to the movement amount of said foreground object in said frame.

21. A computer-readable medium according to claim 19, wherein the method comprises extracting said background pixel data corresponding to the movement amount of said background object in said frame.

22. A computer-readable medium according to claim 19, wherein the method comprises generating an equation corresponding to the relationship between said contour region pixel data, said corresponding pixel data, and said background pixel data, for calculating said mixture ratio by the least-square method.

23. A computer-readable medium according to claim 19, wherein the method comprises detecting movement of at least one of said foreground object and said background object.

24. A computer-readable medium according to claim 19, wherein the method comprises specifying said foreground region, said background region, and said mixed region.

25. A computer-readable medium according to claim 19, wherein the method comprises separating at least said foreground object component from said pixel data of said mixed region, based on said mixture ratio.

26. A computer-readable medium according to claim 25, wherein the method comprises adjusting the amount of movement blurring of said separated foreground object component.

27. A computer-readable medium according to claim 25, wherein the method comprises synthesizing a desired object and said separated foreground object component, based on said mixture ratio.

28. An image-obtaining device, comprising:
   an image-acquisition unit, having time-integration effects and outputting image data that includes a predetermined number of pieces of pixel data;
   an equation generator that, with regard to said image data, within a mixed region,
      extracts, from said image data, contour region pixel data within a frame of interest positioned at a contour region with approximately a same mixture ratio indicating a mixed state within said mixed region of objects which are multiple in the real world,
      extracts corresponding pixel data corresponding to said contour region pixel data from a frame that has been acquired at a different time from said frame of interest,
      extracts background pixel data which is said pixel data including a background object component corresponding to said contour region pixel data or said corresponding pixel data, and
      generates an equation wherein said mixture ratio is an unknown number, using said contour region pixel data, said corresponding pixel data, and said background pixel data, based on region specifying information specifying a non-mixed region including a foreground region including a foreground object component configuring a foreground object and a background region including a background object component configuring a background object and a mixed region wherein said foreground object component and said background object component are mixed, and movement of said foreground object component; and
   a mixture ratio detector that detects said mixture ratio in said frame of interest by solving said equation.

29. An image-obtaining device according to claim 28, wherein said equation generator extracts said corresponding pixel data corresponding to the movement amount of said foreground object in said frame.

30. An image-obtaining device according to claim 28, wherein said equation generator extracts said background pixel data corresponding to the movement amount of said background object in said frame.

31. An image-obtaining device according to claim 28, wherein said equation generator generates an equation corresponding to the relationship between said contour region pixel data, said corresponding pixel data, and said background pixel data, for calculating said mixture ratio by the least-square method.

32. An image-obtaining device according to claim 28, comprising movement detector that detects movement of at least one of said foreground object and said background object.

33. An image-obtaining device according to claim 28, comprising a region specification generator that specifies said foreground region, said background region, and said mixed region.

34. An image-obtaining device according to claim 28, comprising a separating unit that separates at least said foreground object component from said pixel data of said mixed region, based on said mixture ratio.

35. An image-obtaining device according to claim 34, comprising a movement blurring adjustment unit that adjusts the amount of movement blurring of said separated foreground object component.

36. An image-obtaining device according to claim 34, comprising an object synthesizer that synthesizes a desired other object and said separated foreground object component, based on said mixture ratio.

* * * * *